United States Patent
Henshue et al.

(10) Patent No.: US 9,789,025 B2
(45) Date of Patent: Oct. 17, 2017

(54) TACTILE WARNING PANEL APPARATUS AND SYSTEM WITH SMART TECHNOLOGY

(71) Applicant: Brandbumps, LLC, Middleton, WI (US)

(72) Inventors: Christopher Gary Henshue, Verona, WI (US); Gary LaVerne Henshue, Madison, WI (US); James Cyrus Rice, Middleton, WI (US)

(73) Assignee: BRANDBUMPS, LLC, Middleton, WI (US)

( * ) Notice: Subject to any disclaimer, the term of this patent is extended or adjusted under 35 U.S.C. 154(b) by 0 days.

(21) Appl. No.: 15/445,438

(22) Filed: Feb. 28, 2017

(65) Prior Publication Data

US 2017/0252256 A1    Sep. 7, 2017

Related U.S. Application Data

(60) Provisional application No. 62/301,864, filed on Mar. 1, 2016.

(51) Int. Cl.
  *E01C 5/22* (2006.01)
  *A61H 3/06* (2006.01)
  (Continued)

(52) U.S. Cl.
  CPC ............ *A61H 3/061* (2013.01); *E01C 5/001* (2013.01); *E01C 5/06* (2013.01); *E01C 5/16* (2013.01);
  (Continued)

(58) Field of Classification Search
  CPC .. A61H 3/061; A61H 2003/063; E01C 5/001; E01C 5/06; E01C 5/20; E01C 5/22; E01C 5/16; G08B 6/00
  (Continued)

(56) References Cited

U.S. PATENT DOCUMENTS 4,715,743 A   12/1987  Schmanski
5,228,250 A    7/1993  Kesselman
(Continued)

FOREIGN PATENT DOCUMENTS

DE       10101873    7/2002
DE    20 2012 004287    5/2012
(Continued)

OTHER PUBLICATIONS

International Search Report, International Patent Application No. PCT/US2017/019988, dated Jun. 27, 2017.
(Continued)

*Primary Examiner* — Raymond W Addie
(74) *Attorney, Agent, or Firm* — Casimir Jones S.C.

(57) ABSTRACT

Multipurpose tactile warning panels for use in pedestrian walkways and in particular tactile warning panels that are designed and built with multifunction/multipurpose capabilities that serve the visually impaired and enable the deployment of smart city technology by integrating tactile warning systems and subsurface enclosures that can withstand pressures of five (5) tons up to and exceeding sixty (60) tons and incorporate small cells, beacons, sensors, Fog Computing, electric energy generation, rechargeable power supplies, wireless M2M communication and a plethora of other smart city technologies.

19 Claims, 34 Drawing Sheets

(51) Int. Cl.
  *E01C 5/00* (2006.01)
  *E01C 5/16* (2006.01)
  *E01C 5/06* (2006.01)
  *E01C 5/20* (2006.01)
  *G08B 6/00* (2006.01)

(52) U.S. Cl.
  CPC .................. *E01C 5/20* (2013.01); *E01C 5/22* (2013.01); *G08B 6/00* (2013.01); *A61H 2003/063* (2013.01)

(58) Field of Classification Search
  USPC .......................... 404/12–16, 18–21, 42, 44, 9
  See application file for complete search history.

(56) References Cited

U.S. PATENT DOCUMENTS

| | | |
|---|---|---|
| 5,271,690 A | 12/1993 | Fennessy |
| 5,346,547 A | 9/1994 | McCormack |
| 5,764,060 A * | 6/1998 | Gonzalez .................. A61F 9/08 116/205 |
| 6,960,989 B1 | 11/2005 | Grayson |
| 6,971,818 B1 | 12/2005 | Schabacker |
| 7,189,025 B1 | 3/2007 | Greer et al. |
| 7,779,581 B2 | 8/2010 | Flaherty et al. |
| 9,311,831 B2 | 4/2016 | Henshue et al. |
| 9,361,816 B2 | 6/2016 | Henshue et al. |
| 2002/0027510 A1 | 3/2002 | Jones et al. |
| 2006/0039752 A1 | 2/2006 | Hyams |
| 2006/0174567 A1 | 8/2006 | Sippola |
| 2008/0095576 A1 * | 4/2008 | Donald .................. E01C 5/00 404/34 |
| 2010/0129150 A1 | 5/2010 | Sippola |
| 2011/0291804 A1 | 12/2011 | Chan |
| 2012/0235871 A1 | 9/2012 | Taniguchi et al. |
| 2013/0142095 A1 | 6/2013 | Calcev et al. |
| 2013/0212046 A1 | 8/2013 | Henshue et al. |
| 2015/0252540 A1 * | 9/2015 | Lee .................. E01F 9/529 404/6 |
| 2015/0265491 A1 | 9/2015 | Henshue et al. |

FOREIGN PATENT DOCUMENTS

| | | |
|---|---|---|
| KR | 20110091355 | 8/2011 |
| KR | 20140007664 | 1/2014 |
| KR | 20150000515 | 1/2015 |
| KR | 20150140908 | 12/2015 |
| WO | 2010/137842 | 12/2010 |

OTHER PUBLICATIONS

Surface Applied Tactile / Detectable Warning Surface Tiles, ADA, Feb. 6, 2014. [Retrieved on Jun. 8, 2017] Retrieved from Internet: <URL:http://www.adatile.com/pdf/SurfaceAppliedTactile-Specifications.pdf>.

* cited by examiner

TACTILE WARNING PANEL APPARATUS AND SYSTEM WITH SMART TECHNOLOGY

CROSS REFERENCE TO RELATED APPLICATIONS

This application claims the benefit of the U.S. Provisional Application 62/301,864, filed on Mar. 1, 2016, the entire contents of which are incorporated herein by reference.

FIELD OF THE INVENTION

The present invention relates to tactile warning panels, and in particular to a multipurpose tactile warning panel apparatus and system that integrates a subsurface enclosure that is designed to enable space beneath tactile warning panels for connected multipurpose capabilities.

BACKGROUND OF THE INVENTION

Tactile warning panels are mandated in the U.S. under 42 USC 12101 et seq., as amended, and regulations promulgated thereunder; or tactile walking surface indicators, ISO 23599 international. These are generically referred to as tactile warning panels, detectable warning panels, detectable warning surfaces, tactile warning tiles, detectable warning tiles or tactile walking surface indicators. The purpose of these tactile warning panels is to safeguard individuals with impaired vision against hazards in public places and pedestrian walkways. In the United States, tactile warning panels are characterized as square or rectangular panels mounted on walkways at points of hazard like street intersections and passenger access zones to public transportation.

Two generic texture patterns are used for tactile warning panels ("attention patterns" and "guiding patterns"). The usage of these tactile warning panel patterns differs somewhat from country to country. Over the years, extensive research in various countries has established that both "attention patterns" (truncated domes or cones) and "guiding patterns" (elongated raised bars) are highly detectable when used in association with typical walking surfaces, and that they are distinguishable from each other.

The tactile warning panels are typically made of metal, plastic composite, cast iron or other materials. The tactile warning panel is affixed or embedded in a concrete or paved surface and bear a plurality of raised features detectable by tactile sensation such as contact with shoes or a cane. Within the scope of applicable regulations, there is considerable latitude in the shape, size, and spacing of such raised features. U.S. Patent application 2006/0039752 discloses a warning panel having raised features containing an array of circular truncated hemispheres. Most variations of raised features are truncated domes in configuration, as illustrated in U.S. Pat. No. 6,960,989. Another variation is the use of set pins inserted into a pre-drilled hole in a concrete walkway, and then bonded to the holes, as disclosed in U.S. Pat. No. 6,971,818. U.S. Pat. No. 4,715,743 discloses rounded domes on multiple tiles with expansion joints between contiguous tiles. U.S. Pat. No. 5,271,690 and U.S. Pat. No. 7,189,025 show six sided elevated domes with dimples in the centers thereof.

While most tactile warning panels are constructed sturdily, over time they can be expected to show wear and tear and to incur surface damage requiring replacement. Snowplows are particularly destructive. Due to this surface damage, several companies have developed a replacement tactile warning panel product. Several examples exist of lower frame panels forming a base that is embedded in the concrete or pavement walkway when it is laid. The walking surface is a top removable tactile warning panel positioned over and is fastened into or on the base panel. Examples are shown in U.S. Patent application 2010/0129150. Another embodiment of a replaceable panel is disclosed in U.S. Pat. No. 7,779,581 that has anchor means for fast removal and replacement of the panel.

The rules governing the coloring of tactile warning panels specify only that they provide a discernible contrast to the color of the surrounding walkway. The tactile warning panel provides two cues to the visually impaired. The first cue is a distinctive surface pattern of domes (three-dimensional substrate) detectable by cane or underfoot. The second cue is provided by the color differentiation from the surrounding ground surfaces. In the case of cast iron, the panel may be left bare because cast iron rusts and thus provides a natural reddish brown hue. For stainless steel and other materials, solid colors are typically chosen. Most common are solid red and yellow; yellow is selected because it is the last wavelength of color to fade for persons with impaired vision.

The major market for tactile warning panels are cities who have the largest number of sidewalks and street corners where panels are required by the Americans with Disabilities Act (1990) (hereinafter referred to as "ADA"). There are approximately 32 million locations in the United States requiring tactile warning panels. Cities continue to seek new ways to improve safety for citizens while managing costs. Yet, the deployment of these panels has been very slow due primarily to cost. After twenty-five years, there are estimates that only 15%-25% of the tactile warning panels, required by ADA, have been installed.

One way to reduce the effective cost of ADA compliant tactile warning panels and to accelerate their deployment and thereby improving compliance to ADA is to enable tactile warning panels with additional functionality and capability. Henshue (U.S. Pat. No. 9,311,831 B2 and U.S. Pat. No. 9,361,816 B2, incorporated herein by reference in their entirety) enables ADA compliant tactile warning panels to serve as an advertising media or brandscaping/cityscaping tool by creating a high quality and durable full color image on the surface of the panel.

The present invention adds significant utility and functionality, beyond Henshue, to tactile warning panels and the right-of-way under the panel. This added functionality enables the right-of-way space under the federally required tactile warning panels on the sidewalk curb ramp on every street corner in urban environments, to serve as a secure, scalable and ubiquitous location for the placement of smart city technologies. Henshue (U.S. Pat. No. 9,311,831 B2 and U.S. Pat. No. 9,361,816 B2) added to the surface of tactile warning panels, a high quality, full color, textured and durable graphic design and image thereby expanding the panels utility and functionality.

SUMMARY OF THE INVENTION

The present invention, a tactile warning panel apparatus and system with smart technology (TWPA), greatly expands on the utility of traditional tactile warning panels by layering and integrating with tactile warning panels, subsurface panels, load bearing panels, enclosures, and other system components that enable the unobtrusive and secure placement of smart city technology and connectivity in urban densely populated areas within cities. These connectivity technologies include batteries and electronic equipment including but not limited to radios, antennae, small cells, Wi-Fi, fog computing, fog nodes, computers, distributed computing, sensors, routers, switches, transmitters, receivers, beacons and the like. The TWPA will play an active role in enabling the deployment of smart city technology while also warning the visually impaired and device distracted pedestrians of sidewalk curb ramps, streets, parking lots, transit platforms, vehicles and other hazardous situations. The TWPA benefits include enhancing urban mobility and safety: how people and things move within and around cities.

Embodiments of the present invention will also play an active role in facilitating the deployment of a vast array of machines and Internet of Things (IoT) or Internet of Everything (IoE), intelligent connectivity, that will impact human life and safety within a city.

Intelligent connectivity is the sum of systems, services and technologies connecting people, data and infrastructure. Intelligent connectivity unites a broad range of emerging technologies to enable smarter, safer, healthier, more resilient and economically vibrant urban life. Intelligent connectivity, converging trends, and technological innovations are paving the way for a complete re-imagining of urban mobility. When urban mobility systems work—cleanly, collaboratively, efficiently—the entire city benefits.

Other embodiments of the present invention in combination with Machine-to-Machine (M2M) and wireless technology will revolutionize the lives of the visually impaired. The present invention will allow the visually impaired to navigate safely and live a life of freedom and equality on public rights-of-way, public facilities and private property by facilitating access to information on their surroundings. Visually impaired users with smartphones will be alerted to hazardous situations, such as transit platforms and pedestrian road crossings and approaching vehicles. In addition, they can provide detailed audio information on what's going on around them when they visit a place.

Further embodiments of the present invention provide security from vandalism and other nefarious and destructive activity including the shielding from electromagnetic interference (EMI) and electromagnetic pulses (EMP) for the sending and receiving of communications utilizing antennae, electronics, sensors and other electronic equipment that are subject to EMI and EMP.

There are numerous other applications for embodiments of the TWPA for cities, retailers, stadiums, universities, convention centers, mall owners, transit operators and bus stops to name a few.

Further embodiments of the present invention provide a multipurpose tactile warning panel apparatus for placement into or on a pedestrian walkway comprising: an upper surface panel with a planar surface having thereon a plurality of distinct spatially raised, three dimensional features arranged in a pattern to be detected by tactile sensation; and one or more transmitters or receivers associated therewith. In some embodiments, the transmitters or receivers are wireless. In some embodiments, the one or more transmitters or receivers are physically integrated with the upper surface panel. In some embodiments, the transmitters or receivers are selected from the group consisting of Beacon transmitters or receivers, Blue Tooth transmitters or receivers, Global Positioning System (GPS) transmitters or receivers, Geofencing transmitters or receivers, Low Power Wide Area Network (LPWAN) transmitters or receivers, Dedicated Short Range Communication (DSRC) transmitters or receivers, Wi-Fi transmitter or receivers and sensor transmitters or receivers. In some embodiments, the transmitters or receivers are configured to communicate with mobile devices, mobile device applications, wearable devices, machines, or other electronic devices. In some embodiments, the upper surface panel has an integrated antennae configured horizontally within the upper surface panel.

In some embodiments, the upper surface panel is formed from a material selected from the group consisting of metal, glass, ceramic material, thermoset plastic, thermoplastic, plastic composite, solar panel material, polymer concrete, fiberglass, polymeric material composed of polycrystalline transparent ceramics such as alumina AI203, yttria alumina garnet (YAG) and neodymiumdoped ND:YAG and other products of nanoscale ceramic technology. Still further embodiments for the upper surface panel may include but not be limited to transparent nylons, polyurethane, acrylics, soda-lime-silica glasses, borosilicate glasses, fused silica glasses, lithium disilicate based glass-ceramics, aluminum oxynitride (AION), magnesium aluminate spinel (spinel), single crystal aluminum oxide (sapphire, aluminum oxynitride spinel (AI23O27N5), Magnesium aluminate spinel (MgAL204), single-crystal aluminum oxide (sapphire—AI203), and nanocomposites of yttria and magnesia or combinations thereof. In some embodiments, the upper surface panel is textured for slip resistance. In some embodiments, the glass is tempered. In some embodiments, the glass is high strength. In some embodiments, the glass is textured for slip resistance.

In some embodiments, the upper surface panel comprises a high-resolution image comprises two or more colors having a resolution of greater than 120 DPI.

In some embodiments, the distinct spatially raised, three dimensional features comprise an attention pattern with a plurality of raised truncated domes or cones. In some embodiments, the raised truncated domes or cones are circular. In some embodiments, the truncated domes or cones are arranged in an array. In some embodiments, the spatially raised features comprise a guiding pattern with a plurality of raised bars. In some embodiments, the raised bars are parallel flat-topped elongated bars or sinusoidal ribs. In some embodiments, the raised bars are arranged in an array.

In some embodiments, the apparatus further comprises one or more antennae in operable electronic communication with the one or more transmitters or receivers.

In some embodiments, the apparatus further comprises one or more sensors. In some embodiments, the one or more sensors are selected from the group consisting of pressure sensors, sound sensors, temperature sensors, humidity sensors, water level sensors or light sensors.

In some embodiments, the apparatus further comprises one or more computer processors, routers or switches.

In some embodiments, the one or more computer processors are configured for fog computing in a local distributed cloud of networked computers, processors, fog nodes or local nodes for sensing, data gathering, transmission of data, reporting, calculations, analytics and actions.

In some embodiments, the apparatus further comprises a rechargeable power supply in operable association with the one or more transmitters or receivers. In some embodiments, the rechargeable power supply is selected from the group consisting of lead-acid batteries, nickel cadmium (NiCd) batteries, nickel metal hydride (NiMH) batteries, lithium ion (Li-ion) batteries, lithium ion polymer (Li-ion polymer) batteries and alkaline type batteries or combinations thereof. In some embodiments, the rechargeable power supply has integrated AC/DC converters or power conditioners.

In some embodiments, the apparatus further comprises a solar panel in operable association with the rechargeable power supply.

In some embodiments, the apparatus further comprises a subsurface panel below and adjacent to the upper surface panel. In some embodiments, the apparatus further comprises a plurality of releasable fasteners, wherein the upper surface panel is releasably attachable to the subsurface panel by engagement of a plurality of releasable fasteners. In some embodiments, the fasteners are tamper-proof.

In some embodiments, the upper surface panel allows transmission of light energy and the subsurface panel comprises solar cells. In some embodiments, the upper surface panel is formed from a material allowing transmission of light selected from the group consisting of glass, polycrystalline transparent ceramics, transparent nylons, polyurethane, acrylics, soda-lime-silica glasses, borosilicate glasses, fused silica glasses, lithium disilicate based glass-ceramics, aluminum oxynitride (AlON), magnesium aluminate spinel, single crystal aluminum oxide, magnesium aluminate spinel, single-crystal aluminum oxide, nanocomposites of yttria and magnesia. In some embodiments, the glass is tempered. In some embodiments, the glass is high strength. In some embodiments, the glass is textured for slip resistance. In some embodiments, the solar cells are comprised of monocrystalline silicon or derivatives of monocrystalline silicon cells configured in the subsurface panel. In some embodiments, the subsurface panel comprising solar cells has an opening therein for accommodation of a subsurface antenna. In some embodiments, the subsurface panel comprising solar cells further comprises an integrated antenna configured horizontally within the subsurface panel. In some embodiments, the apparatus further comprises one or more video panels, wherein the video panels are adjacent to the subsurface panel comprising solar cells. In some embodiments, the apparatus further comprises a rechargeable power supply and the subsurface panel comprising solar cells is operably connected to the rechargeable power supply. In some embodiments, the apparatus further comprises a plurality of LEDs and the LEDs are integrated into the subsurface panel comprising solar cells.

In some embodiments, the subsurface panel serves as a securement plate for the upper surface panel.

In some embodiments, the subsurface panel is fastened to a generally planar substrate selected from the group consisting of pedestrian walkways, sidewalks, parking lots, transit platforms, transition points to escalators or curbs ramps. In some embodiments, the generally planar substrate is formed from a material selected from the group consisting of concrete, concrete mix, metal or asphalt pavement.

In some embodiments, the subsurface panel has one or more recesses therein configured to house electronic components selected from a group consisting of transmitters, receivers, rechargeable power supplies, beacons, computer processors, antennae or combinations thereof.

In some embodiments, the upper surface panel and the subsurface panel have an environmental sealant there between. In some embodiments, the environmental sealant is a silicone or rubber sealant.

In some embodiments, the apparatus further comprises a subsurface enclosure having a lid and wherein the lid is immediately below the subsurface panel to provide an enclosed subsurface space in the pedestrian walkway. In some embodiments, the apparatus further comprises a subsurface enclosure and wherein the upper surface panel, or the subsurface panel, forms a lid for the subsurface enclosure to provide an enclosed subsurface space in a pedestrian walkway. In some embodiments, the subsurface enclosure comprises a temperature control element selected from a group consisting of heat dissipation elements, cooling elements, venting or heating elements. In some embodiments, the subsurface enclosure is formed from cast iron, ductile iron, stainless steel, aluminum, alloys, composites, polymeric materials or combinations thereof. In some embodiments, the polymeric materials comprise of plastic, thermoset plastic, thermoplastic, polymer concrete, fiberglass reinforced plastic, bulk molding compound, sheet molding compound, a plastic composite, fiber composite or combinations thereof suitable for housing electronic equipment in a ground substrate of concrete, asphalt, gravel, dirt, concrete mix or other suitable walkway or ground material. In some embodiments, the subsurface enclosure is a vertically elongated tube or canister shape to facilitate cooling and enhance security. In some embodiments, the subsurface enclosure comprises walls containing metal fragments to create an electromagnetic shield for the contents of the enclosure. In some embodiments, the subsurface enclosure comprises an electromagnetic shield. In some embodiments, the electromagnetic shield is selected from the group consisting of a steel plate, metal screen, or composite material with metal in the composite. In some embodiments, the subsurface enclosure incorporates penetrations or conduit for external connections or cooling functions. In some embodiments, the penetrations and conduit contains cables for power transmission or communications.

In some embodiments, the TWPA further comprises a subsurface panel between the upper surface panel and the subsurface enclosure. In some embodiments, the upper surface panel is releasably attachable to the subsurface panel by engagement of the plurality of releasable fasteners. In some embodiments, the fasteners are tamper-proof. In some embodiments, the upper surface panel allows transmission of light energy and the subsurface panel comprises solar cells. In some embodiments, the upper surface panel is formed from a material allowing transmission of light selected from the group consisting of glass, polycrystalline transparent ceramics, transparent nylons, polyurethane, acrylics, soda-lime-silica glasses, borosilicate glasses, fused silica glasses, lithium disilicate based glass-ceramics, aluminum oxynitride (AlON), magnesium aluminate spinel, single crystal aluminum oxide, magnesium aluminate spinel, single-crystal aluminum oxide, and nanocomposites of yttria and magnesia. In some embodiments, the glass is tempered. In some embodiments, the glass is high strength. In some embodiments, the glass is textured for slip resistance. In some embodiments, the solar cells are comprised of monocrystalline silicon or derivatives of monocrystalline silicon cells configured in the subsurface panel. In some embodiments, the subsurface panel comprising solar cells has an opening therein for accommodation of a subsurface antenna. In some embodiments, the subsurface panel comprising solar cells further comprises an integrated antenna configured horizontally within the subsurface panel. In some embodiments, the apparatus further comprises one or more video panels, wherein the video panels are adjacent to the subsurface panel comprising solar cells. In some embodiments, the apparatus further comprises a rechargeable power supply and wherein the subsurface panel comprising solar cells is operably connected to the rechargeable power supply. In some embodiments, the apparatus further comprises plurality of LEDs, wherein the LEDs are integrated into the subsurface panel comprising solar cells. In some embodiments, the subsurface panel serves as a securement plate for the upper surface panel. In some embodiments, the subsurface panel is fastened to a generally planar substrate selected from the group consisting of pedestrian walkways, sidewalks, parking lots, transit platforms, transition points to escalators and curbs. In some embodiments, the generally planar substrate is formed from a material selected from the group consisting of concrete, concrete mix, metal and pavement. In some embodiments, the subsurface panel has one or more recesses therein configured to house electronic components selected from the group consisting of transmitters, receivers, rechargeable power supplies, beacons, computer processors, antennae and combinations thereof. In some embodiments, the upper surface panel and the subsurface panel have an environmental sealant there between. In some embodiments, the environmental sealant is a silicone or rubber sealant.

In some embodiments, the transmitters and receivers, sensors and computers processors communicate through an internal antenna. In some embodiments, the antennae communicates with an antenna external to the integrated TWPA for the purpose of boosting signal strength. In some embodiments, the external antenna is located on a light pole, utility pole or other structure external to the enclosure.

In some embodiments, the apparatus further comprises an antenna, wherein the antenna resides external to the TWPA and is connected to the electronic components, sensors, computers or rechargeable batteries residing in the panel apparatus. In some embodiments, an antenna is incorporated into the subsurface panel comprising solar cells in a horizontal position and flush with the upper surface panel. In some embodiments, an antenna is incorporated into the subsurface enclosure where the top of the antenna sits flush beneath the upper surface panel through a hole in the subsurface panel and the supporting lid of the subsurface enclosure.

In some embodiments, the present invention provides a network of three or more multipurpose TWPAs, as described above, located in predetermined locations in pedestrian walkways. In some embodiments, the network of multipurpose TWPAs is in electronic communication with at least one central receiver. In some embodiments, each of the multipurpose TWPAs within the network is in electronic communication with at least one other multipurpose TWPA in the network. In some embodiments, each of the multipurpose TWPAs within the network are configured for communication with transmitters or receivers located in vehicles. In some embodiments, each of the multipurpose TWPAs within the network are configured for communication with mobile devices.

In some embodiments, the present invention provides methods of providing communication between a TWPA and an external transmitter or receiver comprising sending or receiving a signal to or from the multipurpose TWPA.

In some embodiments, the present invention provides a multipurpose tactile warning panel apparatus and system for placement into or on a pedestrian walkway comprising: a surface tactile panel system with a planar surface having thereon a plurality of distinct spatially raised, three dimensional features arranged in a pattern to be detected by tactile sensation; one or more subsurface enclosures; and one or more transmitters, sensors, receivers, electronic equipment, antenna or batteries associated therewith. In some embodiments, the surface tactile panel system is selected from the group consisting of a surface tactile panel with a minimum load limit of five tons and a non-load bearing surface tactile panel attached to a subsurface base panel where the combination is load bearing with a minimum load limit of five tons.

In some embodiments, the surface tactile panel system is formed from a material selected from a group consisting of metal, glass, ceramic material, thermoset plastic, thermoplastic, polymeric material, plastic composite, polyurethane with glass fiber, fiber reinforced plastic, concrete, polymer concrete, fiber reinforced foam, graphene, sheet molding compound, bulk molding compound or a combination thereof. In some embodiments, the surface tactile panel system is formed from a material that allows radio frequency propagation and transmission through the surface tactile panel system from an antenna positioned below the surface tactile panel system. In some embodiments, the distinct spatially raised, three dimensional features comprise a pattern selected from the group consisting an attention pattern of a plurality of raised truncated domes or cones and a guiding pattern with a plurality of raised bars.

In some embodiments, the pedestrian walkway has a ground surface substrate and said surface tactile panel system is seated in a frame which is molded, formed or installed in said ground surface substrate. In some embodiments, the frame which is molded, formed or installed in the surrounding ground surface substrate is load bearing with a minimum load limit of five tons. In some embodiments, the frame is formed from a material selected from a group consisting of metal, aluminum, ceramic material, thermoset plastic, thermoplastic, polymeric material, plastic composite, polyurethane with glass fiber, fiber reinforced plastic, concrete, polymer concrete, graphene, sheet molding compound, bulk molding compound or a combination thereof.

In some embodiments, the systems further comprise a plurality of releasable fasteners, wherein said surface tactile panel system is releasably attachable to said frame with said releasable fasteners which are tamper-proof and/or lockable.

In some embodiments, the subsurface enclosure or enclosures are immediately below and adjacent to said surface tactile panel system. In some embodiments, the subsurface enclosure or enclosures are formed from concrete, polymer concrete, fiberglass reinforced concrete, fiberglass, fiber composite, fiber reinforced plastic, metal, plastic composites, polymeric materials, thermoset plastic, thermoplastic, composite materials, graphene, sheet molding compound, bulk molding compound and combinations thereof. In some embodiments, the subsurface enclosure or enclosures have a removable lid and both the enclosure and removable lid are watertight and/or waterproof. In some embodiments, the subsurface enclosure or enclosures have waterproof penetrations therein to facilitate conduit and external connections entering or exiting said subsurface enclosure or enclosures. In some embodiments, the subsurface enclosure or enclosures houses transmitters, receivers, sensors, computers, small cell radios, Wi-Fi equipment, rechargeable power, batteries, fans, ventilation equipment, cooling equipment, wireless equipment or other electronic equipment. In some embodiments, the one or more antenna, transmitters, receivers, sensors or other electronic equipment are physically integrated, molded into or under said surface tactile panel system.

In some embodiments, the surface tactile panel has thereon a high-resolution image of two or more colors having a resolution of greater than 120×120 DPI. In some embodiments, the subsurface enclosure or enclosures are separate from and beneath said load bearing surface tactile panel. In some embodiments, the load bearing surface tactile panel is physically connected to the subsurface enclosure or enclosures.

In some embodiments, the present invention provides a multipurpose tactile warning panel apparatus and system for placement into or on a pedestrian walkway comprising: a surface tactile panel with a planar surface having thereon a plurality of distinct spatially raised, three dimensional features arranged in a pattern to be detected by tactile sensation; and one or more subsurface enclosures. In some embodiments, the surface tactile panel is load bearing with a minimum load limit of five tons. In some embodiments, the surface tactile panel is load bearing with a load limit of five to sixty tons. In some embodiments, the load bearing surface tactile panel is textured to provide slip resistance. In some embodiments, the load bearing surface tactile panel comprises a high-resolution image of two or more colors having a resolution of greater than 120×120 DPI.

In some embodiments, the load bearing surface tactile panel is formed from a material selected from a group consisting of metal, glass, ceramic material, thermoset plastic, thermoplastic, polymeric material, plastic composite, polyurethane with glass fiber, fiber reinforced plastic, polymer concrete, fiber reinforced foam, graphene, sheet molding compound, bulk molding compound or a combination thereof. In some embodiments, the load bearing surface tactile panel is formed from a material that allows radio frequency propagation and transmission through the load bearing surface tactile panel from an antenna positioned below the load bearing surface tactile panel.

In some embodiments, the load bearing surface tactile panel is formed from a material that allows radio frequency propagation and transmission through the load bearing surface tactile panel from an antenna integrated into the load bearing surface tactile panel. In some embodiments, the load bearing surface tactile panel with the integrated antenna is configured horizontally within the load bearing surface tactile panel. In some embodiments, an antenna is incorporated into the subsurface enclosure where the top of the antenna is positioned approximately flush beneath the load bearing surface tactile panel in a cavity on the underside or bottom of the load bearing surface tactile panel. In some embodiments, the antenna is positioned above the subsurface enclosure and where the top of the antenna is positioned approximately flush beneath the load bearing surface tactile panel.

In some embodiments, the distinct spatially raised, three dimensional features comprise an attention pattern of a plurality of raised truncated domes or cones. In some embodiments, the raised truncated domes or cones are circular. In some embodiments, the truncated domes or cones are arranged in an array. In some embodiments, the distinct spatially raised, three dimensional features comprise a guiding pattern with a plurality of raised bars. In some embodiments, the raised bars are parallel flat-topped elongated bars or sinusoidal ribs. In some embodiments, the raised bars are arranged in an array.

In some embodiments, the pedestrian walkway has a ground surface substrate and the load bearing surface tactile panel is seated in a frame which is molded, formed or installed in the ground surface substrate. In some embodiments, the frame which is molded, formed or installed in the surrounding ground surface substrate is load bearing with a minimum load limit of five tons. In some embodiments, the frame is load bearing with a load limit of five to sixty tons. In some embodiments, the frame is formed from a material selected from a group consisting of metal, aluminum, thermoset plastic, thermoplastic, polymeric material, plastic composite, polyurethane with glass fiber, fiber reinforced plastic, concrete, polymer concrete, graphene, sheet molding compound, bulk molding compound or a combination thereof. In some embodiments, the systems further comprise a plurality of releasable fasteners, wherein the load bearing surface tactile panel is releasably attachable to the frame and/or the ground surface with the releasable fasteners. In some embodiments, the releasable fasteners are tamper-proof and/or lockable.

In some embodiments, the subsurface enclosure or enclosures are immediately below and adjacent to the load bearing surface tactile panel. In some embodiments, the systems further comprise a subsurface enclosure or enclosures that are separate from and beneath the load bearing surface tactile panel. In some embodiments, the load bearing surface tactile panel and subsurface enclosure or enclosures are separated by a void space and are not physically attached. In some embodiments, the void space between the load bearing surface tactile panel and subsurface enclosure or enclosures serves as an air barrier. In some embodiments, the load bearing surface tactile panel is physically connected to the subsurface enclosure or enclosures. In some embodiments, the load bearing surface tactile panel forms a removable lid for the subsurface enclosure or enclosures. In some embodiments, the removable lid is releasably attached to the subsurface enclosure or enclosures by engagement of a plurality of releasable fasteners. In some embodiments, the fasteners are tamper-proof and/or lockable. In some embodiments, the removable lid is watertight and/or the one or more enclosures are watertight. In some embodiments, the removable lid is waterproof and/or the one or more enclosures are waterproof.

In further embodiments, the systems further comprise a load bearing subsurface base panel below and adjacent to the surface tactile panel wherein the load bearing subsurface base panel has a minimum load limit of five tons. In some embodiments, the subsurface base panel is load bearing with a load limit from five to sixty tons. In some embodiments, the surface tactile panel is non-load bearing and is releasably attachable to the load bearing subsurface base panel. In some embodiments, the surface tactile panel is textured to provide slip resistance and durability. In some embodiments, the surface tactile panel comprises a high-resolution image of two or more colors having a resolution of greater than 120×120 DPI.

In some embodiments, the subsurface base panel is formed from a material selected from a group consisting of metal, glass, ceramic material, thermoset plastic, thermoplastic, polymeric material, plastic composite, polyurethane with glass fiber, fiber reinforced plastic, polymer concrete, fiber reinforced foam, graphene, sheet molding compound, bulk molding compound or a combination thereof. In some embodiments, the surface tactile panel is formed from a material selected from the group consisting of metal, glass, ceramic material, thermoset plastic, thermoplastic, polymeric material, plastic composite, polyurethane with glass fiber, fiber reinforced plastic, polymer concrete, fiber reinforced foam, graphene, sheet molding compound, bulk molding compound or a combination thereof.

In some embodiments, the combination of surface tactile panel and load bearing subsurface base panel are both formed from a material that allows radio frequency propagation and transmission through the surface tactile panel and load bearing subsurface base panel from an antenna below the combined panels. In some embodiments, the combination of surface tactile panel and load bearing subsurface base panel are both formed from a material that allows radio frequency propagation and transmission through the surface tactile panel and load bearing subsurface base panel from an antenna integrated into the load bearing subsurface base panel. In some embodiments, the surface tactile panel and load bearing subsurface base panel with the integrated antenna is configured horizontally within the load bearing subsurface base panel. In some embodiments, an antenna is incorporated into the subsurface enclosure where the top of the antenna is positioned approximately flush beneath the combination of the surface tactile panel and load bearing subsurface base panel in a cavity on the underside or bottom of the load bearing subsurface base panel. In some embodiments, the antenna is positioned above the subsurface enclosure and where the top of the antenna is positioned approximately flush beneath the combination of the surface tactile panel and load bearing subsurface base panel.

In some embodiments, the distinct spatially raised, three dimensional features comprise an attention pattern with a plurality of raised truncated domes or cones. In some embodiments, the raised truncated domes or cones are circular. In some embodiments, the truncated domes or cones are arranged in an array. In some embodiments, the distinct spatially raised, three dimensional features comprise a guiding pattern with a plurality of raised bars. In some embodiments, the raised bars are parallel flat-topped elongated bars or sinusoidal ribs. In some embodiments, the raised bars are arranged in an array.

In some embodiments, the surface tactile panel is releasably attachable to the load bearing subsurface base panel by engagement of the plurality of releasable fasteners. In some embodiments, the fasteners are tamper-proof. In some embodiments, the systems further comprise a plurality of releasable fasteners, wherein the surface tactile panel is releasably attachable to both an existing ground surface and/or to the load bearing subsurface base panel by engagement of the plurality of releasable fasteners. In some embodiments, the fasteners are tamper-proof.

In some embodiments, the pedestrian walkway has a ground surface substrate and the surface tactile panel and the load bearing subsurface base panel are both seated in a frame which is molded, formed or installed in the ground surface substrate. In some embodiments, the frame which is molded, formed or installed in the surrounding ground surface substrate is load bearing with a minimum load limit of five (5) tons. In some embodiments, the frame which is molded, formed or installed in the surrounding ground surface substrate is load bearing with a load limit of five to sixty tons. In some embodiments, the frame is formed from a material selected from a group consisting of metal, aluminum, thermoset plastic, thermoplastic, polymeric material, plastic composite, polyurethane with glass fiber, fiber reinforced plastic, concrete, polymer concrete, graphene or a combination thereof. In some embodiments, the systems further comprise a plurality of releasable fasteners, wherein the surface tactile panel and load bearing subsurface base panel are releasably attachable to the frame. In some embodiments, the releasable fasteners are tamper-proof and/or lockable. In some embodiments, the subsurface enclosure or enclosures are immediately below and adjacent to the surface tactile panel which is releasably attachable to the load bearing subsurface base panel.

In some embodiments, the systems further comprise a subsurface enclosure or enclosures that are separate from and beneath the surface tactile panel which is releasably attached to a load bearing subsurface base panel. In some embodiments, the surface tactile panel which is releasably attachable to the load bearing subsurface base panel and the subsurface enclosure or enclosures are separated by a void space and are not physically attached. In some embodiments, the void space between the surface tactile panel which is releasably attachable to the load bearing subsurface base panel and the subsurface enclosure or enclosures serves as an air barrier. In some embodiments, the surface tactile panel which is releasably attached to a load bearing subsurface base panel is physically connected to the subsurface enclosure or enclosures. In some embodiments, the surface tactile panel which is releasably attached to a load bearing subsurface base panel forms a removable lid for the subsurface enclosure or enclosures. In some embodiments, the removable lid is releasably attached to the subsurface enclosure or enclosures by engagement of a plurality of releasable fasteners. In some embodiments, the fasteners are tamper-proof and/or lockable. In some embodiments, the removable lid is watertight and/or the one or more enclosures are watertight. In some embodiments, the removable lid is waterproof and/or the one or more enclosures are waterproof.

In some embodiments, the sub-surface enclosure or enclosures are formed from concrete, polymer concrete, fiberglass reinforced concrete, fiberglass, fiber composite, fiber reinforced plastic, plastic composites, polymeric materials, thermoset plastic, thermoplastic, composite materials, graphene, sheet molding compound, bulk molding compound and combinations thereof. In some embodiments, the subsurface enclosure or enclosures have a removable lid. In some embodiments, the removable lid is releasably attached to the subsurface enclosure or enclosures by engagement of a plurality of releasable fasteners. In some embodiments, the fasteners are tamper-proof and/or lockable. In some embodiments, the subsurface enclosure or enclosures have a removable lid that is watertight and/or the subsurface enclosure or enclosures are watertight. In some embodiments, the subsurface enclosure or enclosures have a removable lid that is waterproof and/or the subsurface enclosure or enclosures are waterproof.

In some embodiments, the subsurface enclosure or enclosures have waterproof penetrations therein to facilitate conduit and external connections entering or exiting the subsurface enclosure. In some embodiments, the external conduit connections provides access for electric cable, telecommunications cable, antenna cable, grounding cable, venting, cooling and other external connections.

In some embodiments, the subsurface enclosure or enclosure houses transmitters, receivers, sensors, computers, small cells, Wi-Fi equipment, rechargeable power, fans, ventilation equipment, cooling equipment, wireless equipment or other electronic equipment. In some embodiments, the subsurface enclosure or enclosures contains racks for the placement, physical support and the integration of transmitters, receivers, sensors, computers, small cells, Wi-Fi equipment, rechargeable power, fans, ventilation equipment, cooling equipment, wireless equipment or other electronic equipment. In some embodiments, the subsurface enclosure or enclosures houses environmental sensors, alarms and monitoring equipment for temperature control, humidity, water level, smoke, hazardous gases and enclosure entry monitoring. In some embodiments, the temperature control equipment is selected from the group consisting of an internal fan, heat dissipation elements, cooling elements, thermoelectric cooling methods and geothermal methods. In some embodiments, the subsurface enclosure or enclosures comprises one or more active or passive air vents through a conduit. In some embodiments, the venting conduit is operably connected to an external at ground inlet grate vent, above ground pedestal, light pole, traffic signal pole, trash container, bench or other above ground structure for venting purposes. In some embodiments, the subsurface enclosure or enclosures houses one or more batteries.

In some embodiments, the system comprises two or more of the subsurface enclosure or enclosures placed next to each other laterally on a pedestrian handicap ramp or walkway. In some embodiments, the subsurface enclosures are laterally connected to each other via conduits connected to the subsurface enclosures at conduit penetration points. In some embodiments, the laterally connected subsurface enclosures and conduit penetration points are waterproof. In some embodiments, the subsurface enclosures are laterally connected by one or more couplings and conduits.

In some embodiments, the subsurface enclosure or enclosures comprises walls containing metal fragments to create an electromagnetic shield for the contents of the container. In some embodiments, the subsurface enclosure or enclosures comprises an electromagnetic shield. In some embodiments, the electromagnetic shield is selected from the group consisting of a steel plate, metal screen, and composite material with metal in the composite. In some embodiments, the subsurface enclosure or enclosures is a vertically elongated tube or canister shape.

In some embodiments, the subsurface enclosure houses at least one antenna. In some embodiments, the systems further comprise one or more integrated antennas. In some embodiments, the systems comprise one or more an antennas external to the multipurpose tactile panel warning apparatus. In some embodiments, the antenna communicates with an antenna external to the multipurpose tactile warning panel apparatus. In some embodiments, the external antennae is located on a light pole, utility pole or other structure external to the tactile warning panel apparatus. In some embodiments, the systems further comprise an antenna, wherein the antenna resides external to the tactile warning panel apparatus and is connected to the electronic components, sensors, computers or rechargeable batteries residing in the multipurpose tactile warning panel apparatus.

In some embodiments, the surface tactile panel is formed from a material that is translucent allowing the transmission of light selected from the group consisting of glass, polycrystalline transparent ceramics, transparent nylons, polyurethane, acrylics, soda-lime-silica glasses, borosilicate glasses, fused silica glasses, lithium disilicate based glass-ceramics, aluminum oxynitride (AlON), magnesium aluminate spinel, single crystal aluminum oxide, magnesium aluminate spinel, single-crystal aluminum oxide, and nanocomposites of yttria and magnesia. In some embodiments, the glass is tempered. In some embodiments, the glass is high strength glass. In some embodiments, the glass is textured for slip resistance. In some embodiments, the surface tactile panel is translucent allowing the transmission of light energy and the load bearing subsurface panel comprises solar cells in combination thereof. In some embodiments, the solar cells are comprised of monocrystalline silicon or derivatives of monocrystalline silicon cells configured in the load bearing subsurface panel. In some embodiments, the load bearing subsurface panel comprising solar cells in combination thereof has a preformed void cavity therein for incorporation of a subsurface antenna. In some embodiments, the load bearing subsurface panel comprising solar cells further comprises an integrated antenna configured horizontally within the load bearing subsurface panel. In some embodiments, an antenna is incorporated into the load bearing subsurface panel comprising solar cells in a horizontal position and resides flush with the surface tactile panel. In some embodiments, the solar cells are comprised of monocrystalline silicon or derivatives of monocrystalline silicon cells configured in the load bearing subsurface panel. In some embodiments, the systems further include a rechargeable power supply wherein the load bearing subsurface panel comprising solar cells is operably connected to the rechargeable power supply. In some embodiments, the systems further comprise a plurality of LEDs, wherein the LEDs are integrated into the load bearing subsurface panel comprising solar cells. In some embodiments, the systems further comprise one or more video panels, wherein the video panels are adjacent to the load bearing subsurface panel comprising solar cells.

In some embodiments, the present invention provides multipurpose tactile warning panel apparatus and systems for placement into or on a pedestrian walkway comprising: a surface tactile panel with a planar surface having thereon a plurality of distinct spatially raised, three dimensional features arranged in a pattern to be detected by tactile sensation; and one or more transmitters, sensors, receivers, electronic equipment, antenna, batteries associated therewith. In some embodiments, the one or more transmitters, receivers, sensors or other electronic equipment are physically integrated with the surface tactile panel. In some embodiments, the one or more molded cavities integrated into the surface tactile panel for the housing of antenna, transmitters, receivers, sensors or other electronic equipment physically integrated with the surface tactile panel. In some embodiments, the one or more transmitters, receivers, sensors or other electronic equipment is located under the surface tactile panel. In some embodiments, the one or more transmitters, receivers, sensors or other electronic equipment are wireless. In some embodiments, the one or more transmitters, receivers, sensors or other electronic equipment are connected by wire. In some embodiments, the transmitters, receivers, sensors or other electronic equipment is selected from the group consisting of but not limited to Small Cells, pCells, Beacons, Blue Tooth, Global Positioning System, Geofencing, Low Power Wide Area Network, Dedicated Short Range Communication, Wi-Fi, batteries or uninterruptible power supply systems. In some embodiments, the antenna, transmitters, sensors, receivers, computers or other electronic equipment is configured to communicate with mobile devices, mobile device applications, wearable devices, machines or other electronic devices.

In some embodiments, the one or more sensors are selected from the group consisting of pressure sensors, sound sensors, temperature sensors, light sensors, water level sensors, humidity sensors, smoke sensors, gas sensors or radiation sensors. In some embodiments, the radiation sensors include the emission or transmission of energy in the form of waves or particles through space or through a material medium such as but not limited to electromagnetic radiation, particle radiation, acoustic radiation and gravitational radiation.

In some embodiments, the apparatus and systems further comprise one or more computer processors. In some embodiments, the one or more computer processors are configured for fog computing in a local distributed cloud of networked computers and processors, fog nodes or local nodes for sensing, data gathering, transmission of data, reporting, calculations, analysis and actions. In some embodiments, the apparatus and systems further comprise one or more routers. In some embodiments, the apparatus and systems further comprise one or more switches.

In some embodiments, the antenna, transmitters, receivers, sensors, computers, other electronic equipment communicate using an antenna external to the multipurpose tactile warning panel apparatus and system. In some embodiments, the external antenna is located on a light pole, utility pole, surfaced mounted on sidewalks or other structure external to the subsurface enclosure. In some embodiments, the external antenna resides external to the multipurpose tactile warning panel apparatus and system and is connected by conduit, cables or other means to the electronic components, sensors, computers and rechargeable batteries residing in the multipurpose tactile warning panel apparatus and system. In some embodiments, the apparatus has an antenna external to the multipurpose tactile warning panel apparatus and system. In some embodiments, the surface tactile panel has an integrated antenna configured horizontally within the surface tactile panel. In some embodiments, the apparatus and systems further comprise one or more antenna in operable electronic communication with the one or more transmitters, receivers, sensors or other electronic equipment. In some embodiments, the transmitters, receivers, sensors or computers processors communicate through an internal antenna incorporated into the tactile warning panel apparatus and system.

In some embodiments, the apparatus and systems further include a power supply, preferably a battery power supply, in operable association with the one or more transmitters, receivers or other electronic equipment. In some embodiments, the power supply has integrated AC/DC converters or power conditioners. In some embodiments, the apparatus and systems further comprise a rechargeable battery power supply in operable association with the one or more transmitters, receivers or other electronic equipment. In some embodiments, the rechargeable battery power supply is selected from the group consisting of lead-acid batteries, nickel cadmium (NiCd) batteries, nickel metal hydride (NiMH) batteries, lithium ion (Li-ion) batteries, lithium ion polymer (Li-ion polymer) batteries, alkaline type batteries or combinations thereof.

In some embodiments, the present invention provides multipurpose tactile warning panel apparatus and systems for placement into or on a pedestrian walkway comprising: a surface tactile panel with a planar surface having thereon a plurality of distinct spatially raised, three dimensional features arranged in a pattern to be detected by tactile sensation; and a lower surface securement plate system having one or more preformed void cavities therein configured to house electronic components selected from the group consisting of transmitters, receivers, rechargeable power supplies, beacons, computer processors, antennae or combinations thereof. In some embodiments, the surface tactile panel is attached to a lower securement plate system. In some embodiments, the lower securement plate is fastened to a generally planar substrate selected from the group consisting of pedestrian walkways, sidewalks, parking lots, transit platforms, transition points to escalators and curb ramps. In some embodiments, the generally planar substrate is formed from a material selected from the group consisting of concrete, concrete mix, metal and asphalt pavement. In some embodiments, the surface tactile panel and the lower securement plate have an environmental sealant there between. In some embodiments, the environmental sealant is a silicone, rubber sealant, or the like to facilitate a waterproof seal between the surface tactile panel and the securement plate.

In some embodiments, the present invention provides a system comprising a network of two or more multipurpose tactile warning panel apparatuses and systems as described anywhere in the description above, the plurality of multipurpose tactile warning panel apparatuses and systems located in pedestrian walkways. In some embodiments, the network of multipurpose tactile warning panel apparatuses and systems are physically laterally adjacent to one another. In some embodiments, the network of multipurpose tactile warning panel apparatuses and systems are connected by subsurface conduit. In some embodiments, the network of multipurpose tactile warning panel apparatuses and systems are in electronic communication with at least one central receiver. In some embodiments, each of the multipurpose tactile warning panel apparatuses and systems within the network are in electronic communication with transmitting or receiving equipment located in conjunction with at least one other multipurpose tactile warning panel apparatus and system in the network. In some embodiments, each of the multipurpose tactile warning panel apparatuses and systems within the network are configured for communication with transmitters or receivers located in vehicles or otherwise external to the multipurpose tactile warning panel apparatuses. In some embodiments, each of the multipurpose tactile warning panel apparatuses and systems within the network are configured for communication with mobile devices. In some embodiments, each of the multipurpose tactile warning panel apparatuses and systems are configured in a grid defined by street intersections.

In some embodiments, the present invention provides methods of providing communication between a tactile warning device and an external transmitter or receiver for the purpose of sending or receiving a signal to or from the multipurpose tactile warning panel apparatus and system as described anywhere in the foregoing description and an external transmitter or receiver.

BRIEF DESCRIPTION OF THE DRAWINGS

For a better understanding of the present invention, reference may be made to the accompanying drawings.

DEFINITIONS

Figure 1B:
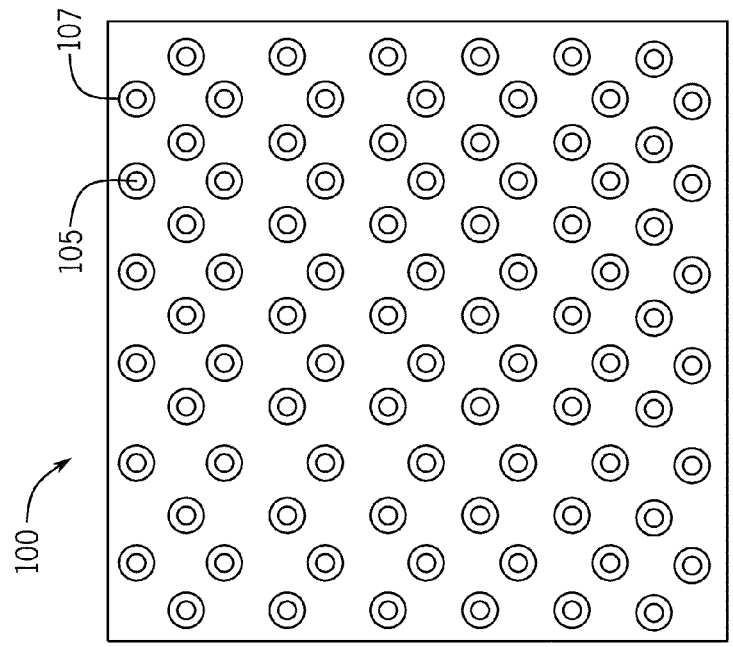
FIG. 1B shows a tactile warning panel "attention pattern" showing the truncated domes or cones diagonal at 45° to the principal direction of travel.

To facilitate an understanding of the present technology, a number of terms and phrases are defined below. Additional definitions are set forth throughout the detailed description.

"Accessible" as used herein, refers to a facility in the public or private right of way that is approachable and usable by persons with disabilities.

"Antenna" or "Antennae" as used herein, refers to an electrical device which converts electric power into radio waves, and vice versa. They are typically associated with transmitters or receivers also referred to as radios.

"Attention Pattern" as used herein, refers to a tactile warning panel design calling attention to a hazard, or to hazards and decision points. Attention patterns can be installed in the vicinity of pedestrian crossings, at-grade curbs, railway platforms, stairs, ramps, escalators, travelators, elevators, etc.

"Decision Point" as used herein, refers to an intersection or change in direction along a path of travel defined by a tactile warning panel.

"Double L-Channel" is used herein, refers to the frame or mold in the ground substrate composed of concrete or suitable material that has two (2) channels in a configuration resembling two steps.

"DSRC" is used herein, refers to dedicated short range communication.

"Electronic Equipment" as used herein, refers to all computers, transmitters, receivers, servers, sensors, circuit boards, circuitry, processors, fog nodes, fog computers, electronic display devices, and all devices that contain circuitry consisting primarily or exclusively of active semiconductors supplemented with passive elements; such a circuit is described as an electronic circuit.

"Fog Nodes" as used herein, refers to one or a collaborative multitude of end-user clients or near-user edge devices that carry out a substantial amount of storage and computation tasks rather than with data stored and computation tasks taking place primarily in cloud data centers.

"Fog Computing" as used herein, is an architecture that uses one or a collaborative multitude of end-user clients or near-user edge devices (Fog Nodes) to carry out a substantial amount of storage and computation tasks rather than using data stored and computation tasks taking place primarily in cloud data centers.

"Graphic Design" as used herein, refers to a product of graphic art including text and/or graphics, communicating an effective message or pleasing design, including but not limited to logos, advertising, branding, promotion, pictures, graphics, posters, signs and any other types of visual communication. The graphic design preferably comprises selected and arranged visual elements—for example, typography, images, symbols, and colors—that convey a message to an audience or create an effect.

"Guiding Pattern" as used herein, refers to a tactile warning panel design indicating a direction of travel or a landmark.

"Hazard" as used herein, refers to any area or element in, or adjacent to, a direction of travel, which may place people at risk of injury.

"Load Bearing" as used herein, refers to the strength or physical characteristics of a product that can withstand a minimum of five (5) ton test load up to and exceeding a sixty (60) ton test load without support from the ground substrate, such as concrete, directly under the product.

"Load Bearing Subsurface Base Panel" as used herein, refers to a non-tactile panel or smooth surface panel that can withstand a minimum of five (5) ton test load up to and exceeding a sixty (60) ton test load without support from the ground substrate, such as concrete, directly under the subsurface base panel.

"Load Bearing Surface Tactile Panel" as used herein, refers to a tactile warning panel with tactile surface profiles molded into the panel that can withstand a minimum of five (5) ton test load up to and exceeding a sixty (60) ton test load without support from the ground substrate, such as concrete, directly under the surface tactile panel.

"Non-Load Bearing" as used herein, refers to the strength or physical characteristics of a non-traffic rated product that cannot withstand greater than a 1,000-pound test load without support from the ground substrate, such as concrete, directly under the product.

"Machine-to-Machine" (M2M) as used herein, refers to direct communication between devices using any communications channel, including wired and wireless.

"pCells" as used herein, is a Distributed Input/Distributed Output (DIDO) mobile wireless technology.

"Pedestrian Walkway" as used herein, refers to a path designed for pedestrian use, such as a passage for walking, a path set aside for walking, a passage or path connecting buildings, or a passage or path, especially one which is covered or raised above the ground. The term "pedestrian walkway" encompasses the following: sidewalks or pavement, footpath, footway, shared-use path, pathway, multi-use path, curb ramps, stairs, ramps, passageways, segregated footway, blended transitions, platform, footbridges, stiles, tunnels, walkways, pedestrian lanes, pedestrian accessible route, pedestrian street crossing, alternate pedestrian access route, alternate pedestrian walkway, temporary pedestrian walkway, pedestrian overcrossing, pedestrian undercrossing, pedestrian overpass, escalators, travelators, crosswalk, moving walkway, transit platforms, sky bridge and the like.

"Pedestrian Access Route" as used herein, refers to a continuous and unobstructed path of travel provided for pedestrians with disabilities within or coinciding with a pedestrian circulation path in the public right-of-way. Pedestrian access routes in the public right-of-way ensure that the transportation network used by pedestrians is accessible to pedestrians with disabilities.

"Sensors" as used herein, refer to electronic devices that are employed to measure, record and report a plethora of static and dynamic data characterizing events, conditions and objects. For example, but not limited to temperature, compression from walking, counting people, counting vehicles, measuring vehicular speed, characterizing sounds, light, and airborne chemicals.

"Small Cells" as used herein, to refer to low-powered radio access nodes that operate in licensed and unlicensed spectrum. They are "small" compared to a mobile macro cells because of their range; 10 meters to 2 kilometers as compared with a range that can exceed ten (10) kilometers. They are being deployed by wireless carriers for offloading mobile data as a more efficient use of radio spectrum. Small cells are a vital element to 3, 4 and 5G data offloading. They are viewed as vital to managing LTE Advanced spectrum more efficiently than macro cells.

"Smart city" as used herein, to refer to a city that incorporates the application of electronic sensors, transmitters, receivers, fog nodes, fog computing, small cells, computers, antennae, applications of smart phones and other M2M technologies to increase safety, efficiency, congestion, reduce pollution and generally improve the quality of life of its citizens.

"Smart Transportation" as used herein, to refer to the use of computers, transmitters, receivers, antennae, fog nodes, fog computing, DSRC, roadside units and combinations thereof to make transportation more accessible, efficient and safe.

"Subsurface Enclosure" as used herein, refers to the enclosure under the surface tactile panel that houses electronic equipment.

"Surface Tactile Panel" as used herein, refers to an upper surface panel with a planar surface having thereon a plurality of distinct spatially raised, three dimensional features arranged in a pattern to be detected by tactile sensation.

"TWPA" is used as the acronym for tactile warning panel apparatus and system.

"Tactile Walking Surface Indicator" as used herein, refers to a standardized walking surface used for information by blind or vision-impaired persons.

"Thermoelectric Cooling" as used herein, refers to technology that uses the Peltier effect to create a heat flux between the junction of two different types of materials.

"Truncated Domes or Cones" as used herein, refers to a type of attention pattern also referred to as flat-topped domes or cones.

"Wayfinding" as used herein, encompasses all the ways in which people orient themselves in physical space and navigate from place to place. In urban planning, it is a consistent use and organization of definite sensory cues (tactile elements and provision for special-needs users) from the external environment.

DETAILED DESCRIPTION OF THE PREFERRED EMBODIMENT

Tactile warning panels, such as those incorporated into the surface tactile panel of the TWPA of the present invention, are widely used in many developed and some developing countries to provide wayfinding information to pedestrians who are visually impaired. Tactile warning panels are also used to alert people with visual impairments when they are approaching a hazard such as the edge of a platform, a flight of stairs, an escalator or the end of the pavement and the beginning of the street. Tactile warning panels should be readily detectable and distinguishable from the surrounding or adjacent surfaces by visually impaired people. They are used for both indoor, as well as, outdoor locations. By providing tactile information for safety and wayfinding, tactile warning panels improve the confidence, independence and quality of life for people who are visually impaired. This is achieved by enabling them to participate in employment, social, recreational, educational, cultural and religious activities.

There are other systems and devices for providing wayfinding and safety information to people who are visually impaired. These include accessible signals that use sound or vibration to provide information for crossing at pedestrian traffic lights. Such electronic systems can complement, but do not replace, the requirement for tactual information.

Among their advantages, tactile warning panels can lead users precisely to a destination, can be used to provide information both indoors and outdoors, do not require electric power and do not require users to purchase or maintain any special equipment. Tactile warning panels were originally developed in 1965 by Seiichi Miyake who lived in Japan. Two generic texture patterns are used for tactile warning panels ("attention patterns" and "guiding patterns"). The usage of these tactile warning panel patterns differs somewhat from country to country. Over the years, extensive research in various countries has established that both "attention patterns" (truncated domes or cones) and "guiding patterns" (raised bars) are highly detectable when used in association with typical walking surfaces, and that they are distinguishable from each other. Since 1965, tactile warning panel surface textures have been modified, and systems of installation vary worldwide, not only amongst countries, but also within countries. Multiple patterns, sizes, colors and specifications of materials and systems for installations can now be found. However, consistency is important when providing tactile information for people who are visually impaired. Each country may have some unique aspects but in general terms the tactile warning panels do have many similar characteristics. International Standards have evolved (ISO 23599, 03/01/12). The scope of this standard says that "it is not intended to replace requirements and recommendations contained in . . . national standards, regulations and guidelines". However, "national design standards provide for high-quality products taking into account different physical, climatic and social situations of each country, as well as, provide consistent tactile warning panel systems within a country". The ISO standard permits differences in parameters such as shapes, dimensions, arrangements, formula of the luminance and method of installation. This is to give flexibility when considering different national circumstances.

Figure 1A:
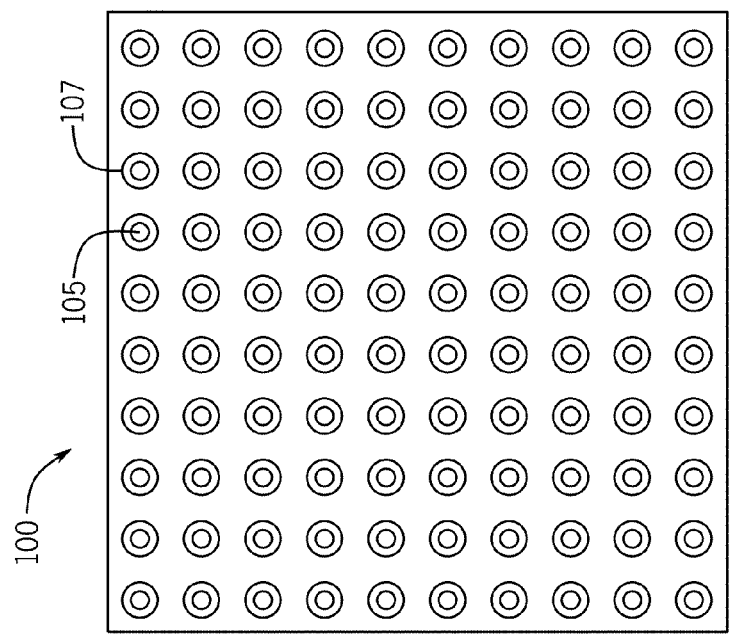
FIG. 1A shows a tactile warning panel "attention pattern" showing the truncated domes or cones parallel to the principal direction of travel.

In the preferred embodiments of the present invention, the "attention pattern" comprises truncated domes or cones (also commonly referred to as: detectable warning system, detectable warnings, detectable warning surface, detectable warning panel, tactile warning surfaces, raised tactile profiles, tactile tile, tactile detectable warnings, tactile warning surface, tactile, truncated domes, truncated dome surface, embedment tile device, Braille blocks, blister paver, attention pattern), and is used primarily to indicate hazards, decision points or destination facilities. A decision point may be at an intersection or at a change in direction along a guided path. The "attention pattern" is arranged in a square grid, parallel or diagonal at 45 degrees to the principal direction of travel. FIG. 1A shows an "attention pattern" panel 100 with a square or inline grid. The "attention pattern" panel 100 is preferably parallel to principal direction of pedestrian travel. The truncated domes or cones are rounded/conical dome structures 107 protruding upward from the surface of the substrate panel. The top area 105 of the truncated domes or cones is a flat surface. FIG. 1B shows an "attention pattern" panel 100 with truncated domes or cones diagonal at 45 degrees to principal direction of pedestrian travel. The truncated domes or cones are rounded/conical dome structures 107 protruding upward from the surface of the substrate panel. The top area 105 of the truncated domes or cones is a flat surface. The spacing and size of the domes varies depending on specific country, government or local municipality specifications. As an example, although not all inclusive, the International Standards (ISO 23599) state that the height of the truncated domes or cones is preferably 4 mm to 5 mm. The top diameter of truncated domes or cones preferably range from 12 mm to 25 mm, and the bottom diameter of truncated domes or cones is preferably (10±1) mm greater than the top diameter. The spacing refers to the shortest distance between the centers of two adjacent truncated domes or cones which may be parallel or diagonal at 45 degrees to the direction of travel. The spacing is preferably within the ranges shown in relation to the top diameter in Table 1—Top diameter and corresponding spacing of truncated domes or cones. The tolerance of the top diameter is preferably ±1 mm.

TABLE 1

| Top Diameter of Truncated Domes or Cones Mm | Spacing mm |
|---|---|
| 12 | 42 to 61 |
| 15 | 45 to 63 |
| 18 | 48 to 65 |
| 20 | 50 to 68 |
| 25 | 55 to 70 |

These truncated dome panels can be any color as long as the color contrasts to the surrounding concrete, asphalt pavement or other material in which they are installed. Common colors are red, yellow, black, brown, patina, grey, and white. "Attention patterns" may be installed in the vicinity of pedestrian crossings, at-grade curb ramps, railway platforms, stairs, ramps, escalators, travelators, elevators, etc.

Figure 2A:
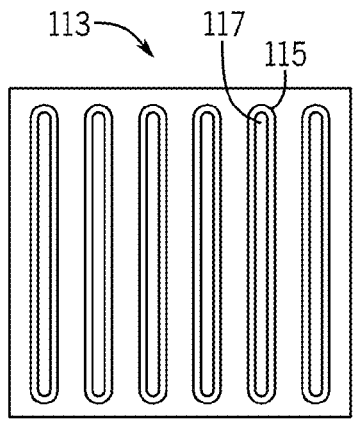
FIG. 2A shows a tactile warning "guiding pattern" with a flat-topped elongated oval bars pattern.
Figure 2B:
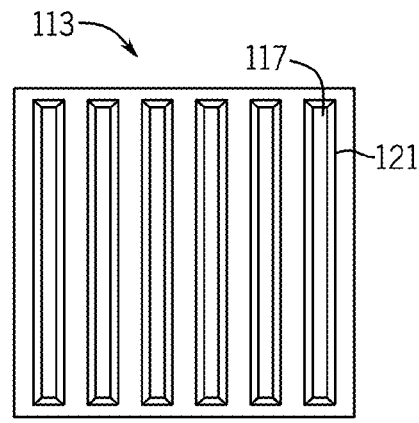
FIG. 2B shows a tactile warning panel "guiding pattern" with a flat-topped elongated rectangle bars pattern.
Figure 2C:
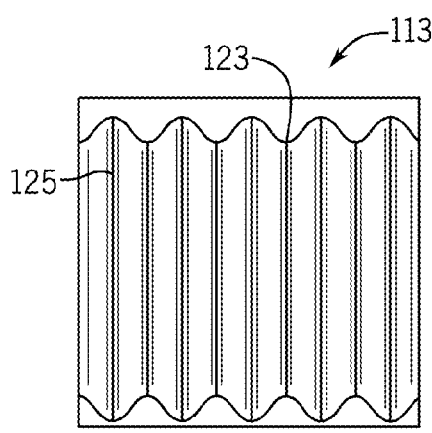
FIG. 2C shows a tactile warning panel "guiding pattern" with a sinusoidal ribs pattern.
Figure 2D:
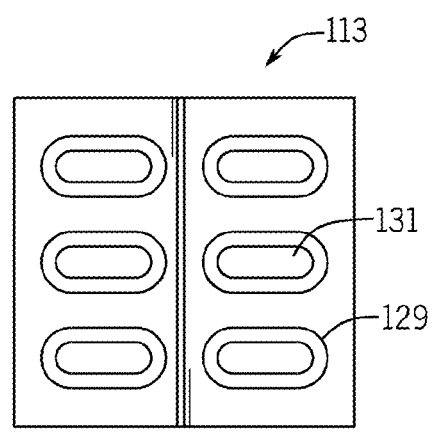
FIG. 2D shows a tactile warning panel "guiding pattern" with a flat-topped elongated oval rib pattern.

The "guiding pattern" comprises raised bars (also commonly referred to as: elongated bars, directional blocks, elongated oval bars, elongated oval ribs, elongated rectangle bars, thin linear protrusions, raised ovals, sinusoidal ribs, sinusoidal, ribbed tile, guiding pattern), and is used to guide visually impaired pedestrians to places such as pedestrian crossings, entrances to buildings, lifts and other amenities. Different designs have been developed for "guiding patterns" although flat-topped elongated bars are the most common. FIG. 2A is a "guiding pattern" substrate 113 with elongated oval bars. The elongated oval bars have a rounded top edge 115 and a flat-top 117. FIG. 2B shows a "guiding pattern" substrate 113 with elongated rectangle bars. The elongated rectangle bars have a rounded top edge 121 and a flat-top 117. FIG. 2C is a "guiding pattern" substrate 113 with a sinusoidal ribs design. The sinusoidal rib has a high ridge 125 and a low valley point 123. Sinusoidal patterns are less easily damaged by snow plows than flat-topped bars. FIG. 2D is a "guiding pattern" substrate 113 with an elongated oval ribs design. The elongated oval ribs have a rounded top edge 129 and a flat-top 131. These raised bars in most cases run parallel to the direction of pedestrian travel. The spacing and size of the raised bars varies depending on specific country, government or local municipality specifications. As an example, the International Standards (ISO 23599) state that the height of the flat-topped elongated bars is preferably 4 mm to 5 mm. The top width of flat-topped elongated bars preferably range from 17 mm to 30 mm. The bottom width is preferably (10±1) mm wider that the top. The spacing refers to the distance between the axes of adjacent flat-topped elongated bars. The distance is preferably in relation to the top width, as shown in Table 2—Top width and corresponding spacing of axes of flat-topped elongated bars. The tolerance of the top width is preferably ±1 mm.

TABLE 2

| Top Width of Flat-Topped Elongated Bars Mm | Spacing Mm |
|---|---|
| 17 | 57 to 78 |
| 20 | 60 to 80 |
| 25 | 65 to 83 |
| 30 | 70 to 85 |

The top length of flat-topped elongated bars is preferably more than 270 mm and the bottom length is preferably (10±1) mm longer than the top. The distance between the ends of flat-topped elongated bars should be no more than 30 mm. The International Standards (ISO 23599) state that the difference in level between the wave crest and the wave trough of sinusoidal rib patterns is preferably 4 mm to 5 mm. The distance between the axes of two adjacent wave crests of sinusoidal rib patterns is preferably 40 mm to 52 mm. The length of the sinusoidal ribs should be at least 270 mm. The flat-elongated bars or sinusoidal ribs can be any color as long as the color contrasts to the surrounding concrete or pavement.

"Guiding patterns" may be used alone or in combination with "attention patterns" to indicate the walking route from one place to another. Truncated domes or cones and elongated bars or sinusoidal ribs preferably have beveled or rounded edges to decrease the likelihood of tripping and to enhance safety and negotiability for people with mobility impairments.

In the United States these tactile warning panel products for the visually impaired are called detectable warnings or truncated domes (detectable warning surfaces/panels). Detectable warnings were required in 1991 by the Americans with Disabilities Act (ADA). The ADA recognizes and protects the civil rights of people with disabilities and is modeled after earlier landmark laws prohibiting discrimination based on race and gender. The ADA mandated that many municipalities, governmental bodies, commercial/public buildings, shopping centers, transit platforms, loading docks, etc. utilize detectable warning panels. The detectable warning panel is a distinctive surface pattern of domes (three-dimensional substrate) detectable by cane or underfoot and is used to alert people with visual impairments of their approach to streets and hazardous drop-offs. The visually impaired rely on a combination of visual cues (color contrast), tactile cues (sweeping cane, sole of shoes, wheelchairs and walker wheels) and audio cues (sound) to identify these hazardous areas. Table 3 shows some of the significant ADA Guideline documents for public right-of-way, state and local government facilities and commercial facilities.

TABLE 3

| Description | Date | Section | Subject |
|---|---|---|---|
| U.S. Access Board - Proposed Accessibility Guidelines for Pedestrian Facilities in the Public Right-of-Way | Jul. 26, 2011 | 36 CFR Part 1190 Sections R208 & R305 - Detectable Warning Surfaces | Where They are Required, General, Truncated Domes, Dome Size, Dome Spacing and Color Contrast |
| Department of Justice - 2010 ADA Standards for State and Local Government Facilities: Title II | Sep. 15, 2010 | Regulations at 28 CFR 35.151 & the 2004 ADAAG at 36 CFR part 1191, appendices B and D | Where They are Required, General, Dome Size, Dome Spacing, Color Contrast and Platform Edges |
| Department of Justice - 2010 Standards for Public Accommodations and Commercial Facilities: Title III | Sep. 15, 2010 | Regulations at 28 CFR part 36, subpart D; and the 2004 ADAAG at 36 CFR part 1191, appendices B and D | Where They are Required, General, Dome Size, Dome Spacing, Color Contrast and Platform Edges |
| Department of Transportation | Nov. 29, 2006 | Regulations at 49 CFR part 37 | Detectable Warning Requirements |

To ensure that buildings and facilities are accessible to and usable by people with disabilities, the ADA also establishes accessibility requirements for state and local government facilities, places of accommodation, and commercial facilities. Under the ADA, the U.S. Access Board has developed and continues to maintain design guidelines for accessible buildings and facilities known as The Americans with Disabilities Accessibility Guidelines (ADAAG). The ADAAG develops/defines certain types of rules/applications for detectable warnings where pedestrian ways blend with vehicular ways (hazardous vehicular areas) including curb ramps, pedestrian crossings, transit facilities, commercial applications (hotels, restaurants and retail stores), parking lots/structures, stairways, escalator approaches and accessible building routes.

The ADAAG 2010 ADA Standards for Accessible Design state that detectable warnings preferably consist of a surface of truncated domes. The ADA standards for these truncated domes in a detectable warning surface preferably have a base diameter of 0.9 inch minimum and 1.4 inches maximum, a top diameter of 50 percent of the base diameter minimum to 65 percent of the base diameter maximum, and a height of 0.2 inch. Truncated domes in a detectable warning surface preferably have a center-to-center spacing of 1.6 inches minimum and 2.4 inches maximum, and a base to base spacing of 0.65 inch minimum, measured between the most adjacent domes on a square grid.

Figure 3A:
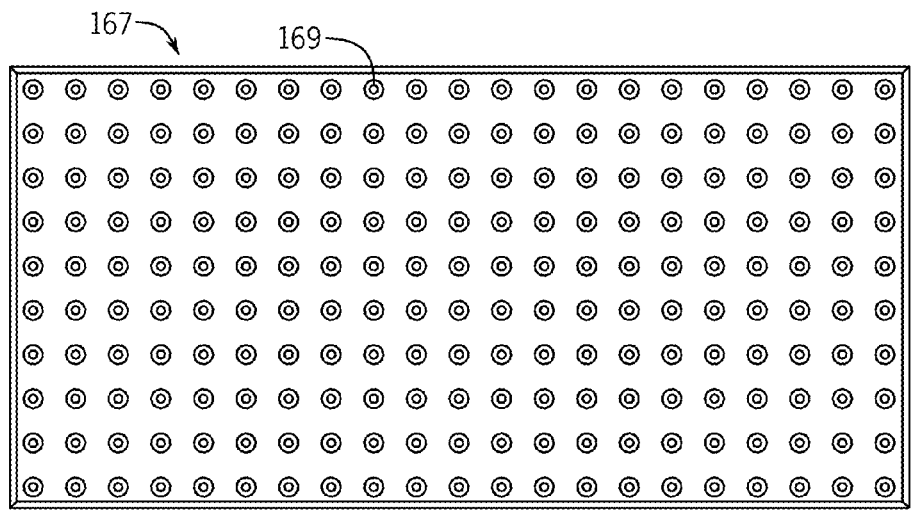
FIG. 3A shows a top view of a plastic composite surface mount detectable warning panel
Figure 3B:
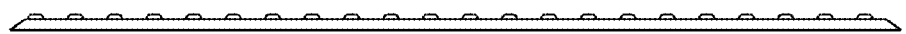
FIG. 3B shows a side view of a plastic composite surface mount detectable warning panel with an inline dome attention pattern.
Figure 3C:
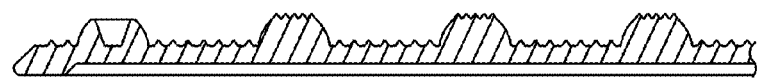
FIG. 3C shows a close-up detailed side view showing the molded texture pattern of a plastic composite surface mount detectable warning panel with an inline dome attention pattern.
Figure 3D:
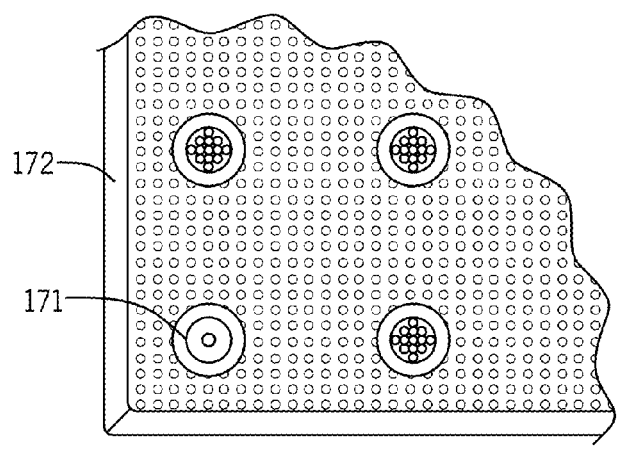
FIG. 3D shows a close-up view of a plastic composite detectable warning panel; with an inline dome attention pattern.

Multiple companies manufacture and sell ADA compliant tactile warning panels in the United States. The detectable warning panel substrate material types include steel, stainless steel, aluminum, metal, cast iron, ductile iron, ceramic, concrete, HDPE, plastic, plastic composite, vitrified polymer composite, herculite polymer composite, nylon 6, nylon 6/6, fiberglass, rubber, fiber reinforced plastic, PVC, Poly, sheet molding compound, thermoset plastics, thermoplastics, rubber, other fibrous materials and the like. In addition, the panel substrates come in different panel designs depending on the tactile warning panel specifications, as well as, installation requirements in the field. These designs include cast in place, upgradeable, replaceable, overlay, surface mount, surface applied, retrofit, radius sections and the like. FIG. 3A shows a plan view 167 of a plastic composite ADA compliant surface mount detectable warning panel with an inline dome attention pattern. The truncated dome on the ADA compliant surface mount detectable warning panel is shown as 169. FIG. 3B is a side view of this panel. FIG. 3C is a cut-away view of this panel which shows the truncated domes and the micro texturing which is molded into the panel to provide the necessary slip resistance. FIG. 3D shows the holes 171 in the panel for the fasteners to secure the panel to the load bearing subsurface panel, concrete, asphalt pavement or another ground surface substrate. This surface mount panel also has a sloped angle 172 on the perimeter of the panel so that it does not create a trip hazard and to provide the necessary strength to the plastic substrate. Manufacturers of detectable warning panels provide them in a variety of solid colors as specified by their customers (states, municipalities, transit companies, engineers, architects and corporate). The most popular colors used in the United States are federal yellow and brick red. Typically, these panels come in various sizes with the most widely used sizes being 2'×2', 2'×3', 2'×4' or 2'×5'.

Real estate in metropolitan areas is expensive to secure. The physical location where tactile warning panels are installed on public right-of-way becomes more valuable when multifunctional capabilities are added. This valuable real estate goes beyond street intersections in cities, they extend to other locations as well, including: pedestrian walkways; transit platforms, transit stations, subways and bus stops; the front entrance of retailers where the pedestrian walkway transitions into the parking lot; airports, hospitals, convention centers, sports stadiums, universities, government buildings, theme parks, commercial buildings, restaurants, etc.

Figure 4:
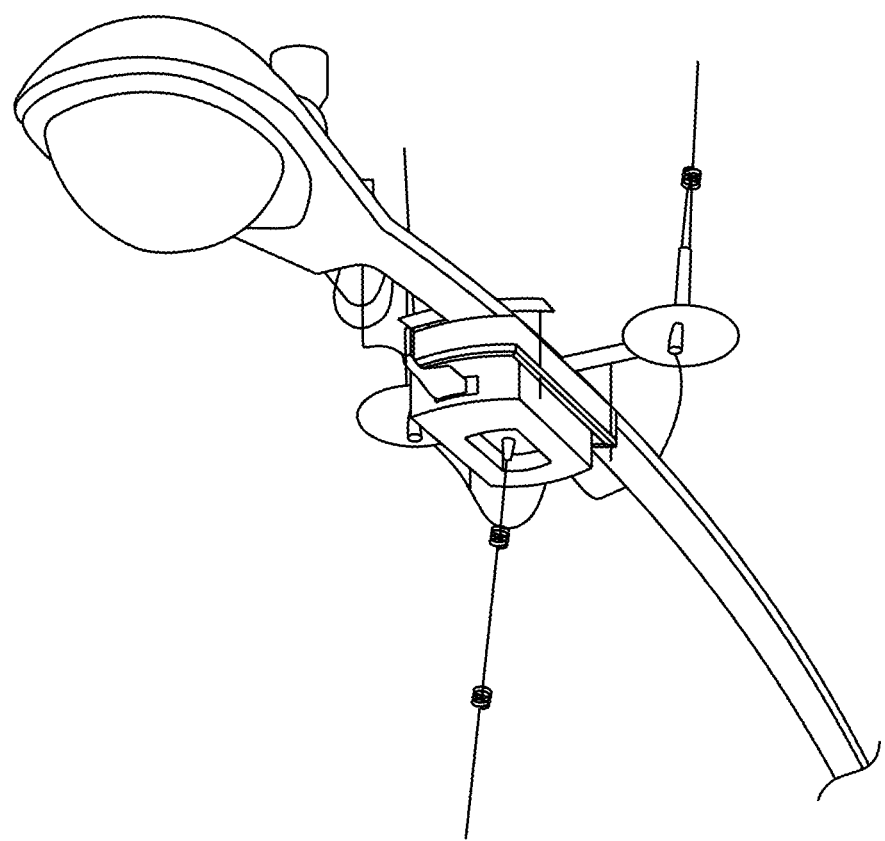
FIG. 4 is a depiction of prior art sensors, antenna and transmitters mounted on a light pole.

Many smart city service providers are looking for a consistent, scalable footprint in major cities around the world. They are looking to build a platform to connect disparate sensors deployed throughout a city. With wireless communications growing in popularity, the need to place antennae and small cells for sending and receiving communications signals of all types is growing. FIG. 4 depicts a transmitter, receiver and antenna attached to a light post or light pole. This FIG. 4 illustrates the problem cities are facing with the growing demand for locations to attach and install smart city technology in the city right-of-way. These electronic equipment "add-ons" to light and utility poles is unsightly, provides clutter to the cityscape, as well as, is vulnerable to vandals, criminals and other nefarious intents. In addition, in most cases these light and utility poles are not designed to handle the additional weight requirements of this electronic equipment.

The present invention enables a far more secure solution for the placement of electronic equipment or antennae than current alternatives. The TWPA located at city street intersections also offers cities the opportunity to establish a near ubiquitous and integrated footprint for the processing and communications of local data for "Fog Computing" to support local M2M and IoT functions such as vehicular to pedestrian, vehicular to vehicle, vehicular to infrastructure communications and other smart city applications and functions.

The present invention TWPA greatly expands the utility of the traditional tactile warning panels typically located at pedestrian walkways, transportation ramps, or other locations where pedestrians gather or walk. The utility of these panels is greatly expanded by the present invention by layering and integrating a tactile warning panel, a load bearing surface tactile panel, a load bearing subsurface base panel, a subsurface enclosure and other TWPA components that enable the unobtrusive placement of smart city technology including wireless connectivity by incorporating or integrating sensors and the wireless sending or receiving devices both internal and external to the TWPA. Sensors contained in the TWPA provide a multitude of M2M functions including but not limited to enhanced visual and electronic cues from locations on sidewalks, intersections, transit platforms, parking lots and all other locations requiring ADA compliant tactile warning panels. Another embodiment contains integrated solar panels and batteries to power electronic components operating within the TWPA independent of the power grid.

An embodiment of the TWPA is the integration of structural components that enable the delivery of smart city functionality in a secure, hardened, fully integrated and self-contained apparatus that protects functionality against vandalism, criminal activity, terrorists and other nefarious activity. In the alternative embodiments, metal components, metal screening and metal substances in the composite materials making up the subsurface enclosure provides shielding from electromagnetic interference. In further embodiments, tamper resistant bolts, flush mounting and the placement of the TWPA in a concrete substrate provides further security from vandalism, criminal activity, terrorists and other nefarious activity.

Accordingly, the present invention relates to tactile warning panels, and in particular to a TWPA that is designed and built to enable space underneath tactile warning panels for the placement of smart city technology for connected multifunctional capabilities. These capabilities include communications or energy technology that creates a novel and fully integrated, connected and intelligent multifunction apparatus to support smart city technology deployment and, M2M and other communications needs nested within a secure subsurface enclosure.

The present invention expands the capability of tactile warning panels beyond tactile and visual warnings to the visually impaired, as well as, serving as a new media for displaying high quality full color graphical images (U.S. Pat. No. 9,311,831 B2 and U.S. Pat. No. 9,361,816 B2).

Communications and energy technologies that are integrated in the apparatus of the present invention include, but are not limited to, Beacons, Blue Tooth, Global Positioning Systems (GPS), Geofencing, Low Power Wide Area Network (LPWAN), Dedicated Short Range Communication (DSRC), WiFi, sensors, small cells, augmented reality, solar power, LED lighting, HD video, rechargeable batteries, battery backup, AC/DC conversion, electric power conditioning or combinations thereof.

In alternative embodiments, security against vandalism and other unwanted destruction of the TWPA is provided by its placement in concrete and with hardened external surfaces. Security against electromagnetic interference or destructive pulses is provided by a combination of internal steel panels, wire meshing and incorporation of metal particles in the composite material in the walls of the subsurface enclosure. The present invention adds further value to the ADA compliant tactile warning panels by greatly increasing the functionality of the panel and its ADA required footprint at street corners and intersections. Added functionality of the present invention addresses a multitude of challenges cities face due to population growth and aging infrastructure.

Currently, about half of the world's population is living in urban areas. It is estimated that by 2050, 66% of the global population will live in urban areas. This equates to an estimated 6.4 billion people, a sharp increase from the 3.9 billion people who inhabit cities today. This rapid urban growth over the next 35 years will pose several challenges including congestion, inadequate infrastructure, public safety and energy management just to name a few. Governments at the city, state, and federal levels confront a similar dilemma worldwide, how to meet increased citizen expectations in the face of reduced or flat budgets. This challenge contributes to an increasing gap between citizen expectations and what government can actually deliver. An emerging community of civic leaders and companies are joining forces to build "smart cities". Smart cities are communities that are building an infrastructure to continuously improve the collection, aggregation, and use of data to improve the life of their residents by harnessing the growing data revolution, low-cost sensors, and research collaborations, and doing so securely to protect safety and privacy.

With these limited resources, municipal leaders are looking to advances in technology to help solve these problems. More than perhaps any technological advance since the dawn of the internet, the Internet of Everything (IoE), the networked connection of people, process, data, and things, holds tremendous potential for helping public-sector leaders address their many challenges and make their communities more efficient and safer. Applications are targeted to unleash spare capacity, cut out peaks, implement small-scale thinking and foster people-centered innovation. Technology convergence and advancements have propelled robustly interconnected systems, ubiquitous data capture and the increased availability and importance of big data. The IoE Economy is about enabling people to be more productive and effective, make better decisions, and enjoy a better quality of life.

The tremendous worldwide growth of smartphones has enhanced the drive for intelligent connectivity. In 2013, 3.4 billion people, or 50% of the global population, are active users of mobile data services. In 2020, 4.3 billion people are projected to use smartphones. It is also projected that mobile service usage rates will continue to accelerate with traffic growth rates of 61% through 2018. The Internet of Everything (IoE) is likely to continue increasing at an exponential rate of growth. Approximately 99.4% of objects that will likely be part of the IoE, are still unconnected. In addition, it is estimated that 50 billion things will be connected to the Internet by 2020 with major growth coming from the field of Machine-to-Machine (M2M) communication. Key to the actualization of M2M functionality will be the placement and data collection from a large multitude of sensors.

As M2M technologies mature and proliferate, so will the need for M2M communication in an exploding array of applications from smart-cars to smartphone applications (apps) that warn of hazards like walking off a curb into traffic. LPWANS and DSRC are emerging as viable technologies and offer advantages over the cellular networks and Wi-Fi for M2M communication.

Figure 5:
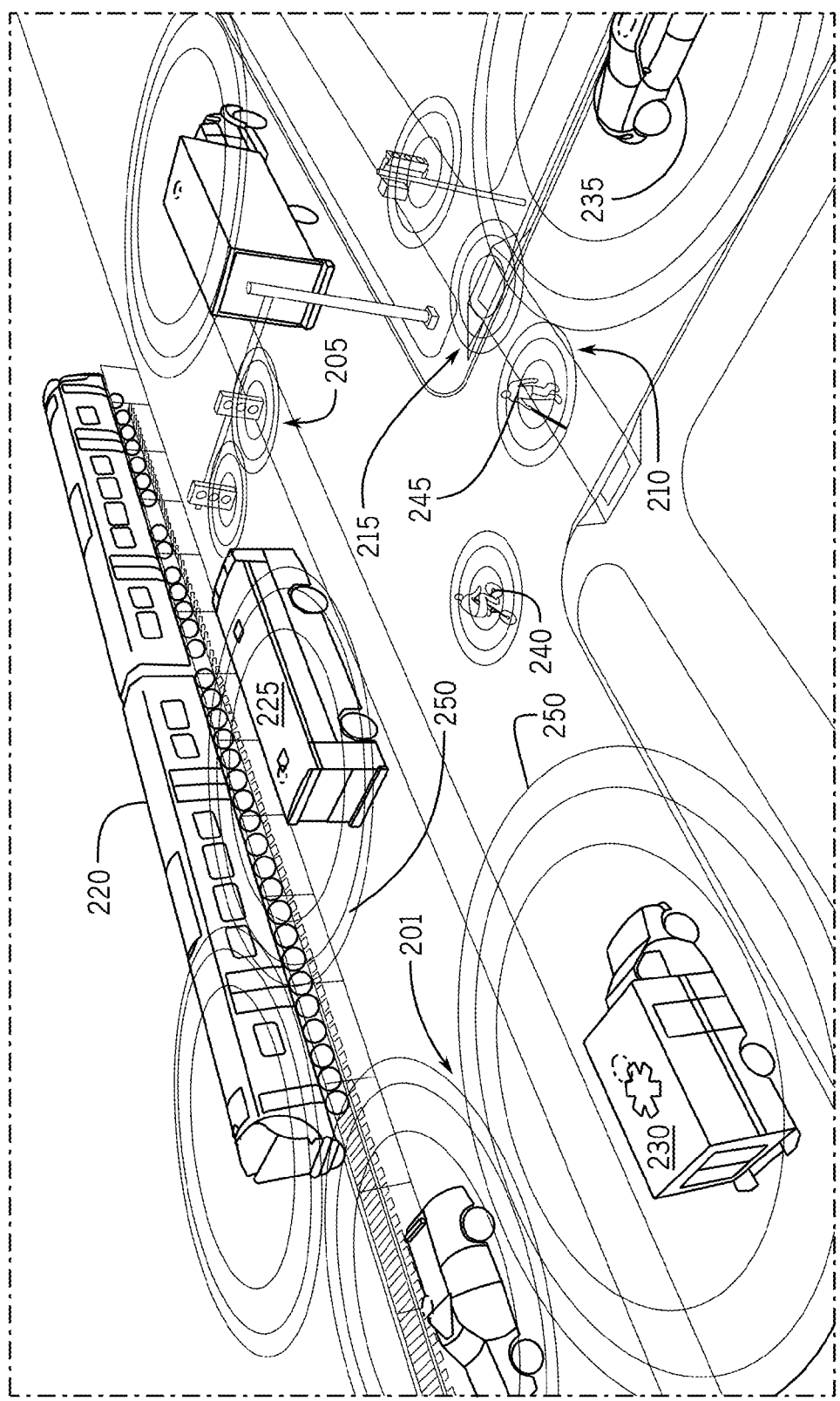
FIG. 5 is a depiction of the integration of the present invention into a network of communicating devices in a smart city environment.
Figure 6:
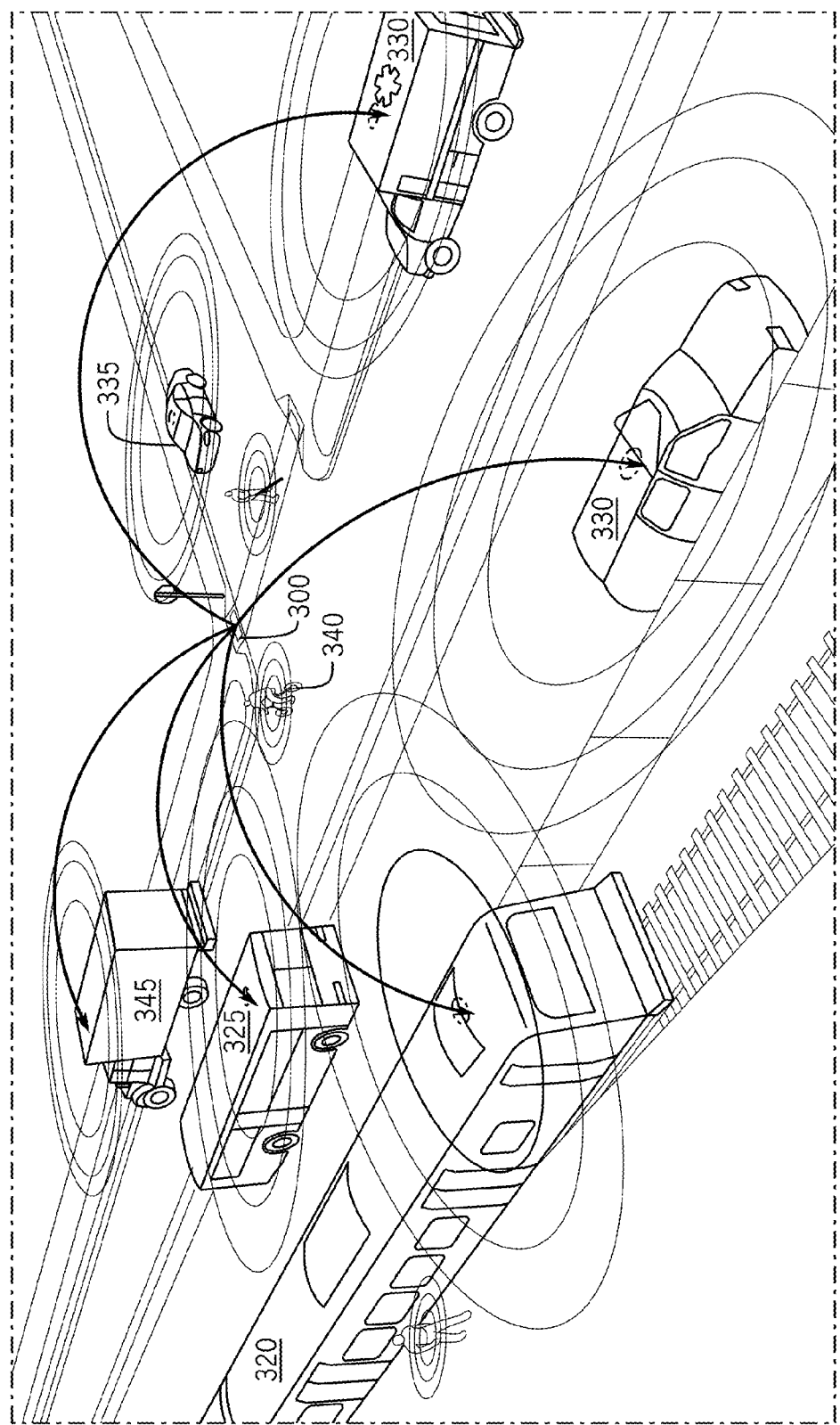
FIG. 6 is a depiction of wireless communication between the present invention and pedestrians and motor vehicles.
Figure 7:
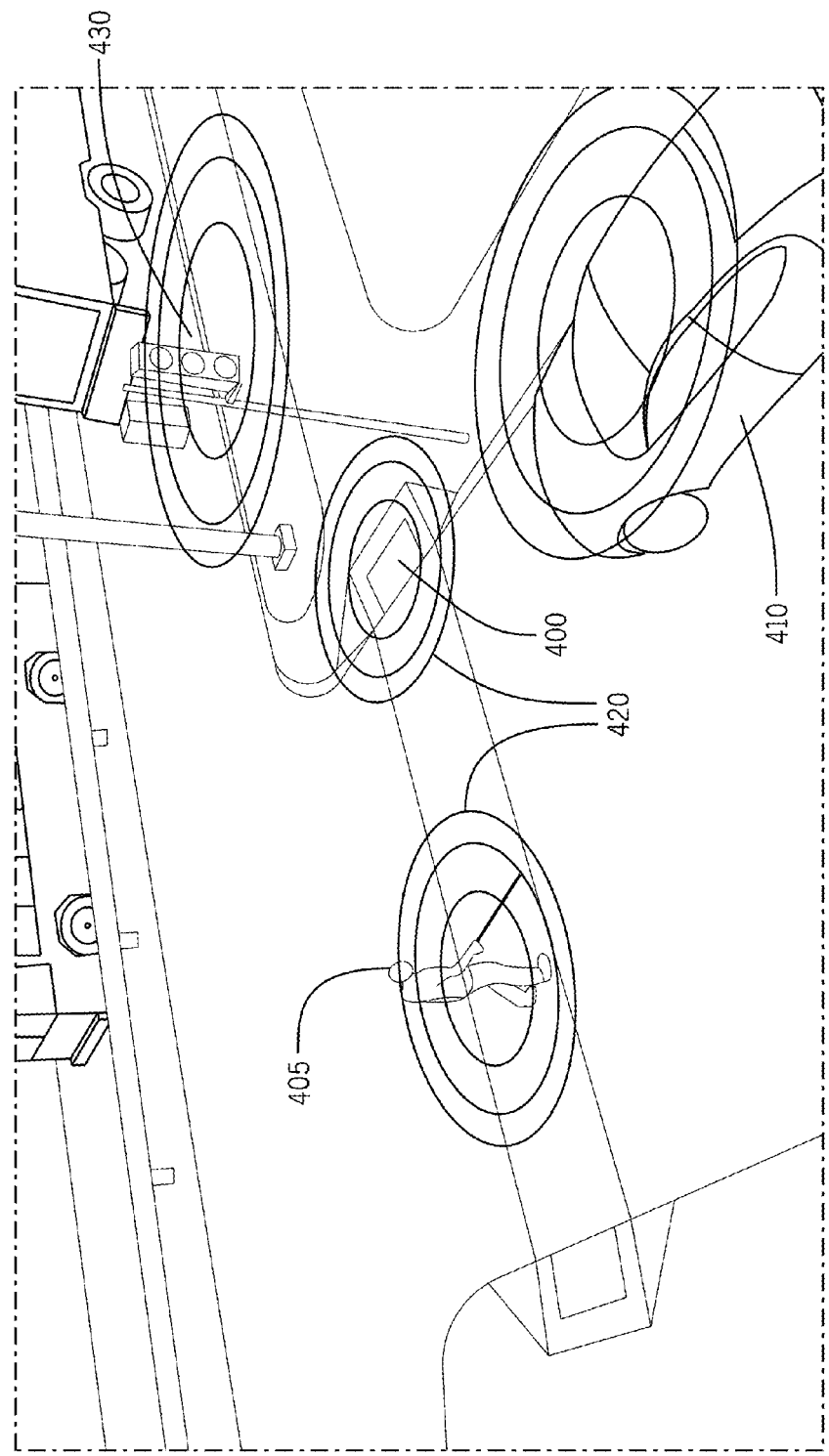
FIG. 7 is a depiction of use of the present invention to wirelessly communicate the surrounding environment to assist a visually impaired individual as they navigate in an urban environment.
Figure 8:
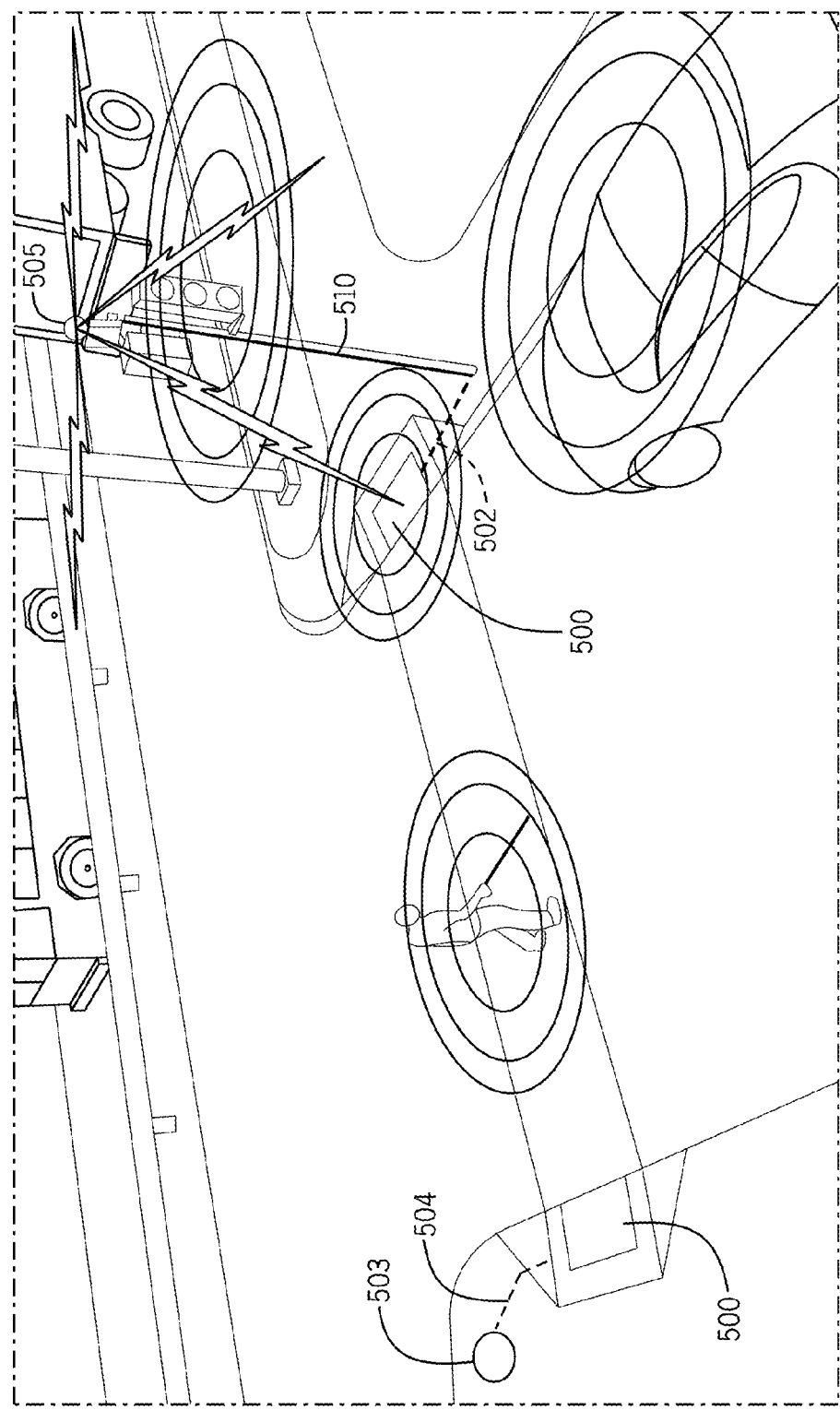
FIG. 8 is a depiction of the present invention in use with an external antenna mounted at the top of a traffic signal pole and an antenna at ground or surface level.

The need to place communications devices in and around city streets to enable Intelligent Transportation Systems (ITS) associated with vehicular and pedestrian traffic is growing. As vehicles become more connected with their environment (road, signals, toll booths, other vehicles, walking pedestrians), efficiencies and safety greatly increase. Lower accident rates will be experienced due to vehicle-to-vehicle and vehicle-to-infrastructure communication. For example, a 2013 report by the Eno Center for Transportation predicted that driverless vehicles would make roads dramatically safer by eliminating the human factors that cause 93 percent of crashes. FIG. 5 shows how DSRC technology can provide efficient and effective vehicle-to-vehicle 201 (V2V), vehicle-to-infrastructure 205 (V2I), vehicle-to-pedestrian 210 (V2P) and infrastructure-to-pedestrian 215 (I2P) data communication. Infrastructure-to-pedestrian is important to those who are handicapped and, in particular, the visually impaired as depicted in FIG. 6, FIG. 7 and FIG. 8. Roads with crosswalks and ADA curb ramps for wheelchairs, train station platforms and bus stops present a unique hazard to the visually impaired and hence the passage of Americans with Disabilities Act (ADA) and the near universal requirement to deploy tactile warning panels on all public rights-of-way.

However, hazards to the visually impaired are becoming hazards to the "device-absorbed pedestrian" as well. Drivers of vehicles who text, have become a major problem on our roads and highways. And now, pedestrians are exhibiting the same bad habit of texting while walking. Pedestrian fatalities, surprisingly, frequently occur in crosswalks. Over half of pedestrian collisions occur in the crosswalk when the pedestrian has the right of way.

In a study by Liberty Mutual Insurance Company, three (3) out of five (5) or roughly 60% of walking pedestrians prioritize the use of smartphones over safety when crossing the street. They rank smartphone use as the most distracted crossing behavior and 70% admit that texting, emailing and talking on a phone is a dangerous behavior. This compares to 40% believing that running across a street to beat traffic and 26% believing that jaywalking is dangerous. Yet they still do it.

A. Wireless Technology Used in Conjunction with the Present Invention.

1. iBeacons and Beacons

The term iBeacon and beacon are often used interchangeably. iBeacon is the name for Apple's technology standard, which allows mobile applications ("apps") that run on both IOS and Android devices, to listen to signals from beacons in the physical world and react accordingly. In essence, Beacon technology allows mobile apps to understand their position on a micro-local scale, and deliver hyper-contextual content to users based on locations. Beacons are primarily proximity detection devices that broadcast outbound signals. iBeacons and beacons are ideal for detecting smartphones and sending alerts and data to apps on those devices. The underlying communication technology for beacons is Bluetooth Low Energy (BLE; explained in more detail below).

Beacons typically have a wireless range of 1 m to 70 m, with the range dependent on the beacon's broadcast signal power. The higher the broadcasting signal power the greater the range at which mobile devices will be able to pick up the signal and convert it into information. The beacon, on detecting the respective app on a mobile device, measures the strength of the signal being received, translates it into an approximate distance, and sends a notification when a certain threshold is met. In operation, a pedestrian's smartphone listens for beacons placed in the TWPA on the pedestrian walkways and when it finds one, it receives information associated with that beacon's identification. The information appears as words on the user's smartphone screen. The information may also be replayed via the smartphones voice-over function. For visually and audibly impaired, vibrations are also a method of communication to the user of the smartphone or portable mobile electronic device. The information exchanged with the smartphone may include text messages, voice warnings, audible alarms and vibrations. Information provided may inform the person with the smartphone or mobile electronic device of major intersections, pedestrian crossings, street hazards, and facilities such as post office or banks, bus stops and railway stations.

In addition to enhancing safety, BLE beacon technology may be adapted by retailers who use BLE beacon technology to deliver context-rich experiences to their customers. The ability to trigger a mobile message to a customer based on their proximity allows for content to be more relevant than ever before. In a retail scenario, the typical uses for Beacons are to, for example, greet customers, send proximity-based offers and coupons, give customers access to loyalty program details, enable contactless payments, and upsell to customers.

There is an emerging field for retailers of proximity-based marketing and analytics as a new way to bridge online and offline experiences for their customers. With retailers trying to make the best use of this technology, mall owners too are considering the installation of beacons to make the mall experience a little more engaging. The Beacon provides a new revenue stream for malls in the form of sponsored content. Beacons will be helpful in breaking down large common spaces into discrete areas that can float different messages to visitors depending on where they are. These discrete digital spaces could be sold to advertisers in different packages.

Another example of beacons being used is major sports stadiums. TWPAs placed at stadiums (outside entrance gates, at top of escalators, at top of stairs, at mid stair landings, etc.) offer fans a completely interactive experience at the stadium. Some of the features offered to visitors via Beacons are, for example, offers and rewards; personalized history on the stadium; team schedule, directions, parking and facilities information including food and drinks; and interactive maps and directories.

The TWPA invention enables businesses to deliver superior customer experiences using beacons for engagement, messaging and analytics. Because of beacons, the physical world is now the new digital channel. There's no doubt that these small devices, with the proximity-based services they deliver, are all set to revolutionize the way both visually impaired and the non-visually impaired people interact with public spaces.

2. Bluetooth

Bluetooth is a wireless technology standard for exchanging data over short distances (using short-wavelength UHF radio waves) from fixed and mobile devices, and building personal area networks. Bluetooth comes in two varieties: Bluetooth Classic and BLE. They both operate in the 2.4 to 2.4835 GHz ISM band. Bluetooth Low Energy is also referred to as Bluetooth Smart. Classic and BLE differ in that they use a different set of channels. Classic uses 79 1-MHz channels. Smart uses 40 2-MHz channels. It can connect several devices, overcoming problems of synchronization. Bluetooth is preferred for more complex applications requiring consistent communication and more data throughput. BLE is a wireless personal area network technology used for transmitting data over short distances. BLE has low energy requirements. It can last up to 3 years on a single coin cell battery. BLE is ideal for simple applications requiring small periodic transfers of data.

3. Global Positioning Systems

The Global Positioning System (GPS) is a space-based navigation system that provides location and time information in all weather conditions, anywhere on or near the Earth where there is an unobstructed line of sight to four or more GPS satellites. The system provides critical capabilities to military, civil, and commercial users around the world. The United States government created the system, maintains it, and makes it freely accessible to anyone with a GPS receiver.

GPS technology is one of a multitude of methods by which the location of the TWPA can be identified for the purpose of measuring proximity to a communicating mobile device. Limitations to this form of geo-location may exist where line-of-sight to at least four satellites is obstructed by tall buildings or other structures.

4. Geofencing

A geofence is a virtual perimeter for a real-world geographic area. A geofence could be dynamically generated—as in a radius around a store or point location, or a geofence can be a predefined set of boundaries, like school attendance zones or neighborhood boundaries.

The process of using a geofence is called geofencing, and one example of usage involves a location-aware device of a location-based service user entering or exiting a geofence. This activity could trigger an alert to the device's user as well as messaging to the geofence operator. This information, which could contain the location of the device, could be sent to a mobile telephone or an email account.

The TWPA provides the network of wireless communicating devices to enable the dynamic creation and tearing down of geofences at will. The wide deployment of panel apparatuses as part of the deployment of tactile warning panels on city sidewalks and curbs at intersections enables dynamic geofences throughout cities where size, configuration and activation times are dynamically controlled by city administration. Safety, crime prevention, and police work would be enhanced.

5. Low Power Wide Area Network

LPWAN is a new low power low bit rate technology that offers significant advantages over cellular networks and Wi-Fi for providing machine-to-machine (M2M) communications. There is enormous potential for the Internet-of-Things for businesses to collect data from thousands of devices, analyze and act upon this data to make quick and accurate decisions. Technical challenges, such as limited battery life, short communication distances, high costs and a lack of standards have impeded progress in the widespread use of this technology. The LoRaWAN technology (Long Range Wide-Area Networks) overcomes many hurdles. Based on a new specification and protocol for low-power, wide-area networks that taps an unlicensed wireless spectrum, the technology can connect sensors over long distances, while offering optimal battery life and requiring minimal infrastructure. LPWAN's deliver benefits such as improved mobility, security, bi-directionality, and location/positioning, as well as lower costs.

6. Dedicated Short Range Communication

Dedicated short-range communications (DSRC) is a two-way short-range to medium-range wireless communication capability operating at the 5.9 GHz spectrum, that permits very high data transmission critical in communications-based active safety applications. This technology is specifically designed for automotive and transportation use. FIGS. 5-8 illustrate how DSRC and other short-range communications of the present invention serve the visually impaired, the device-distracted pedestrian, other vehicles and city infrastructure with tools to safely navigate streets, sidewalks, transportation platforms and other pedestrian walkways. Research is currently being conducted using DSRC and other wireless communications technologies to ensure safe, interoperable connectivity to help prevent vehicular crashes of all types and to enhance mobility and environmental benefits across all transportation system modes. FIG. 5 illustrates the many types of vehicles (i.e., trains 220, buses 225, emergency vehicles 230, personal vehicles 235 and bicycles 240) navigating roadways that are hazards to the distracted and visually impaired 245 and how wireless mobile communications technology, depicted by wireless signal circles 250, can be used to connect and locate vehicles equipped with transmitting and receiving devices located on the vehicles and/or pedestrians such as visually impaired individuals. As described in more detail below, the TWPA preferably comprises transmitters and/or receivers (and optionally sensors and other electronic components) that communicate with transmitters or receivers located on the vehicles and also preferably with a receiving and/or transmitting device carried by the pedestrian. The transmitters and/or receivers thus provide a network that facilitates communication between vehicles and/or pedestrians or other individuals (such as bicyclists or visually impaired individuals) carrying a device compatible with the network. FIG. 6 illustrates how the TWPA 300 of the present invention integrates with and enhances location awareness of DSRC equipped vehicles e.g., trains 320, buses 325, emergency vehicles 330, personal vehicles 335, bicycles 340, and trucks 345. FIG. 7 provides an illustration how the electronic equipment and sensors in a TWPA 400 of the present invention communicates by a wireless signal, depicted by wireless signal circles 420, with a pedestrian 405 to alert the pedestrian of potential hazards such as an approaching vehicle 410. FIG. 7 also illustrates how the traffic signal light 430 can communicate via wireless communication 420 with the electronic equipment and sensors in a TWPA 400, vehicles 410 and pedestrians 405. FIG. 8 illustrates how electronic equipment and sensors in a TWPA 500 of the present invention can communicate via conduit and wires 502 with an antenna 505 located on top of a pole or nearby structure 510 in proximity to the TWPA 500 where wireless communication longitudinally may be impeded due to the limitations imposed by the subsurface enclosure location of antennae and various embodiments of the invention such as environmental hardening by concrete and EMI shielding. FIG. 8 also illustrates how the TWPA 500 can be connected by conduit 504 to an external ground level antenna 503 located in a small ground surface level enclosure.

7. Wi-Fi

Wi-Fi is a local area wireless computer networking technology that allows electronic devices to connect to the network, mainly using the 2.4 gigahertz (12 cm) UHF and 5 gigahertz (6 cm) SHF ISM radio bands. It is based on Institute of Electrical and Electronics Engineers' (IEEE) 802.11 standards. Computers and Wi-Fi enabled devices can connect to a network such as the Internet via a wireless network access point. Such an access point (or hotspot) has a range of about 20 meters (66 feet) indoors and a greater range outdoors. Hotspot coverage can be as small as a single room with walls that block radio waves, or as large as many square kilometers achieved by using multiple overlapping access points.

8. Augmented Reality

Augmented reality is a live direct or indirect view of a physical, real-world environment whose elements are augmented (or supplemented) by computer-generated sensory input such as sound, video, graphics or GPS data. By incorporating wireless data inputs from a network of transmitting devices nested within the TWPA's enclosure, persons employing augmented technology can visualize location and surroundings through a variety of sensory inputs including visual, auditory and tactile; one or multiple combinations of these.

9. Sensors

Sensors are electronic devices that are employed to measure, record and report a plethora of static and dynamic data characterizing events, conditions and objects. For example, but not limited to temperature, humidity, water levels, enclosure entrance, compression from walking, counting people, counting vehicles, measuring vehicular speed, characterizing sounds, light, and airborne chemicals.

B. Cloud and Fog Computing Used in Conjunction with the Present Invention

The Internet of Things (IoT) and the immense amount of data that sensors generate are stressing existing cloud computing architectures. Existing cloud architectures are simply inefficient for the transmission, processing and analysis of all the data that a rapidly growing number of sensors create. Doing so requires a great deal of bandwidth and all the back-and-forth communication between the sensors and the cloud can negatively impact performance. Centralized cloud-based processing is inherently flawed for this task when huge amounts of data are involved and latency is a critical factor in the effective utility of the Internet of Things. Although latency may simply be annoying when the sensors are part of a gaming application, delays in data transmission can be life-threatening if the sensors are part of a vehicle-to-vehicle communication system or large-scale distributed control system for rail travel The IoT requires a new kind of infrastructure. The cloud itself can't connect and analyze data from thousands and millions of different kinds of things spread out over large areas. Capturing the power of the IoT requires new solutions that can connect new kinds of things to the network, secure things that produce data and can handle an unprecedented volume, variety, and velocity of data as it travels from the network edge to the cloud.

A solution to this problem is "Fog Computing," a term coined by Cisco. In a fog-computing environment, much of the processing takes place in a data hub on a smart mobile device or on the edge of the network in a smart router or other gateway device. Whereas the cloud is "up there" in the sky somewhere, distant and remote, the "fog" is close to the ground, right where things are getting done. It consists not of powerful servers, but weaker and more dispersed computers of the sort that are making their way into appliances, factories, cars and street lights. This distributed approach is growing in popularity because of the growing number of intelligent devices on the edge of the cloud. The word "fog" is meant to convey the idea that the advantages of cloud computing can—and should—be brought closer to the data source. (In meteorology, fog is simply a cloud that is close to the ground.) Perhaps the key differentiator of the fog is the geographical distribution of devices, and how location provides an important input. Fog computing solutions secure the IoT devices and protect the data they produce as it travels between the network edge and the cloud. Fog computing directs the data to the best place for analysis: fog nodes or a data center cloud platform. Depending on the industry and application, fog nodes can number in the hundreds, thousands, or tens of thousands. Many applications will benefit from the fog including deployment of network sensors such as smart grids or smart water, and intelligent transportation along roads and rail. The higher-quality signals along these networks from the distributed deployment of local nodes will present a new means for adding robustness to these networks. This is a whole new paradigm for internet-based computing, with the addition of a great many nodes that combine intelligence as well as aid capacity.

C. Electric Power Generation and Storage Used in Conjunction with the Present Invention The need for clean energy is of growing importance worldwide. Electricity and heat production accounts for 25% of 2010 global greenhouse gas emissions. The burning of coal, natural gas, and oil for electricity and heat is the largest single source of global greenhouse gas emissions. Solar and wind generation of electricity offer the promise of reducing greenhouse gas emissions while powering our growing need for electricity.

1. Solar Electric Power Generation

Solar panels are made of monocrystalline, polycrystalline or amorphous (thin film) materials and are growing in popularity as a source of augmenting traditional electric power generation. Inverters convert DC to AC 120 VAC 60 HZ to deliver AC current and to tie into the electric grid. US Patent Application 20150121780 presents a walkable photovoltaic floor that is comprised of pieces of laminated glass of multiple layers that are joined together by an encapsulant and by an intermediate layer of photovoltaic material within a peripheral sealed frame.

2. Rechargeable Batteries

An embodiment of this invention includes rechargeable batteries. They are comprised of several different combinations of electrode materials and electrolytes including lead-acid, nickel cadmium (NiCd), nickel metal hydride (NiMH), lithium ion (Li-ion), and lithium ion polymer (Li-ion polymer).

D. Enclosure Technology Used in Conjunction with the Present Invention

Kim M. Goldstein, et al. (U.S. Pat. No. 6,321,928 B1) discloses a container apparatus to place in the ground to provide a secure anchor to an above surface enclosure for the housing of electronic or other equipment. However, Goldstein subsurface container does not house electronic and other equipment. In addition, it does not have a detectable warning panel as the top cover panel.

SCTE specifies (ANSI/SCTE 77 2010) the testing of integrity of grade-level underground closures containing telecommunications or other low voltage apparatus that may be exposed to the public. Six ASTM standards apply including: ASTM D543-06; ASTM D570-05; ASTM D635-06; ASTM D2444-05; ASTM G154-06; and ASTM C1028027.

Yenni (U.S. Pat. No. 6,485,595) includes in the composite material that forms the structure of the enclosure, fibrous metal mat that has fibers surrounded by a fiber-coat giving the container Electromagnetic Interference (EMI) shielding characteristics.

Beyond serving the visually impaired, embodiments of the TWPA provide smart-city technologists the means to serve and provide device-distracted pedestrians ways to better and more safely navigate streets, sidewalks and transportation platforms while engaging with their electronic devices. For the visually impaired and device-distracted pedestrian, the TWPA enables a multitude of other cues to hazardous situations. Such cues are audio or visual messages to handheld mobile electronic devices such as smartphones, tablets, computers or other wearable electronic devices such as a smart watch, Fitbit, etc.

The TWPAs of the present invention is composed of a multitude of fully integrated horizontally layered panels, platforms and enclosure FIGS. 9A, 9B, 9C, 9D, 9E, 10A, 10B, 11A, 11B, 11C and 12). In some preferred embodiments, the TWPAs comprise a load bearing surface tactile panel that comprises a plurality of distinct specially raised, three dimensional features arranged in a pattern to be detected by tactile sensation by users of a pedestrian walkway. In another preferred embodiment, the non-loading bearing surface tactile panel is secured to a load bearing subsurface base panel. The remaining platforms are preferably arranged beneath the surface tactile panel and provide enhanced functionality for the TWPA.

In particularly preferred embodiments, the surface tactile panel comprises a tactile warning panel that is American Disability Act (ADA) compliant. In further embodiments, the surface tactile panel comprises high quality full color graphical images, described in more detail below (U.S. Pat. Nos. 9,311,831 B2 and 9,361,816 B2). In some embodiments, the surface tactile panel utilized in the TWPA of the present invention is one solid color, while in other embodiments, the surface tactile panel includes a graphic design displaying at least two, three, four or more colors on the surface tactile panel. In other embodiments, the surface tactile panel provides a transparent top layer to allow the transmission of light to the solar panels immediately underneath the surface tactile panel. Accordingly, the surface tactile panel may be formed from a material including, but not limited to metals, polymeric materials, concrete, brick, natural stone, ceramic, fiberglass, tempered glass, tiles or composites. In some embodiments, the surface tactile panel substrate is made slip resistant and/or durable to withstand harsh environments such as winters, pedestrian traffic, vehicle traffic, etc. by inclusion in or by coating of various polymeric, inorganic particles or organic particles to increase frictional resistance between pedestrian feet and the walking surface of the surface tactile panel.

Referring to FIGS. 9A, 9B, 9C, 9D and 9E, in some embodiments the TWPA 600 of the present invention comprises a surface tactile panel 610 comprising an array of truncated domes 615 that provide an ADA compliant tactile warning panel. The truncated domes 615 project upward from the planar surface 620 of the surface tactile panel 610. In some embodiments, the TWPA 600 comprises a plurality of fasteners 625 so that the surface tactile panel 610 can be permanently or releasably attached to a load bearing subsurface base panel 645 or a ground surface such as asphalt pavement, concrete or metal that is in a pedestrian walkway. In the preferred embodiments, the surface tactile panel 610 is mounted horizontally in relation to the ground surface. In other embodiments, the fasteners 625 allow permanent or releasable attachment to a load bearing subsurface base panel 645 that forms part of the TWPA 600. The present invention is not limited to the use of any particular type of permanent or releasable fasteners 625. Suitable fastener systems are described in detail in Henshue patent application Ser. No. 14/661,853, which is incorporated herein by reference in its entirety. The TWPAs 600 of the present invention comprises an integrated surface tactile panel 610, a load bearing subsurface base panel 645, and a subsurface enclosure 630 with the surface tactile panel 610 being the uppermost top panel, which is exposed to the environment. Still referring to FIGS. 9A, 9B, 9C, 9D and 9E, the in some embodiments the surface tactile panel 610 is formed from glass or other material that allows transmission of light. In some embodiments, the glass is hardened and tempered glass.

The TWPA 600 depicted in FIGS. 9A, 9B, 9C, 9D and 9E may also further comprise a load bearing subsurface base panel 645, which has incorporated a solar panel, which located adjacent to and beneath the surface tactile panel 610. The load bearing subsurface base panel 645 comprises one or more, for example a plurality, of solar cells (not depicted) that are used to power the TWPA 600. In some embodiments, the load bearing subsurface base panel 645 has therein an antenna 635 arranged horizontal just beneath the surface tactile panel 610. In alternative embodiments, the load bearing subsurface base panel 645 has therein a void cavity 640 to accommodate the top of an antenna located in a subsurface enclosure 630 beneath the load bearing subsurface base panel 645. In some embodiments, the TWPA 600 comprises a conduit 650 that allows access to the load bearing subsurface base panel 645 and/or subsurface enclosure 630. The conduit 650 preferably provides a coupling or penetration entrance through which run cables 655, for communications, video or electrical wire. In some embodiments, the TWPA 600 comprises a fan 660 that facilitates airflow in and out of the TWPA 600 for the purpose of venting and cooling. A separate conduit for providing air or venting air is also depicted 680.

In some embodiments, the load bearing subsurface base panel 645 has therein a series of holes 632 that allow attachment (preferably releasable attachment) of the load bearing subsurface base panel 645 to an underlying subsurface enclosure 630 and in some embodiments to the ground surface as well.

Figure 9A:
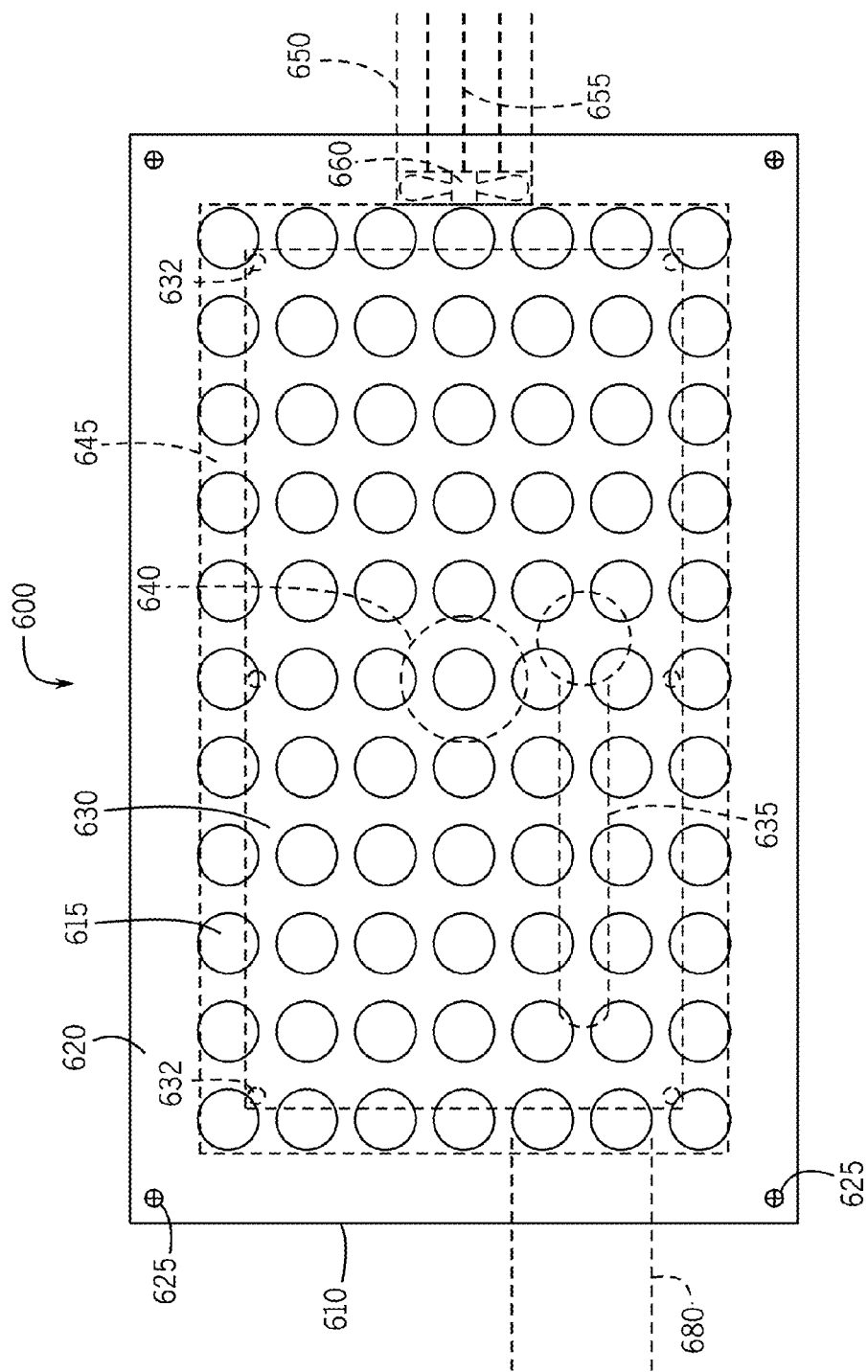
FIG. 9A is a plan view of the present invention with the surface tactile panel and subsurface panels.
Figure 9B:
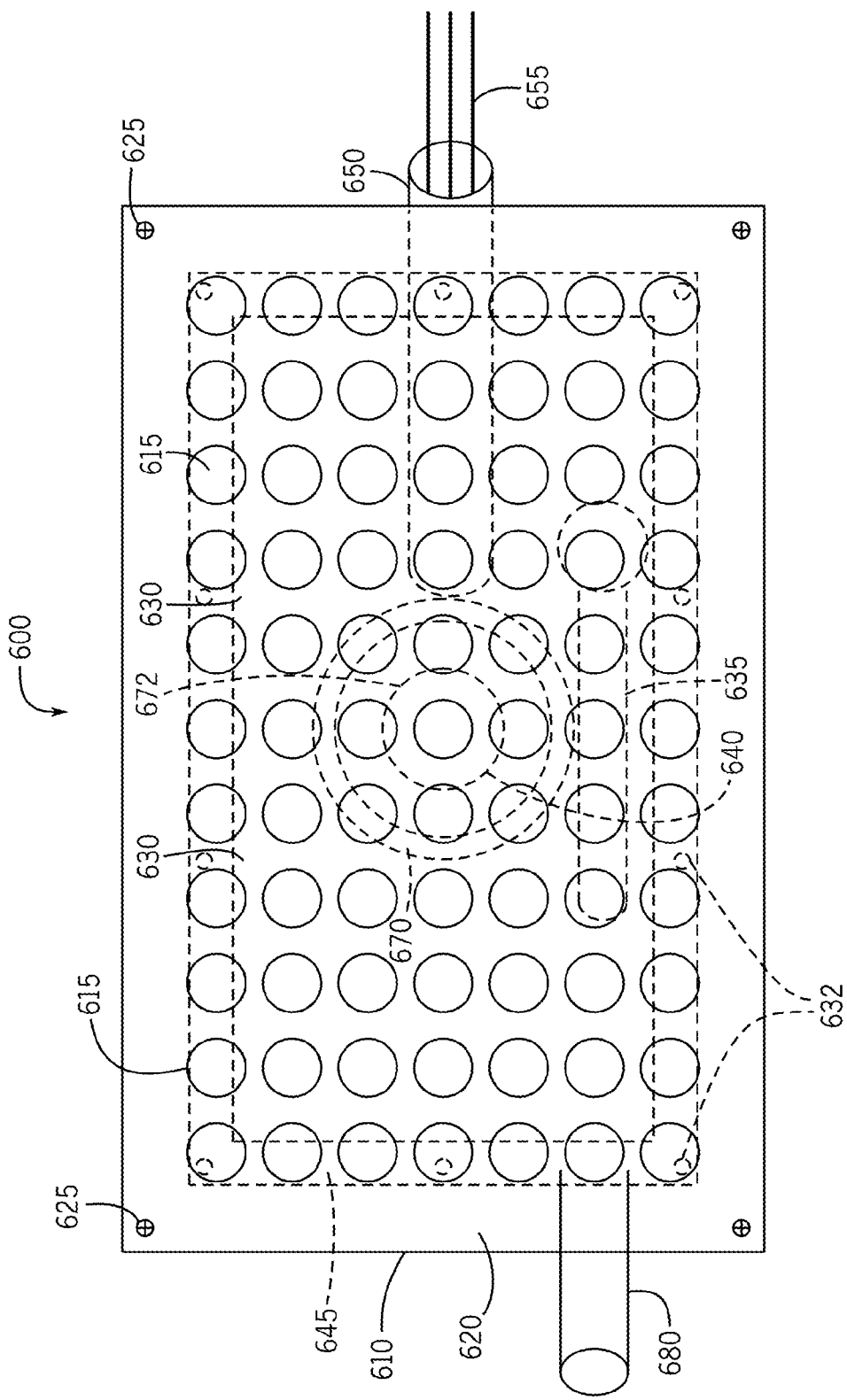
FIG. 9B is a plan view of the present invention with surface tactile panel and a subsurface enclosure beneath it.

In some embodiments, the TWPA 600 of the present invention further comprises an elongated vertical container FIG. 9B, 670. Referring to FIG. 9B, the vertical wall 670 of the vertical container is shown in relation to the surface tactile panel 610. In some embodiments, the load bearing subsurface base panel 645 has a void cavity 640 therein to accommodate the top of an antenna 635 located in a subsurface enclosure 630 beneath the load bearing subsurface base panel 645.

Figure 9C:
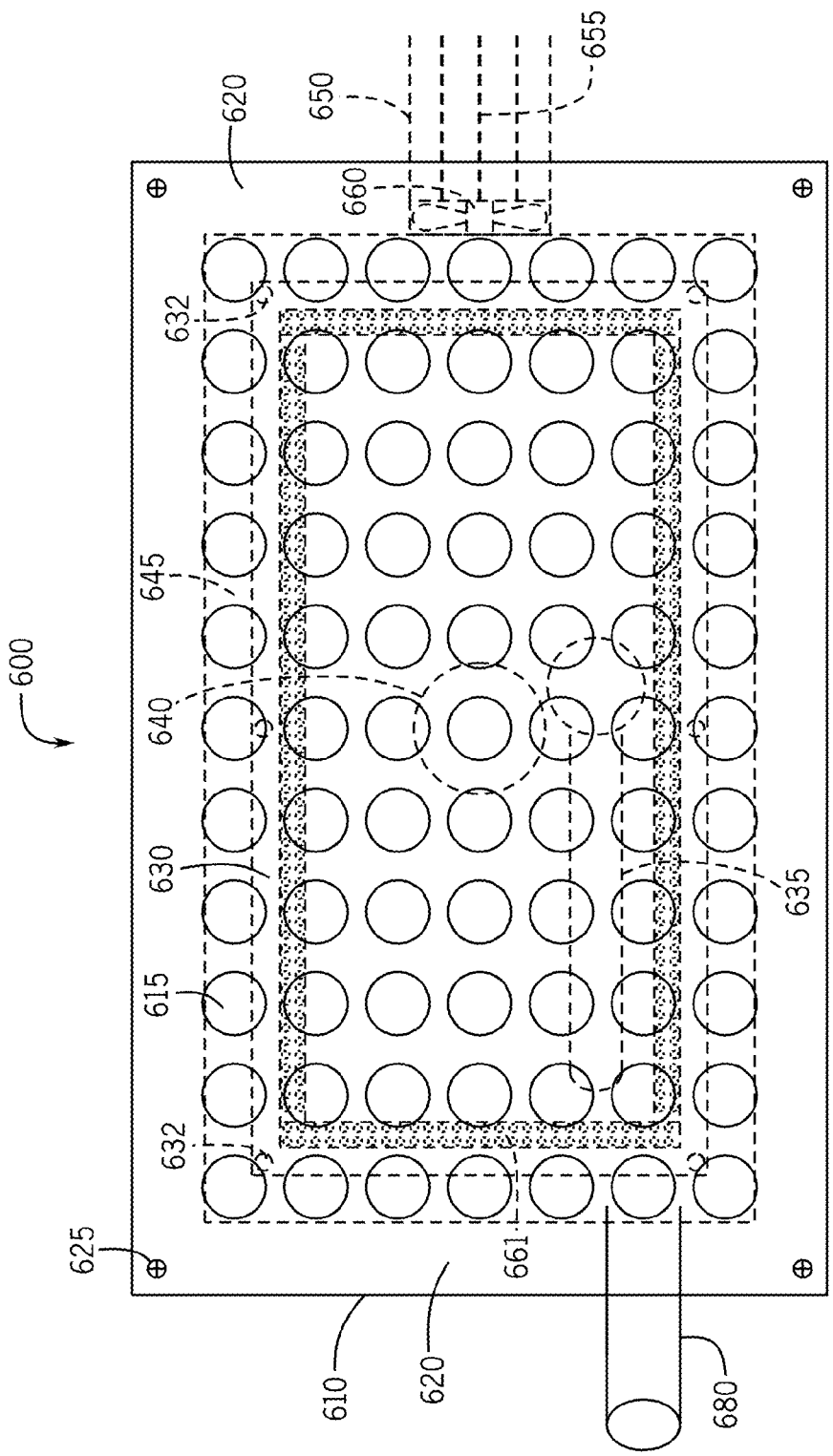
FIG. 9C is a plan view of the present invention with LEDs integrated into the surface tactile panel.

In some embodiments, the TWPA of the present invention further comprises an LED lighting strip FIG. 9C, 661 that serve as an enhanced visual warning and are integrated into the load bearing subsurface base panel 645.

Figure 9D:
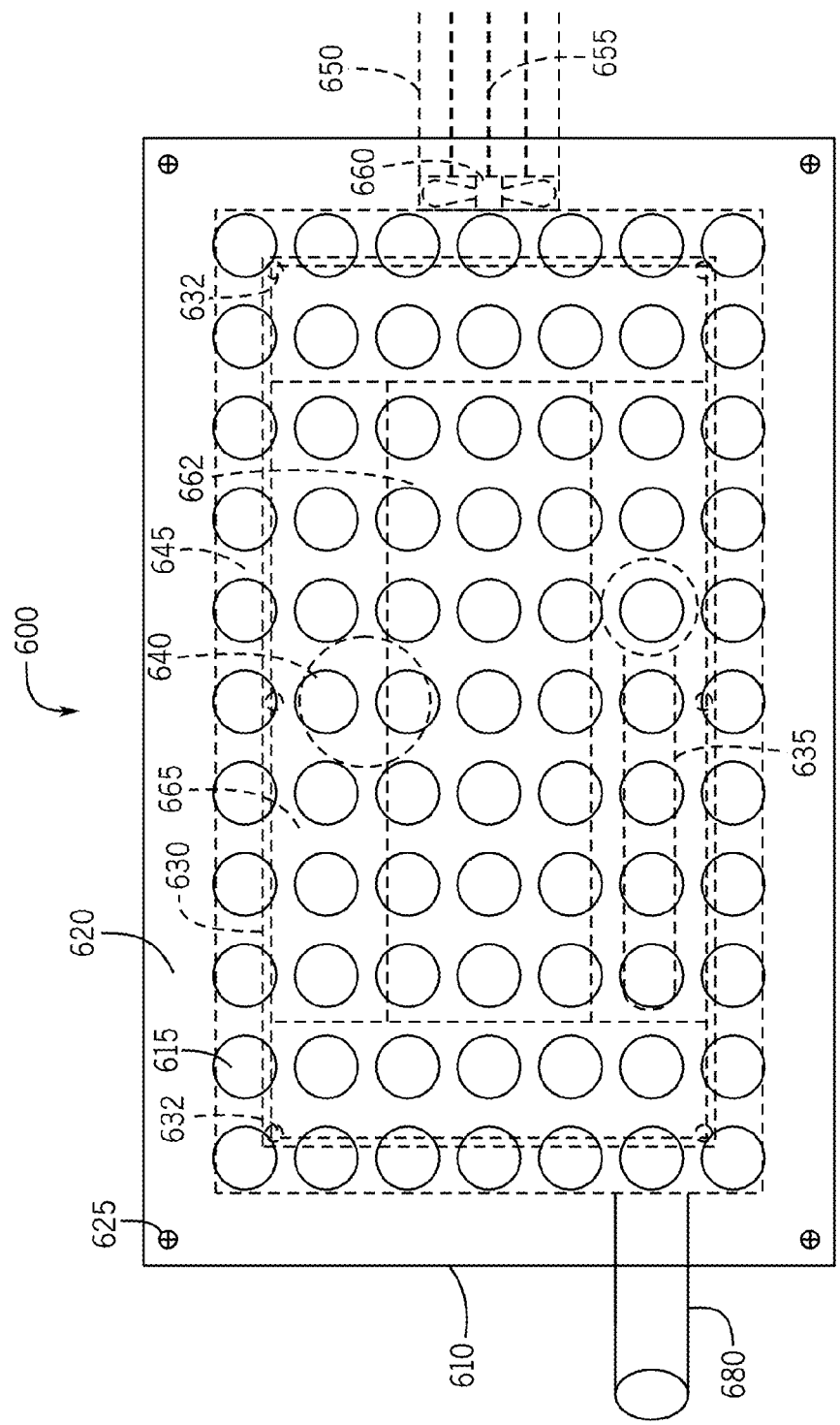
FIG. 9D is a plan view of the present invention with a subsurface solar panel and video display screen.

Referring to FIG. 9D, a TWPA 600 of the present invention comprises a load bearing subsurface base panel 645 with an integrated video screen 662 nested within solar panels 665.

Figure 9E:
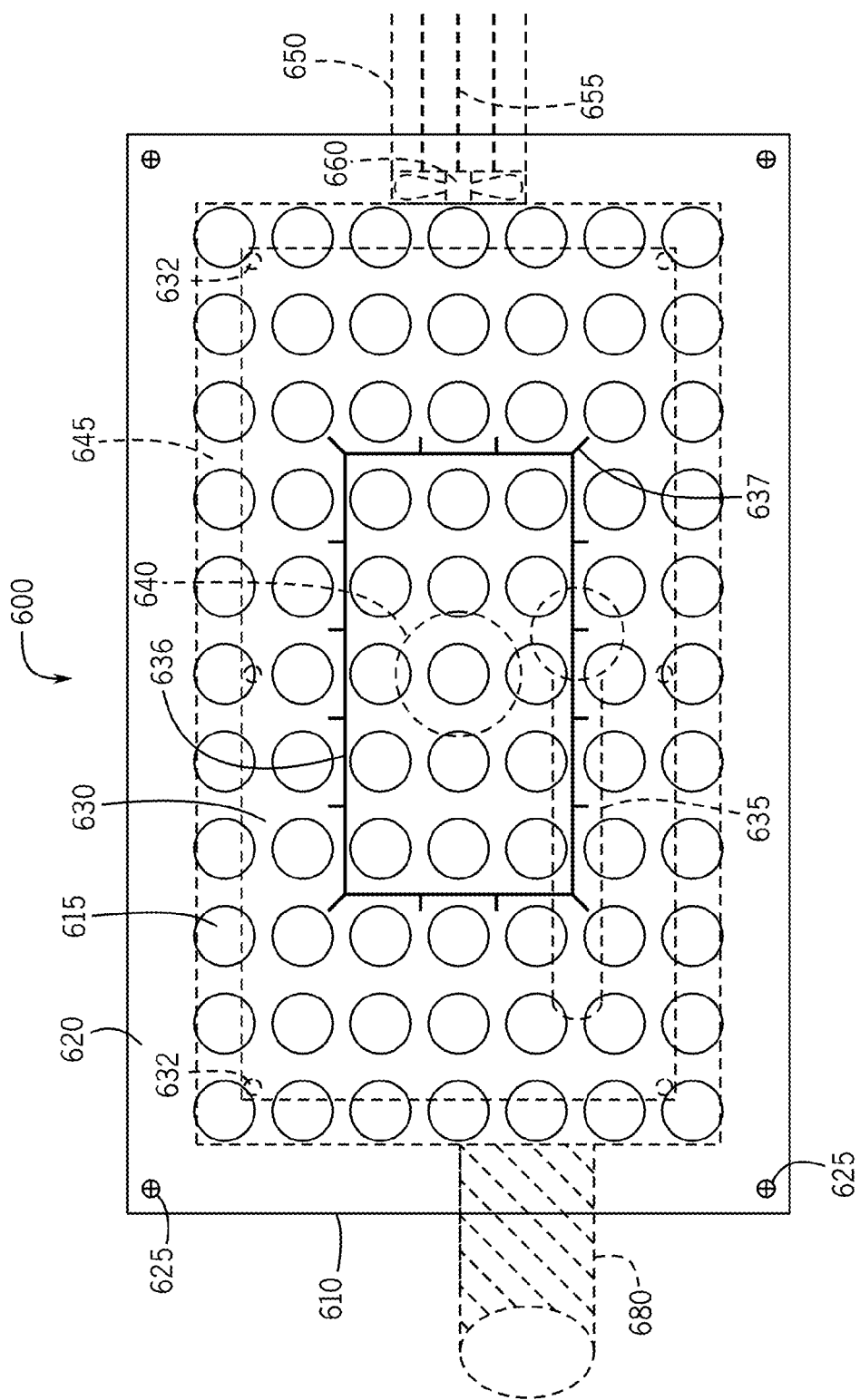
FIG. 9E is a plan view of the present invention with the surface tactile panel and subsurface panels with a ground or surface level antenna incorporated into the surface tactile panel by a slotted insertion configuration.

In some embodiments of the present invention, FIG. 9E depicts an embodiment where an antenna unit 636 is placed into a void cavity 640 of the surface tactile panel 610 that is connected to radios and other electronic equipment or batteries contained below in the subsurface enclosure 630 through an opening 640. The housing where the antenna unit 636 is placed, contains notches that match small protrusions 637 on the edge of the antenna unit 636 and surface tactile panel 610 void cavity 640 so that the antenna unit 636 sits securely in the surface tactile panel 610 and aligns with the truncated domes 615.

Figure 10A:
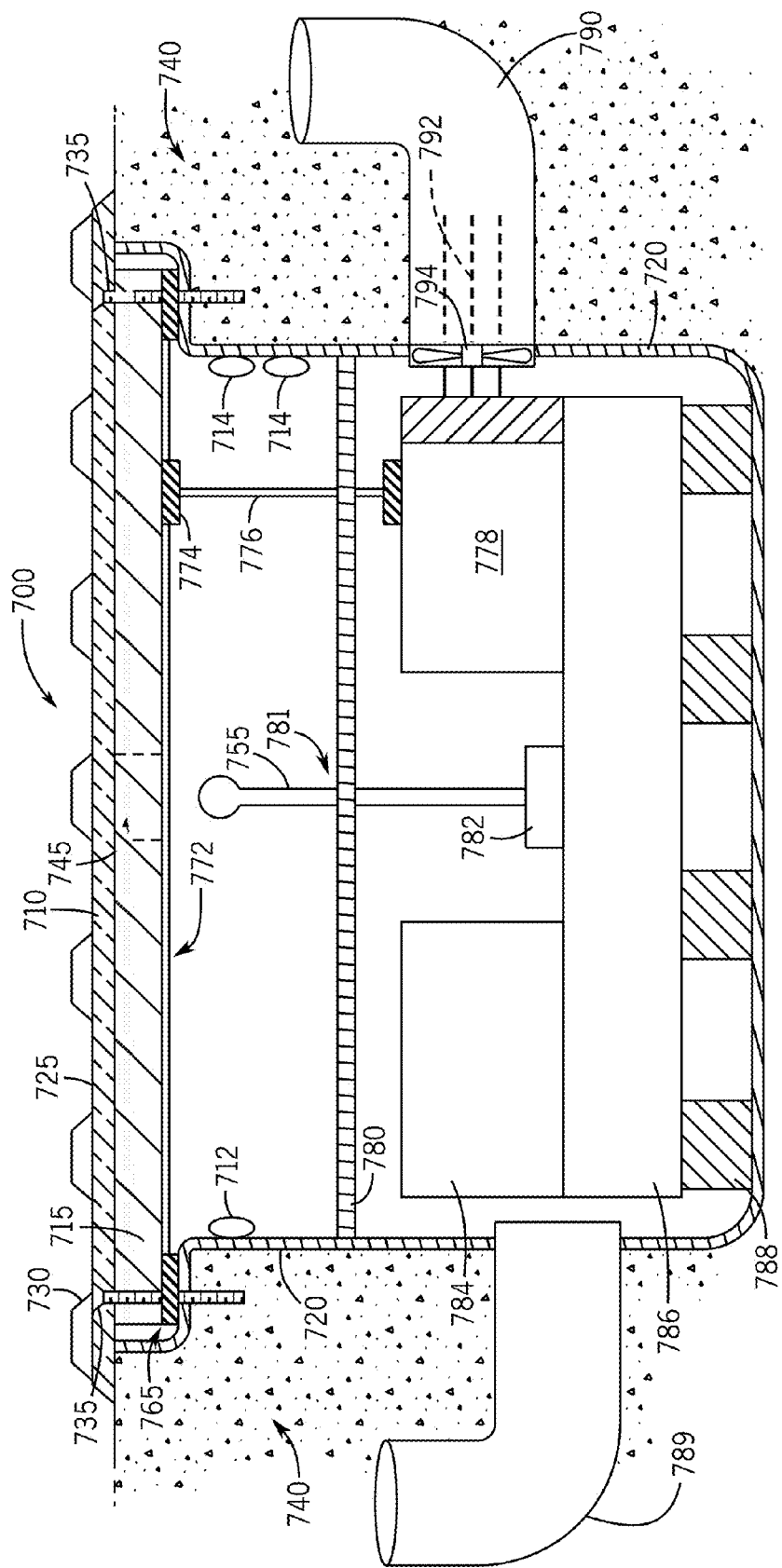
FIG. 10A is a profile view of the present invention with multiple panel layers, including a subsurface solar panel, and the subsurface enclosure.
Figure 10B:
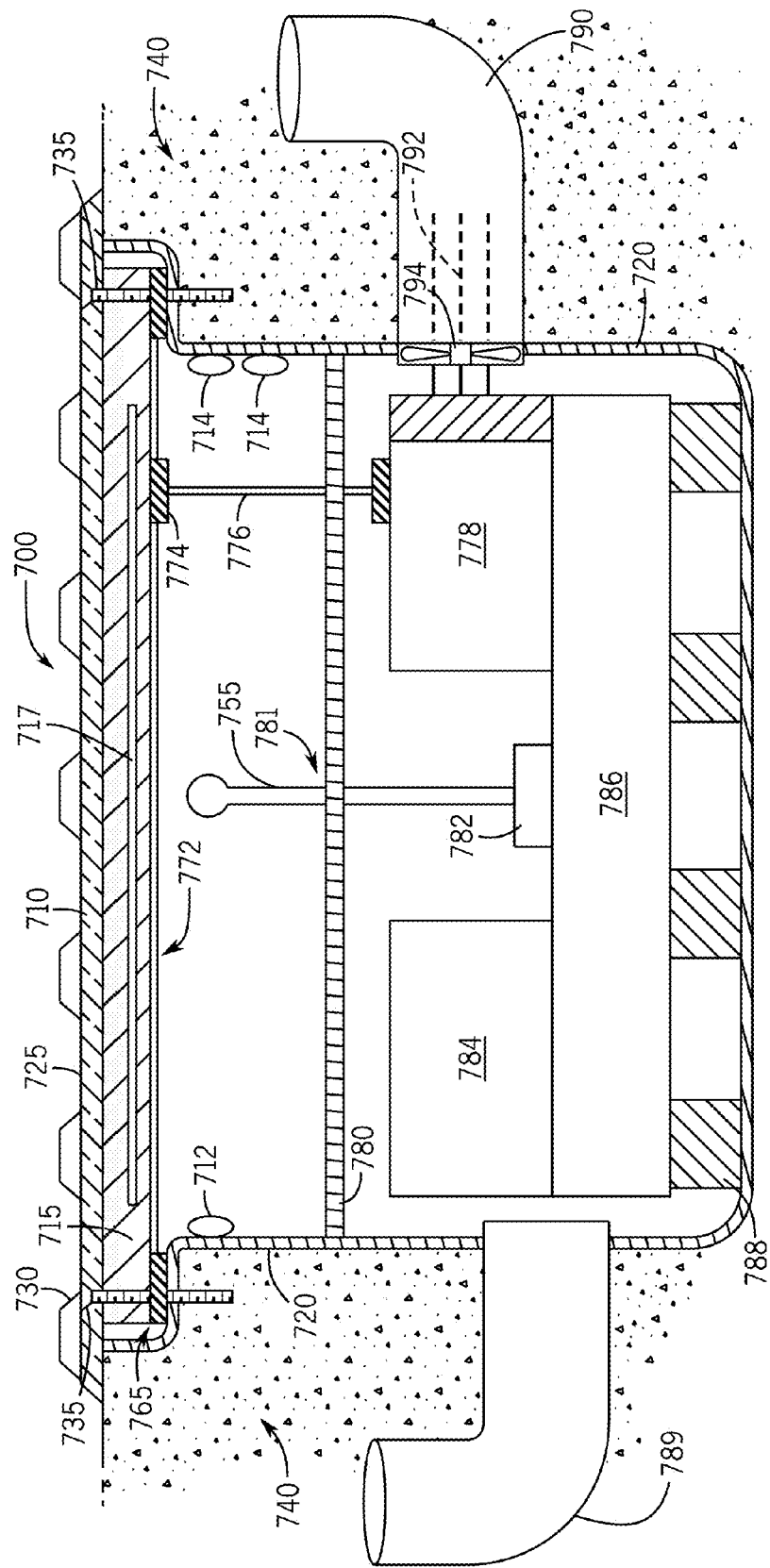
FIG. 10B is a profile view of the present invention with multiple panel layers, including a subsurface solar panel, heating elements, video display screen and the subsurface enclosure.

FIGS. 10A and 10B each provide a profile view of a TWPA 700 of the present invention. Referring to FIGS. 10A and 10B, the TWPA 700 comprises a surface tactile panel 710, a load bearing subsurface base panel 715, and a subsurface enclosure 720. The subsurface enclosure 720 is preferably waterproof and has a lid that is releasably fastened. The TWPA of the present invention is preferably designed to have replaceable features since the surface tactile panel and possibly the load bearing subsurface base panel can be damaged in the harsh outdoor environment.

FIGS. 10A and 10B show the surface tactile panel 710 has an upper planar surface 725. Spatially raised features 730 in an attention pattern projected upwardly from the upper planar surface 725 of the surface tactile panel 710. In some embodiments, the surface tactile panel 710 is formed from tempered glass, i.e., glass that has been strengthened or hardened, or other material that allows transmission of light. In some embodiments, oxide or another additive is included in the glass to provide slip resistance. In other embodiments, the surface tactile panel may be composed of polycrystalline transparent ceramics such as alumina AI2O3, yttria alumina garnet (YAG) and neodymiumdoped ND:YAG and other products of nanoscale ceramic technology. Still further embodiments for the surface tactile panel may include but not be limited to transparent nylons, polyurethane, acrylics, soda-lime-silica glasses, borosilicate glasses, fused silica glasses, lithium disilicate based glass-ceramics, aluminum oxynitride (AlON), magnesium aluminate spinel (spinel), single crystal aluminum oxide (sapphire, aluminum oxynitride spinel (AI23O27N5), Magnesium aluminate spinel (MgAL2O4), single-crystal aluminum oxide (sapphire— AI2O3), and nanocomposites of yttria and magnesia. In some embodiments, oxide or another additive is included in the glass to provide slip resistance. In some embodiments, the surface tactile panel comprises an image. Spatially raised features generally are rounded dome structures protruding upward from the surface of the substrate panel as dictated by the laws, rules, and regulations of local jurisdiction, which will specify their size, shape, height, and spacing. There is usually some variation of truncated round domes or cones arranged in an attention pattern or array. Another category of spatially raised features is guiding indicators (guiding pattern), generally comprising three-dimensional parallel flat-topped elongated bars or sinusoidal ribs. These bars or ribs are installed in an array at right angles to the direction of travel at either the sides of a walkway or along its center. A person with impaired vision carrying a cane detects the guidance bars or ribs by a sweeping action across the bars or ribs with the cane. Guidance indicators are more commonly used outside the United States.

In FIGS. 10A and 10B the surface tactile panel 710 is removeably attached to the subsurface enclosure 720 and optionally a ground substrate 740 such as concrete by fasteners 735. In some embodiments, the fasteners 735 secure the surface tactile panel 710 to the subsurface enclosure 720 with the load bearing subsurface base panel 715 securely sandwiched in between. Referring to FIG. 10A, in some embodiments, the load bearing subsurface base panel 715 includes an integrated solar panel comprising one or more solar cells. Referring to FIG. 10B, in some embodiments the load bearing subsurface base panel 715 incorporates a video screen, alone or in combination with solar cells. In some embodiments, the video screen is positioned so that the display from video screen is transmitted through a transparent surface tactile panel 710. In some embodiments, the video screen is approximately the same size as the surface tactile panel while in other embodiments the video screen or screens are smaller and may optionally be contained in the load bearing subsurface base panel 715 along with, for example, one or more solar cells.

Referring to FIGS. 10A and 10B, in some embodiments, the load bearing subsurface base panel 715 comprises an integrated antenna 755 arranged horizontally within the load bearing subsurface base panel 715. In other embodiments, the load bearing subsurface base panel 715 has a hole FIG. 10A, 745 therein to accommodate the integrated antenna 755 standing vertically within the subsurface enclosure 720.

The subsurface enclosure 720 is preferably waterproof and formed from materials including, but not limited to, cast iron, ductile iron, stainless steel, aluminum, alloys, fiberglass reinforced plastic, polymeric concrete, plastic composites, composites and polymeric materials. Suitable polymeric materials include, but are not limited to, plastic, thermoset plastic, thermoplastic, a plastic composite, sheet molding compound, bulk molding compound, fiber composite, fiberglass reinforced plastic, polymer concrete or combinations thereof. Polymeric materials may also include metal particles to provide shielding from electromagnetic interference and pulses. In preferred embodiments, the entire subsurface enclosure 720 sits within a surrounding ground substrate 740 such as concrete, gravel concrete mix or other hardened substrate creating a secure environment offering protection from vandalism and criminal or terrorist activity.

Further embodiments of the invention incorporate fasteners 735, hinges, hinge plates, bolts, screws or other similar devices to secure the surface tactile panel 710 and the load bearing subsurface base panel 715 to the subsurface enclosure 720. For example, in some embodiments, a waterproof seal or gasket 765 is arranged between the surface tactile panel 710, the load bearing subsurface base panel 715 and the subsurface enclosure 720. The entire TWPA 700 is embedded directly into the moldable ground surface such as concrete 740.

In some embodiments, a removable lid FIG. 10A, 772 on the subsurface enclosure 720 supports the load bearing subsurface base panel 715 and the surface tactile panel 710. The lid 772 has therein one or more holes 774 accommodating a silicone or other waterproof material that provides a waterproof barrier while enabling a connecting wire 776 to pass through the lid 772 connecting the load bearing subsurface base panel 715, comprising solar cells, to a power converter and battery 778 in the subsurface enclosure 720. In some embodiments, the lid 772 has a silicone or other sealant material 765 serving as a waterproofing gasket between where the load bearing subsurface base panel 715 and the subsurface enclosure 720 surfaces are pressed together when attached. In some embodiments, the lid 772 has a hole therein and sealing O-ring to accommodate a integrated antenna 755.

Still referring to FIGS. 10A and 10B, in some embodiments, the subsurface enclosure 720 has therein a panel 780, formed from stainless steel, metal screen or other EMI shielding material that shields the electronic equipment beneath the panel 780, for example sensors, batteries, power supplies, transmitters, receivers, etc. from electromagnetic interference. The panel 780 has a hole 781 therein with electrically insulating material to allow the integrated antenna 755 and the connecting wire 776 between the solar panel and the converter and batteries to pass through. In some embodiments, the TWPA incorporates an antenna 755 that transmits and receives data from a plurality of electronic devices and sensors within the TWPA. In some embodiments, the antenna 755 is attached to and in electronic communication with one or more transmitters or receivers 782 within the TWPA. In some embodiments, the transmitters and receivers are also in electronic communication with additional electronic devices 784 and/or computers or computer processors 786 operating within the subsurface enclosure 720. In some embodiments, the electronic equipment and computers are arranged on racking FIG. 10A, 788 that rest on the bottom of the inside of the subsurface enclosure 720. In some embodiments, the TWPAs of the present invention communicate in either a wired or wireless protocol with an external antenna FIG. 8, 505 on a vertical structure, for example a top of a pole or nearby structure 510 supporting a streetlight, traffic light or other structure. The external antenna 505 enables multi-direction wireless communication at greater distances than an antenna placed within the TWPA subsurface enclosure. In some embodiments, the external antenna communicates wirelessly with the antenna in the TWPA.

In some embodiments, the TWPA FIG. 10A, 700 comprises a conduit 790 that connects the TWPA 700 to wired external communications and power cables 792. In another embodiment of the invention, the conduit 790 serves as a cooling and/or venting tunnel to dissipate heat from the electronic equipment residing in the waterproof subsurface enclosure. A small fan FIG. 10A, 794 apparatus facilitates the airflow exchange. In some embodiments, the subsurface enclosure 720 has conduit 789 in order to exhaust air from the subsurface enclosure 720.

In still further embodiments, the TWPA FIG. 10A, 700 of the present invention includes one or more sensors 712 and beacons 714. In some embodiments, the sensors 712 measure and report a plethora of information, including but not limited to, temperature, humidity, water, enclosure entry, equipment alarms, foot traffic counts, location of the TWPA, sounds that can be characterized such as gunshots, status of operating components, warnings, triggers for visual warnings displayed through the upper surface panel from a subsurface video display panel, communication with smartphones carried by pedestrians who have visual, device or other impairments. In some embodiments, the guidance is audible or tactile sensations emitting from the portable mobile device. In some embodiments, the sensors 712 send and receive M2M data, and detect and characterize vehicular and pedestrian traffic with wireless send/receive devices. In some embodiments of the present invention, the TWPA integrates technologies including, but not limited to, Small Cells, Beacons, Bluetooth, Global Positioning Systems, Geofencing, Low Power Wide Area Network, Dedicated Short Range Communication, Wi-Fi, Augmented Reality Capabilities as described above in detail.

Referring to FIG. 10B, in some embodiments a heating element 717 is incorporated into the load bearing subsurface base panel 715 for the purpose of melting ice and snow on the surface tactile panel 710. A further embodiment replaces the solar cells in the load bearing subsurface base panel 715 with a plurality of heating elements 717 with power supplied by an external power source via cables 792 through the conduit 790.

Figure 11A:
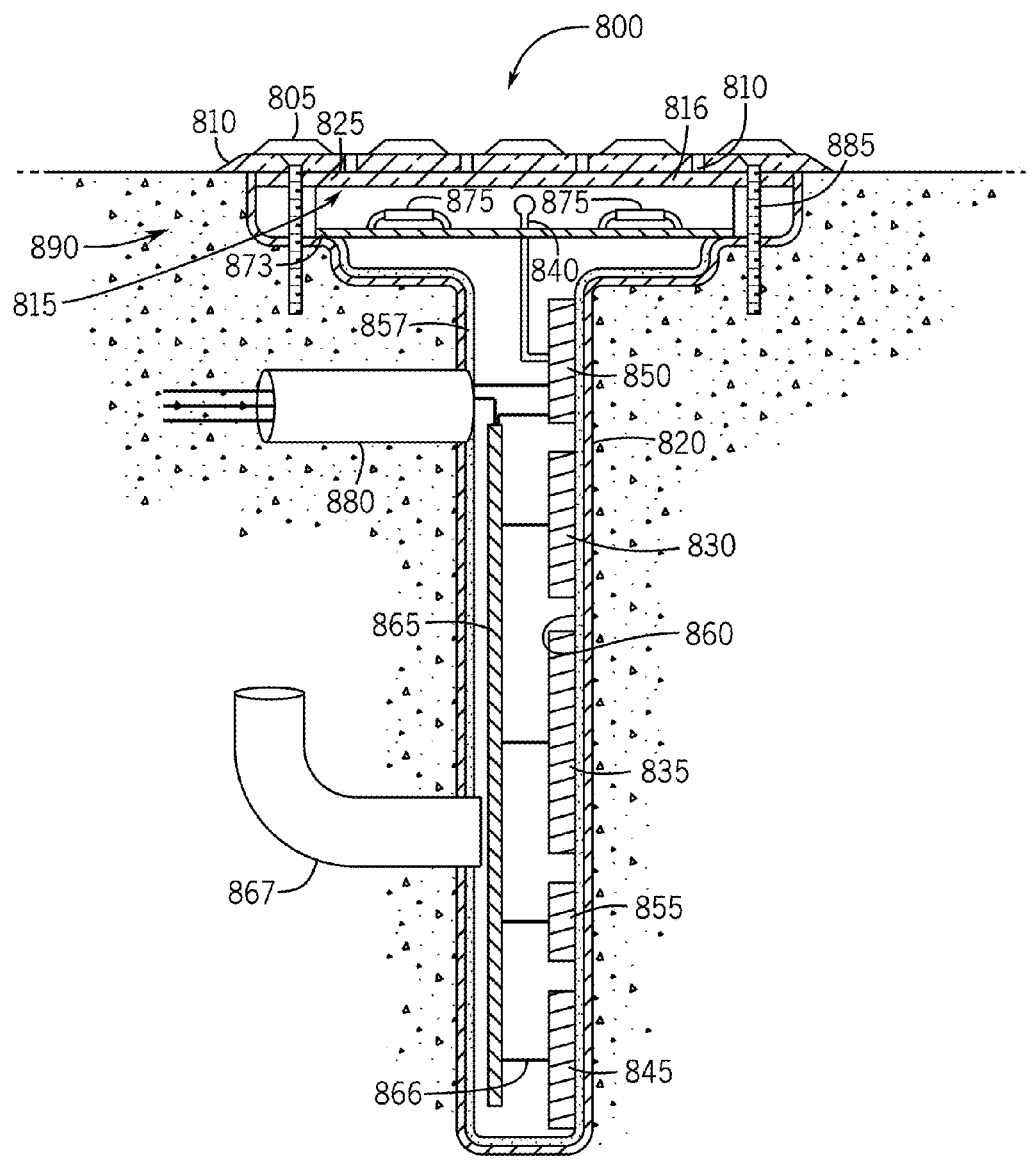
FIG. 11A is a profile view of the present invention with multiple panel layers, including a solar panel, and a vertically extended subsurface enclosure to facilitate temperature control.
Figure 11B:
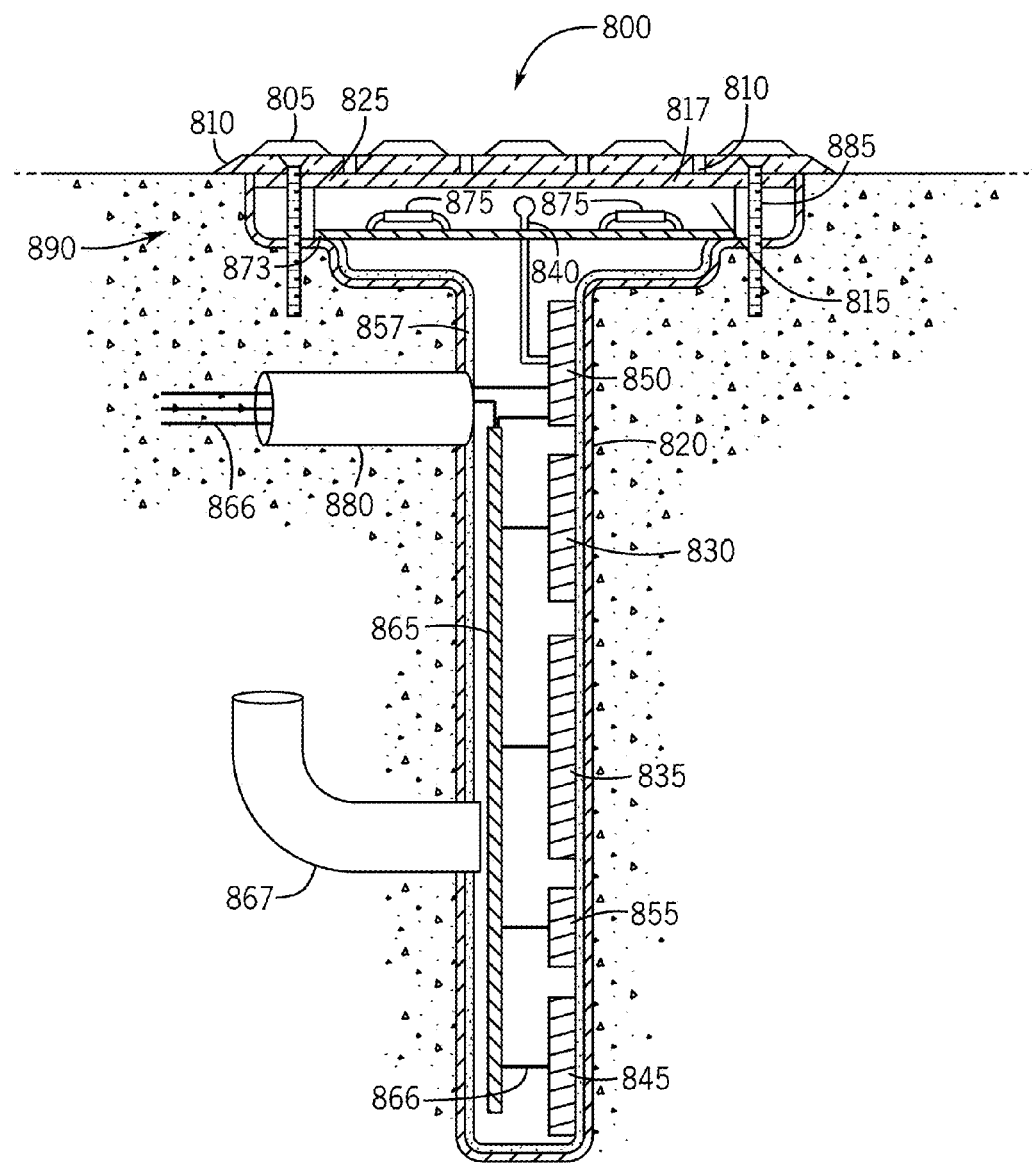
FIG. 11B is a profile view of the present invention with multiple panel layers, including a video screen, and a vertically extended subsurface enclosure to facilitate temperature control.

A further embodiment of the present invention is depicted in FIGS. 11A and 11B which provides a profile view of the TWPA 800 comprising an surface tactile panel 810, and a load bearing subsurface base panel 815 and a vertically elongated subsurface container 820 housing a plurality of components including but not limited to sensors 825, electronics 830, computer processors 835, antenna 840, batteries 845, wireless transmitting and receiving units 850 and other electronic equipment 855 enabling the TWPA's many functions. Additional components include, but are not limited to, electromagnetic shielding material 857. The purpose of the elongated subsurface container 820 is to facilitate cooling. Each component within the container is mounted to the vertical external wall 860 and connected with wires through a wiring harness tray or conduit 865 that is attached to the inside of the container wall 860 to contain wires 866. In some embodiments, there is an internal lid 873 and handles 875 on the lid 873 which enable the lid 873 to be removed so that components within the subsurface container 820 can be removed for inspection, repair, replacement, upgrades to electronic components or other purposes. One embodiment provides for wired 866 access external to the TWPA through a conduit 880 and provides for a conduit 867 for exhaust or venting purposes.

Referring to FIG. 11A, the TWPA 800 with an elongated subsurface container 820 incorporates a surface tactile panel 810 with tactile raised features 805. The load bearing subsurface base panel 815 has incorporated in it, a solar panel 816 comprising a plurality of solar cells. Referring to FIG. 11B, the TWPA 800 with an elongated subsurface container 820 incorporates a surface tactile panel 810 with tactile raised features 805. The load bearing subsurface base panel 815 has incorporated, a video screen 817. In each instance, the surface tactile panel 810 and load bearing subsurface base panel 815 are attached to the elongated container 820 with fasteners, preferably corrosion resistant fasteners 885 that anchor the surface tactile panel 810 to the subsurface elongated container 820 in addition to anchoring the TWPA into a concrete, concrete mix, ground or similar substrate 890.

Figure 11C:
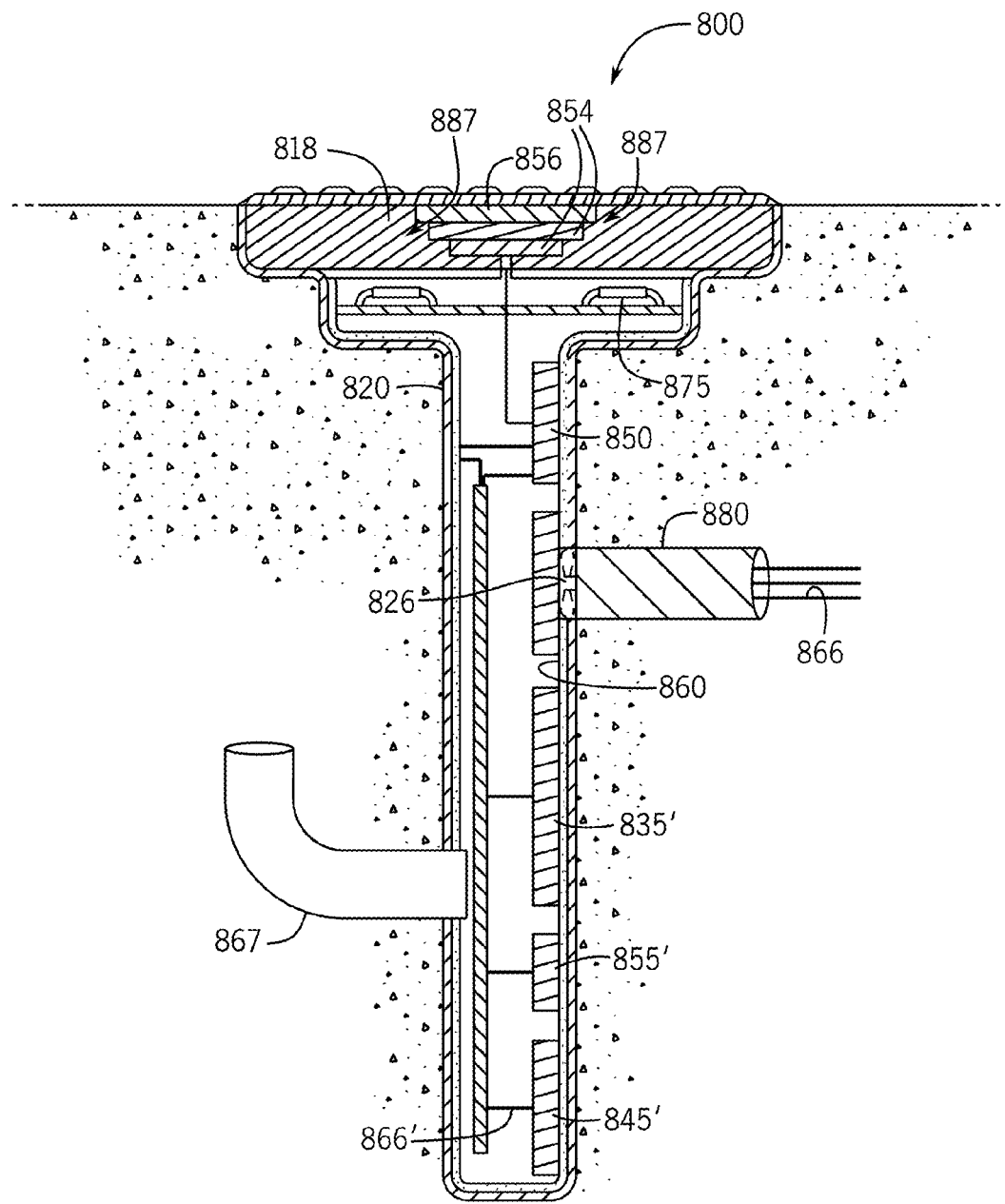
FIG. 11C is a profile view of the present invention with an integrated antenna and a vertically extended subsurface enclosure to facilitate temperature control.

FIG. 11C illustrates a load bearing surface tactile panel 818, with a molded space 854 for the placement of an antenna plate unit 856. The surface plate of the antenna plate unit 856 is comprised of composite material that is suitable for the transmission of radio frequency signals. The edges of the plate have small protrusions 887 that fit into the notch holes on the edge of the molded space 854 into the surface panel 818 causing the tactile raised features to align properly. In an alternative embodiment, a fan 826 moves air into and out of the enclosure 820 for cooling and venting purpose in association with conduits 867 and 880.

Figure 12:
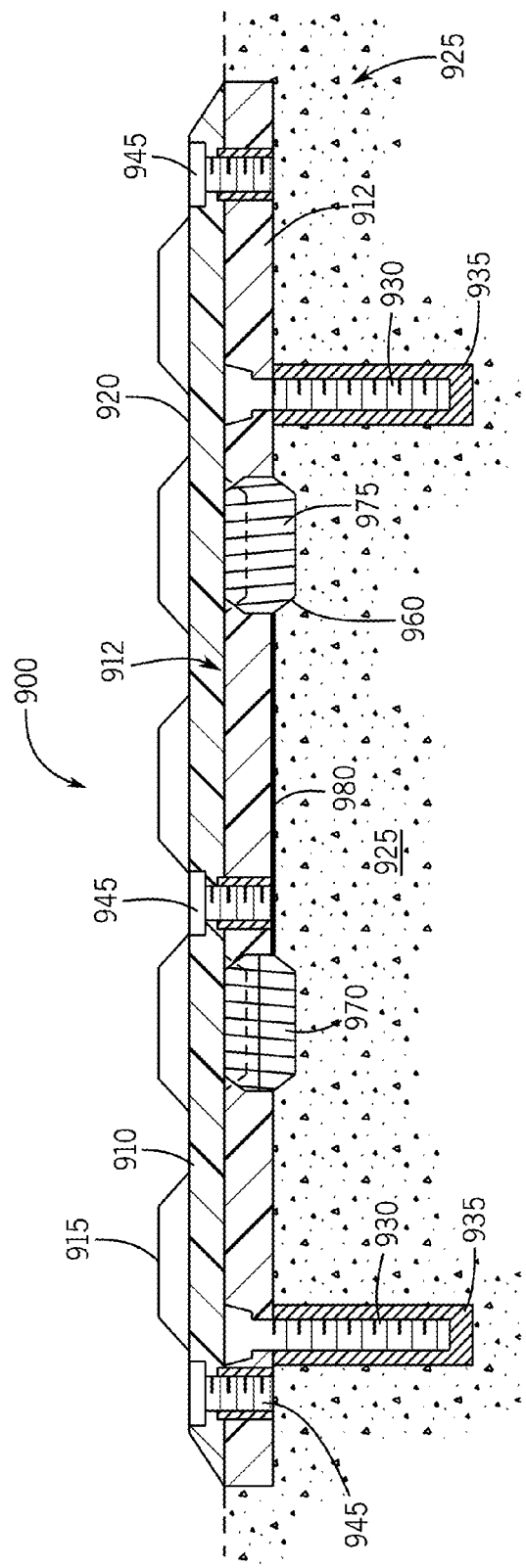
FIG. 12 is a profile view of the present invention incorporating a subsurface securement plate with void cavities therein for accommodating wireless electronic devices.

FIG. 12 provides another embodiment of the TWPA 900 of the present invention. The TWPA 900 comprises a surface tactile panel 910 and a securement plate 912. The surface tactile panel 910 preferably comprises an array of truncated domes 915 that provide a tactile warning panel. The truncated domes 915 project upward from the planar surface 920 of the surface tactile panel 910. The TWPA preferably comprises a plurality of fasteners so that the surface tactile panel 910 can be releasably attached 945 to the securement plate 912. In other embodiments, the fasteners allow permanent or releasable attachment to the securement plate 912 that forms part of the TWPA. The securement plate 912 is attached to a concrete, concrete mix or other solid substrate 925 by corrosion resistant fasteners 930 that screw into anchors or sleeves 935 that are imbedded in the ground substrate 925. The surface tactile panel 910 is in turn attached to the securement plate 912 by corrosion resistant fasteners 945. The surface tactile panel 910 incorporates tactile raised features, the truncated domes 915, and is preferably formed from steel, thermoplastic, sheet molding compound or other non-metallic composite material. In some embodiments, the securement plate 912 is formed from, metal, steel, thermoplastic, thermoset plastic sheet molding compound or other non-metallic composite material, or other composite material and has indentation features, pockets, or void cavities 960 therein that accommodate the placement of beacons 970 and batteries 975, along with transmitters or receivers that are positioned between the surface tactile panel 910 and the securement plate 912. In some embodiments, the electronic components 970 are connected to a battery 975 by a wire 980 that lays in an elongated indentation on either the lower or upper surface of the securement plate 912. In other preferred embodiments, batteries are integrated into the housing of the electronic components.

Figure 13:
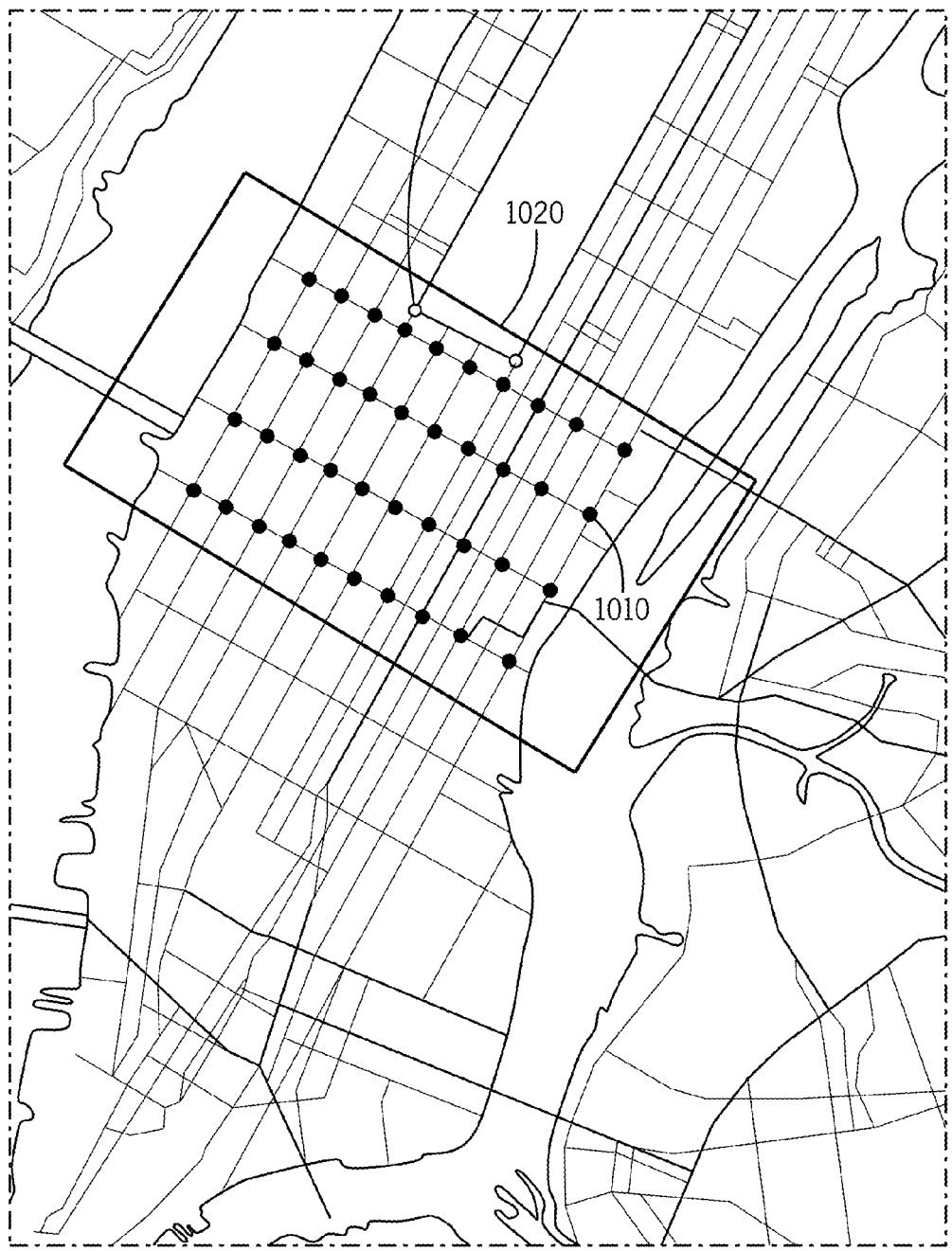
FIG. 13 is a plan view depiction of a city street grid configuration of the present invention.

Deployment of TWPAs at every intersection as shown in FIG. 13 enables large data capture capabilities within a cities grid of intersections for a multitude of purposes ranging from traffic counts, types of vehicles, pedestrian flow and counts when sensors are incorporated into the TWPAs. In some embodiments, the TWPAs of the present invention serve as an array of distributed processors in a Fog Computing and server configuration in a smart city deployment as also shown in FIG. 13. In addition, FIG. 13 depicts a network of TWPAs at every street corner sidewalk handicap ramp 1010 deployed in a densely populated urban area 1020 within a city.

Figure 14A:
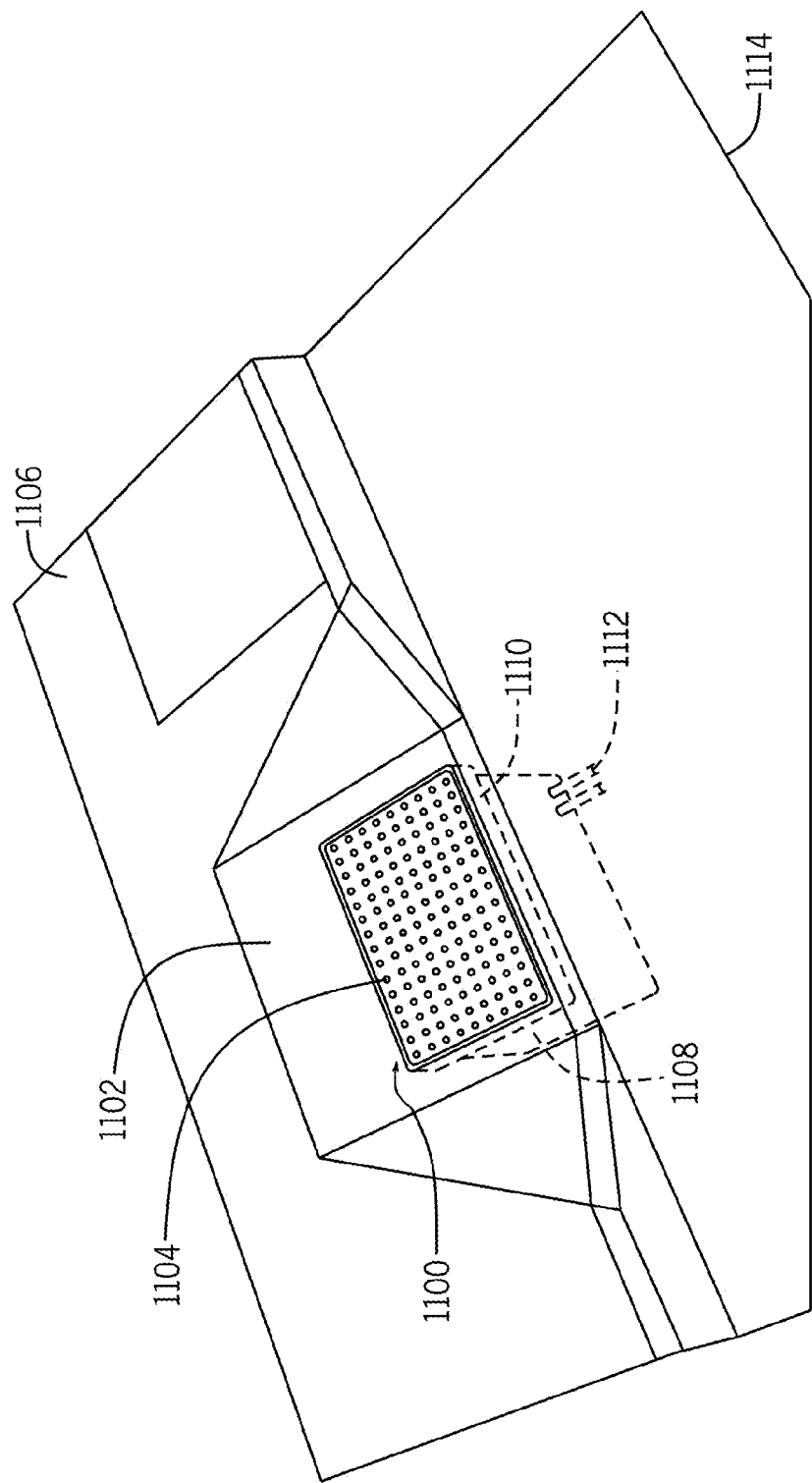
FIG. 14A is a 3D view showing the surface tactile panel and the subsurface enclosure of the present invention.

FIG. 14A shows a three dimensional view of the installation of the TWPA 1100 in a handicap ramp 1102. ADA rules and regulations along with State jurisdictions provide the approved designs for both handicap ramps 1102 and the tactile warning panel 1104. Typically, the handicap ramp 1102 and adjacent sidewalk 1106 is formed and poured using concrete. In most cases, the TWPA 1100 will be located in public right-of-way in a sidewalk handicap ramp 1102 or at transit stops/crossings. The tactile warning panel 1104 is installed near the roadway side 1114 of the ramp. Further, FIG. 14A provides a view of the tactile warning panel 1104, the subsurface enclosure 1108, the frame 1110 which is embedded in the concrete and conduit penetrations 1112 which enter the subsurface enclosure 1108 underground. Only the tactile warning panel 1104 will be visible once the TWPA 1100 is installed, backfilled and the concrete poured and cured.

Figure 14B:
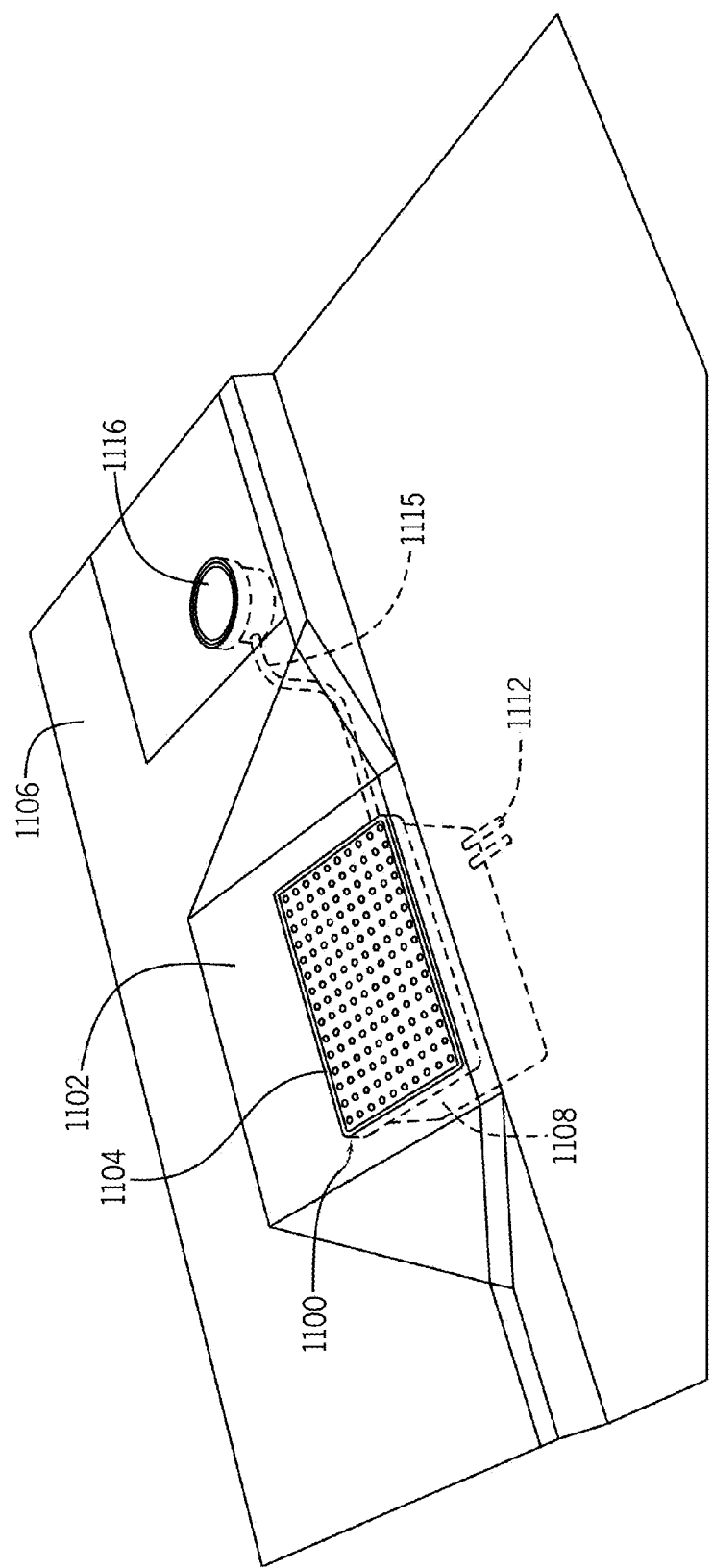
FIG. 14B is a 3D view showing the surface tactile panel and the subsurface enclosure of the present invention with a conduit connection to a ground or surface level antenna system.

FIG. 14B shows another three dimensional view of the installation of the TWPA 1100 in a handicap ramp 1102. The tactile warning panel 1104 and subsurface enclosure 1108 are in the handicap ramp 1102. The subsurface enclosure 1108 has conduit penetrations 1112. The sidewalk 1106 is formed and poured with concrete. In addition, the TWPA 1100 has a conduit 1115 that connects the TWPA 1100 to a ground level manhole enclosure 1116 that houses an external antenna.

Figure 15:
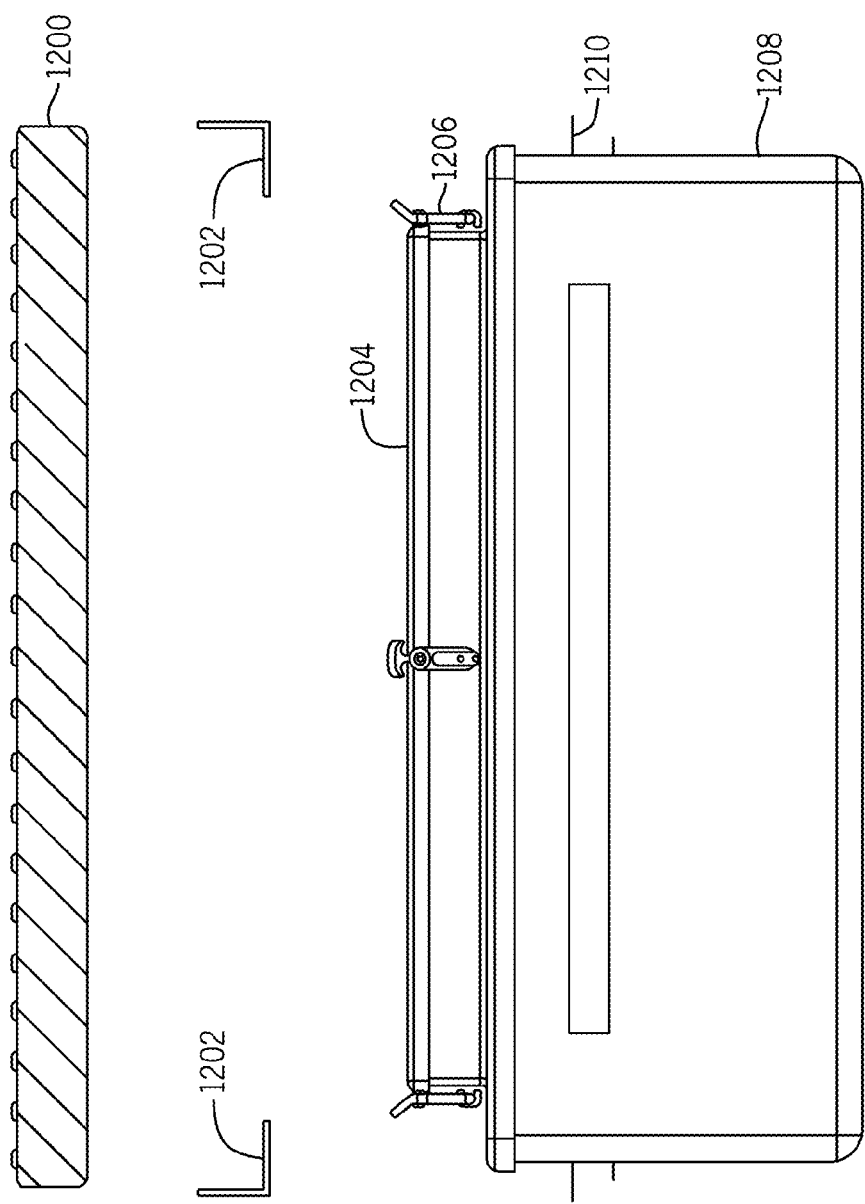
FIG. 15 is a profile view showing the load bearing upper surface tactile panel and the other components that make up the apparatus and system of the present invention.

The TWPA is made up of many different system components. FIG. 15 shows one design of the TWPA and system. This embodiment shows a one-piece load bearing surface tactile panel 1200. The load bearing characteristics, a minimum of five (5) tons up to and exceeding sixty (60) tons, of the load bearing surface tactile panel 1200 is required since in the TWPA application, the tactile warning panel has no support from the ground substrate (concrete) like it would if it was directly attached to the concrete ground substrate. All current industry-wide tactile warning panel designs rely on the strength of the ground substrate (concrete) in order to keep the tactile warning panel from becoming damaged if a vehicle or heavy truck like a loaded dump truck or semi were to drive up onto the handicap ramp. With the TWPA there is the additional requirement of not breaking through the tactile warning panel and thus damaging the expensive smart city technology housed in the subsurface enclosure 1208. The load bearing surface tactile panel 1200 preferably allows radio frequency signals to travel through it from wireless technology in the above or in the subsurface enclosure 1208 and is formed from materials including, but not limited to, fiber reinforced plastic, plastic composites, polyurethane and glass fiber, composites and polymeric materials. Suitable polymeric materials include, but are not limited to, plastic, thermoset plastic, thermoplastic, plastic composite, sheet molding compound, fiber composite, fiberglass, or combinations thereof.

The different system components shown in FIG. 15 include a load bearing surface tactile panel (all one-piece panel) 1200, a metal or plastic composite frame 1202 that the load bearing surface tactile panel 1200 sits in or is secured to. The frame 1202 is embedded in the concrete or other ground substrate, a waterproof enclosure lid 1204 attached to the subsurface enclosure 1208, locking and tightening screws/latches/straps 1206 that secure the waterproof enclosure lid 1204 to the top of the subsurface enclosure 1208. One embodiment includes a side channel 1210 attached to the subsurface enclosure 1208 to secure the subsurface enclosure 1208 to the surrounding substrate. The subsurface enclosure 1208 is preferably waterproof and formed from materials including, but not limited to, stainless steel, aluminum, alloys, fiber reinforced plastic, polymeric concrete, plastic composites, composites and polymeric materials. Suitable polymeric materials include, but are not limited to, plastic, thermoset plastic, thermoplastic, plastic composite, sheet molding compound, fiber composite, fiber reinforced plastic, polymer concrete or combinations thereof. Polymeric materials may also include metal particles to provide shielding from electromagnetic interference and pulses.

Figure 16:
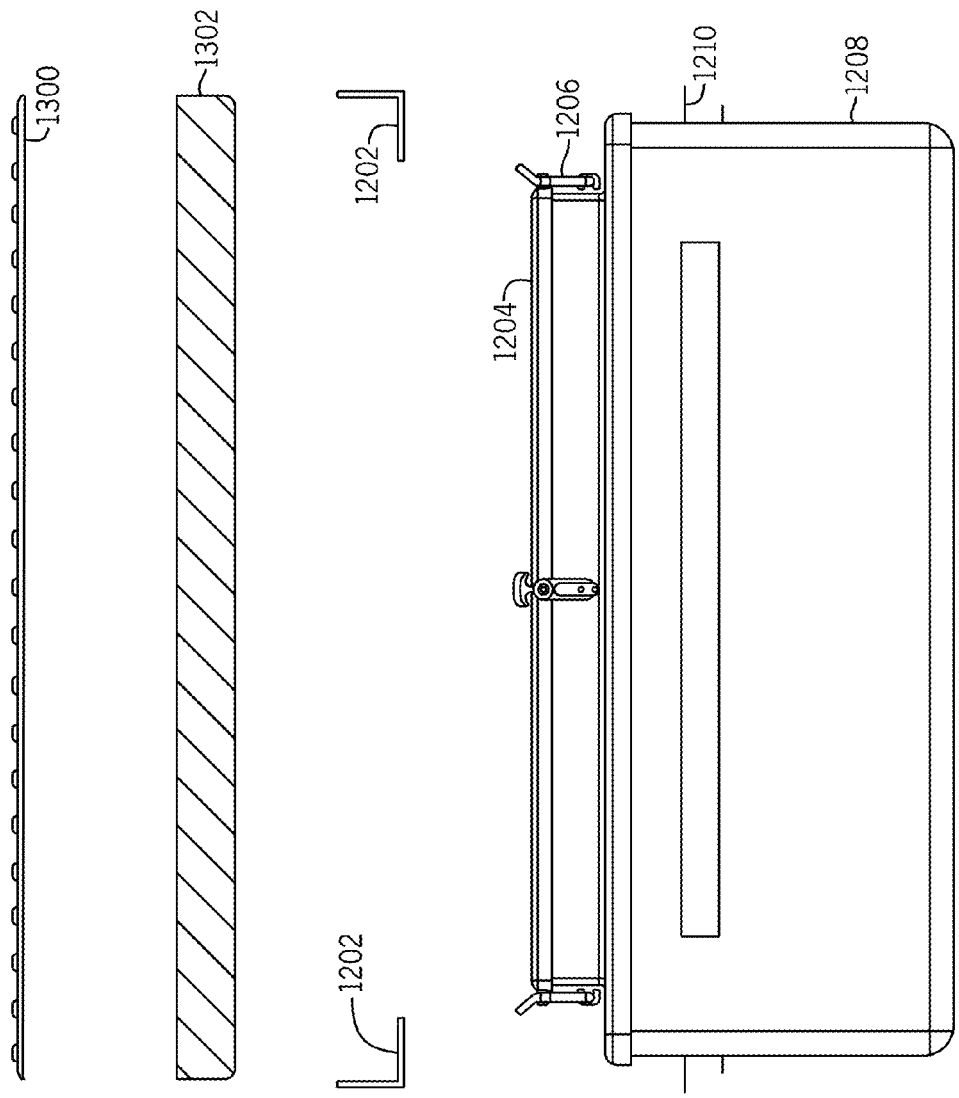
FIG. 16 is a profile view showing the upper surface panel, a load bearing subsurface panel and the other components that make up the apparatus and system of the present invention.

Another embodiment of the present invention is shown in FIG. 16. This design shows a system that provides both a non-load bearing surface tactile warning panel 1300 and a load bearing subsurface base panel without tactile features 1302. In this design the non-load bearing surface tactile warning panel 1300 is secured with fasteners to the load bearing subsurface base panel without tactile features 1302. Another embodiment of the invention secures the surface tactile warning panel 1300 through the use of adhesives and/or in combination with fasteners. The load bearing characteristics, of a minimum of five (5) tons up to and exceeding sixty (60) tons, of the load bearing subsurface base panel without tactile features 1302 is required since in this application the non-load bearing surface tactile warning panel gets no support from the ground substrate (concrete) like it would if it was directly attached to the concrete ground substrate. All current industry wide tactile warning panel designs rely on the strength of the ground substrate (concrete) in order to keep the tactile warning panel from becoming damaged if a vehicle or heavy truck like a loaded dump truck or semi were to drive up onto the handicap ramp. With the TWPA there is the additional requirement of not breaking through the surface tactile warning panel and thus damaging the expensive smart city technology housed in the subsurface enclosure 1208. The non-load bearing surface tactile warning panel 1300 and preferably allows radio frequency signals to travel through it from wireless technology in or on top of the subsurface enclosure 1208 and is formed from materials including, but not limited to, fiber reinforced plastic, plastic composites, poly urethane and glass fiber, composites and polymeric materials. Suitable polymeric materials include, but are not limited to, plastic, thermoset plastic, thermoplastic, plastic composite, sheet molding compound, fiber composite, fiber reinforced plastic, or combinations thereof. In one embodiment of the invention, the load bearing subsurface base panel 1302 preferably also allows radio frequency signals to travel through it from wireless technology in or on top of the subsurface enclosure 1208 and is formed from materials including, but not limited to, fiber reinforced plastic, plastic composites, poly urethane and glass fiber, composites and polymeric materials. Suitable polymeric materials include, but are not limited to, plastic, thermoset plastic, thermoplastic, plastic composite, sheet molding compound, fiber composite, or combinations thereof.

The different system components shown in FIG. 16 include a non-load bearing surface tactile warning panel 1300, a load bearing subsurface base panel without tactile features 1302, a metal or plastic composite frame 1202 that the load bearing subsurface base panel without tactile features 1302 sits in or is secured to and the frame 1202 that gets embedded in the concrete or other ground substrate, a waterproof lid 1204 attached to the subsurface enclosure 1208, locking and tightening screws/latches/straps 1206 that secure the waterproof enclosure lid 1204 to the top of the subsurface enclosure 1208. One embodiment of the invention includes a side channel 1210 attached to the subsurface enclosure 1208 to secure the subsurface enclosure 1208 to the surrounding ground substrate composed of backfill material. The subsurface enclosure 1208 is preferably waterproof and formed from materials including, but not limited to, stainless steel, aluminum, alloys, fiber reinforced plastic, polymeric concrete, plastic composites, composites and polymeric materials. Suitable polymeric materials include, but are not limited to, plastic, thermoset plastic, thermoplastic, a plastic composite, sheet molding compound, bulk molding compound, fiber composite, polymer concrete or combinations thereof. Polymeric materials may also include metal particles to provide shielding from electromagnetic interference and pulses.

Figure 17:
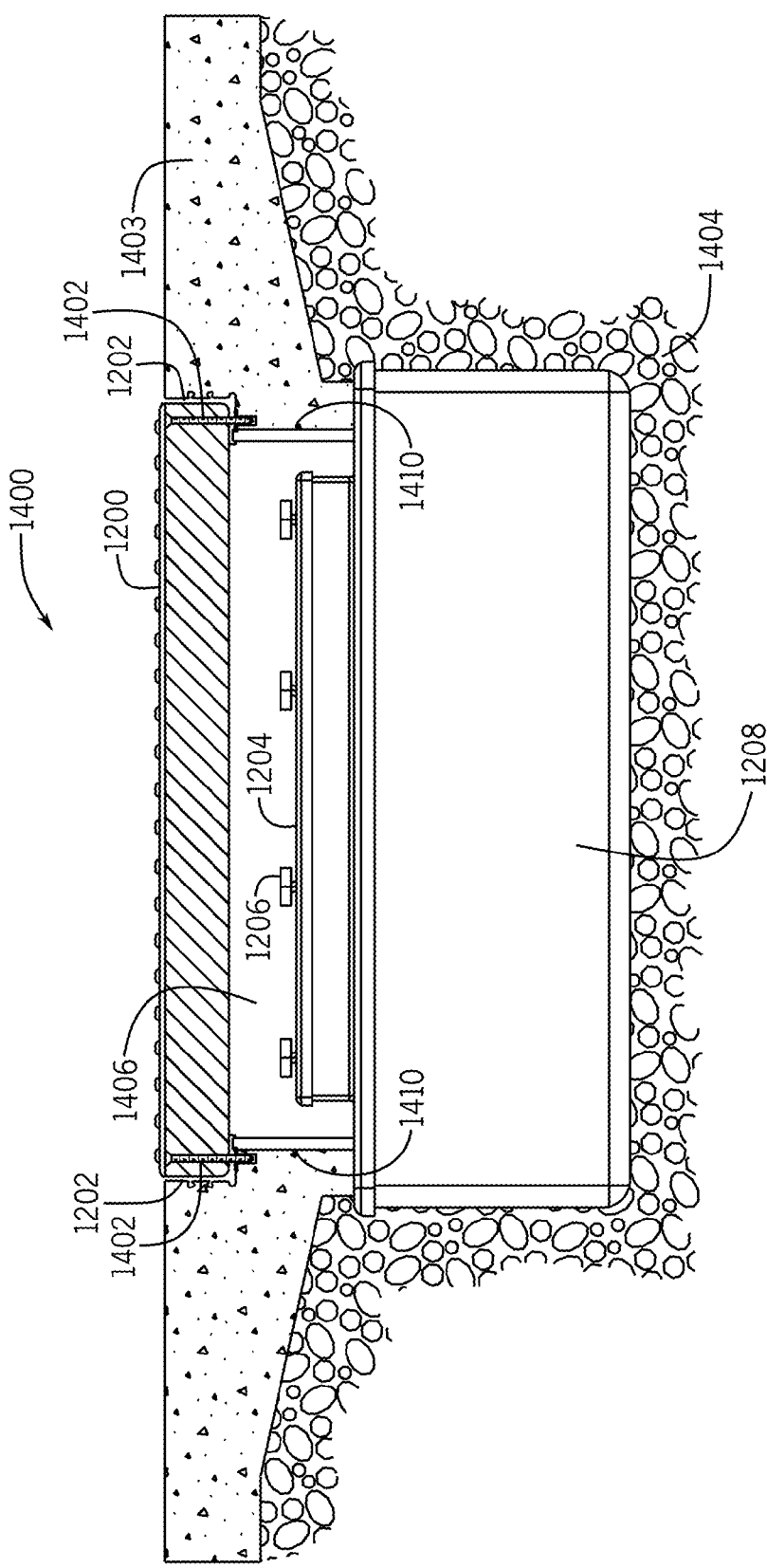
FIG. 17 is a profile view showing the present invention installed in the ground.

FIG. 17 shows a profile view of the TWPA 1400 installed in the ground, backfilled with washed stone 1404 and the surrounding concrete 1403. The subsurface enclosure 1208 includes a waterproof enclosure lid 1204 attached to the subsurface enclosure 1208, locking and tightening screws/latches/straps 1206 that secure the waterproof enclosure lid 1204 to the subsurface enclosure 1208. The subsurface enclosure 1208 is backfilled with washed stone 1404 prior to the concrete 1403 handicap ramp being poured and cured. The construction process includes installing plywood forms or a prefabricated plastic composite skirt 1410 to hold back the washed stone backfill 1404 and the concrete 1403 when it is poured. This creates an air space 1406 between the surface tactile panel 1200 and the subsurface enclosure 1208. This air space 1406 allows space for an underground antenna depicted in FIG. 18 or other equipment to be placed in this area. Referring back to FIG. 17, the frame 1202 made of steel or composite plastic material, is formed and embedded in the concrete 1403 handicap ramp or other sidewalk substrate. This frame 1202 will provide the seat for the load bearing surface tactile panel 1200. The load bearing surface tactile panel 1200 or in the alternative embodiment the non-load bearing surface tactile panel FIG. 16, 1300 attached to a load bearing subsurface base panel 1302, is seated in the frame 1202. The surface tactile panel 1200 is releasably fastened to the frame 1202 with a threaded bolt or secure locking mechanism 1402. The fastener 1402 could also be designed as a tamper-proof fastener. The combination of these system components make up the TWPA 1400.

Figure 18:
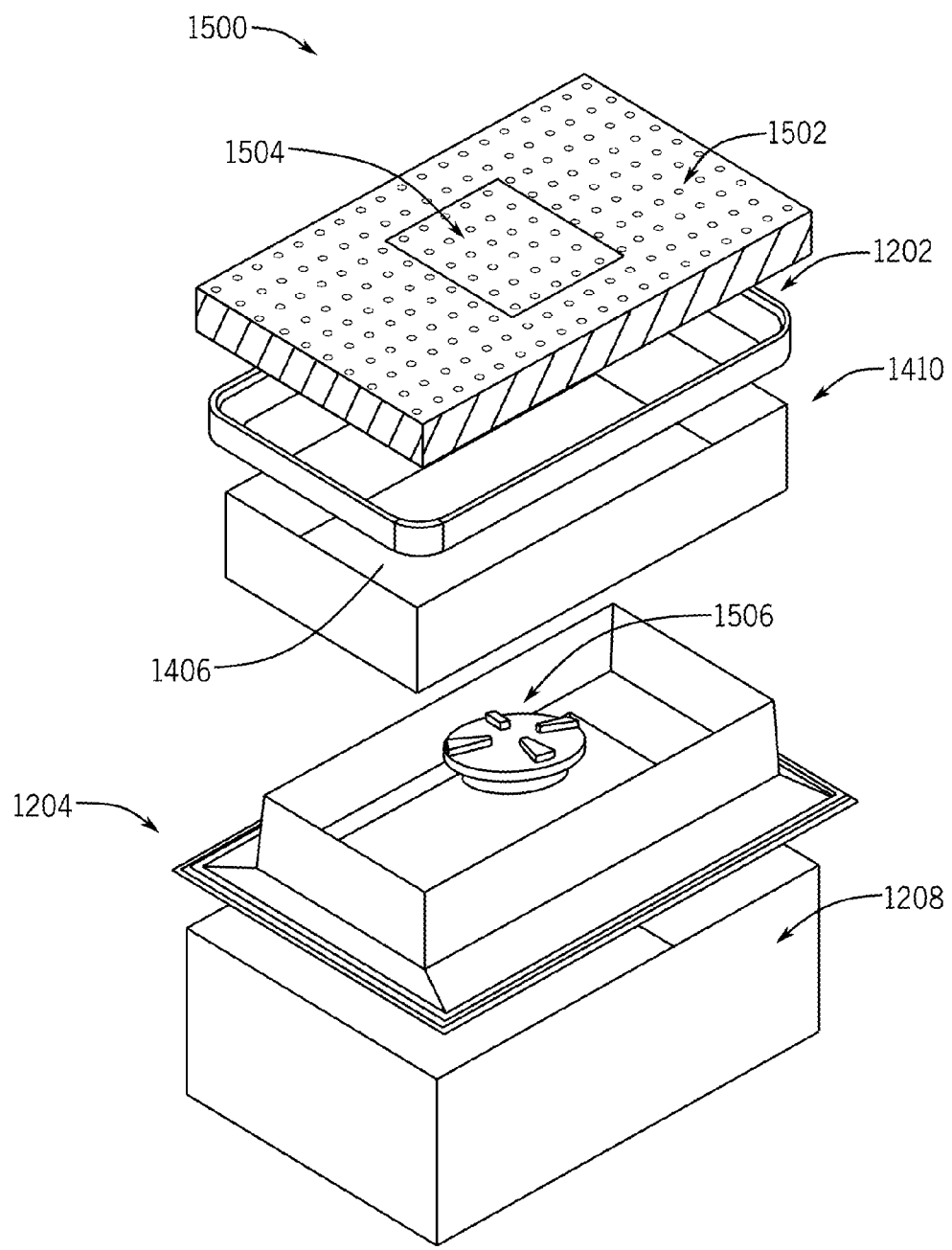
FIG. 18 is a 3D view showing the present invention with an antenna integrated into the tactile warning panel apparatus and system.

FIG. 18 shows a profile view of the TWPA that includes an integrated underground antenna 1500 embodiment. The different system components of this embodiment include a load bearing surface tactile panel 1502 with a smaller insertable load bearing surface tactile panel cover 1504 that allows radio frequency propagation or transmission through it. The frame 1202 made of steel or composite plastic material. This frame 1202 will provide the seat for the load bearing surface tactile panel 1502. The construction process includes installing plywood forms or a prefabricated plastic composite skirt 1410. The subsurface enclosure 1208 includes a waterproof enclosure lid 1204 attached to the subsurface enclosure 1208. The waterproof enclosure lid 1204 has locking and tightening screws/latches/straps (Refer to FIG. 15, 1206) that secure the waterproof enclosure lid 1204 to the subsurface enclosure 1208. The air space 1406 between the load bearing tactile panel 1502 and the subsurface enclosure 1208 allows space for a subsurface antenna 1506 to be placed in this area under the smaller insertable load bearing tactile warning panel 1504. The subsurface enclosure 1208 is preferably waterproof and formed from materials including, but not limited to, stainless steel, aluminum, alloys, fiberglass, polymeric concrete, plastic composites, composites and polymeric materials. Suitable polymeric materials include, but are not limited to, plastic, thermoset plastic, thermoplastic, a plastic composite, sheet molding compound, fiber composite, fiber reinforced plastic, polymer concrete or combinations thereof. Polymeric materials may also include metal particles to provide shielding from electromagnetic interference and pulses.

Figure 19:
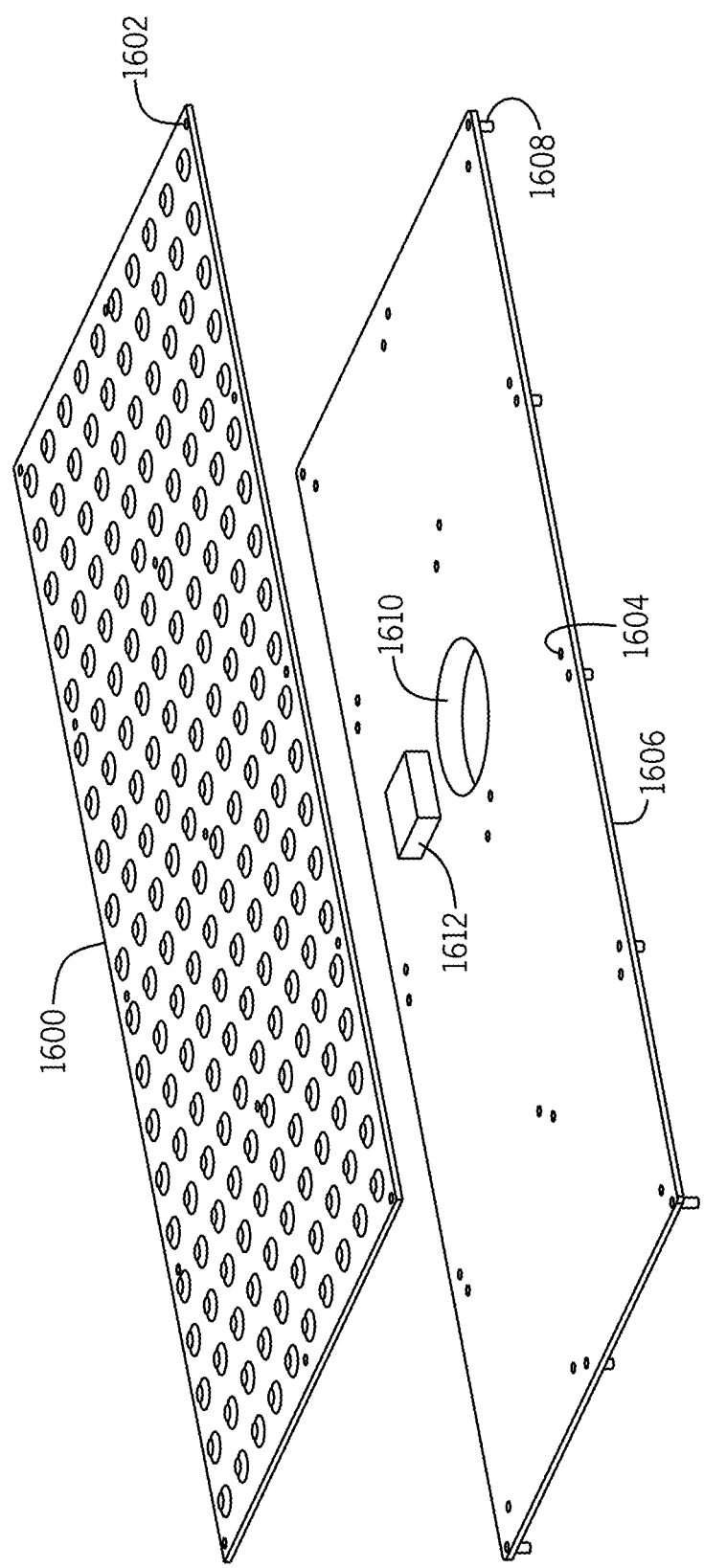
FIG. 19 illustrates a upper surface tactile panel with a lower base plate which has a cavity built in it for the placement of beacons and other technology.

Another embodiment of the TWPA is shown in FIG. 19 which illustrates the surface tactile panel 1600, placed directly above a securement plate 1606. This two-panel system is described in more detail in Henshue Pending U.S. patent Ser. No. 14/661,853, incorporated herein by reference in its entirety. FIG. 19 also illustrates the round through-holes 1602 in the surface tactile panel 1600 aligning with the receivers 1608 in the lower base plate 1606. In addition, FIG. 19 illustrates anchor-holes 1604 which are used to anchor and fasten the securement plate 1606 to the existing preformed ground surface. Also, shown in FIG. 19 is a pocket space 1610 built into the securement plate 1606 to place a beacon 1612 below the surface tactile panel 1600.

Figure 20:
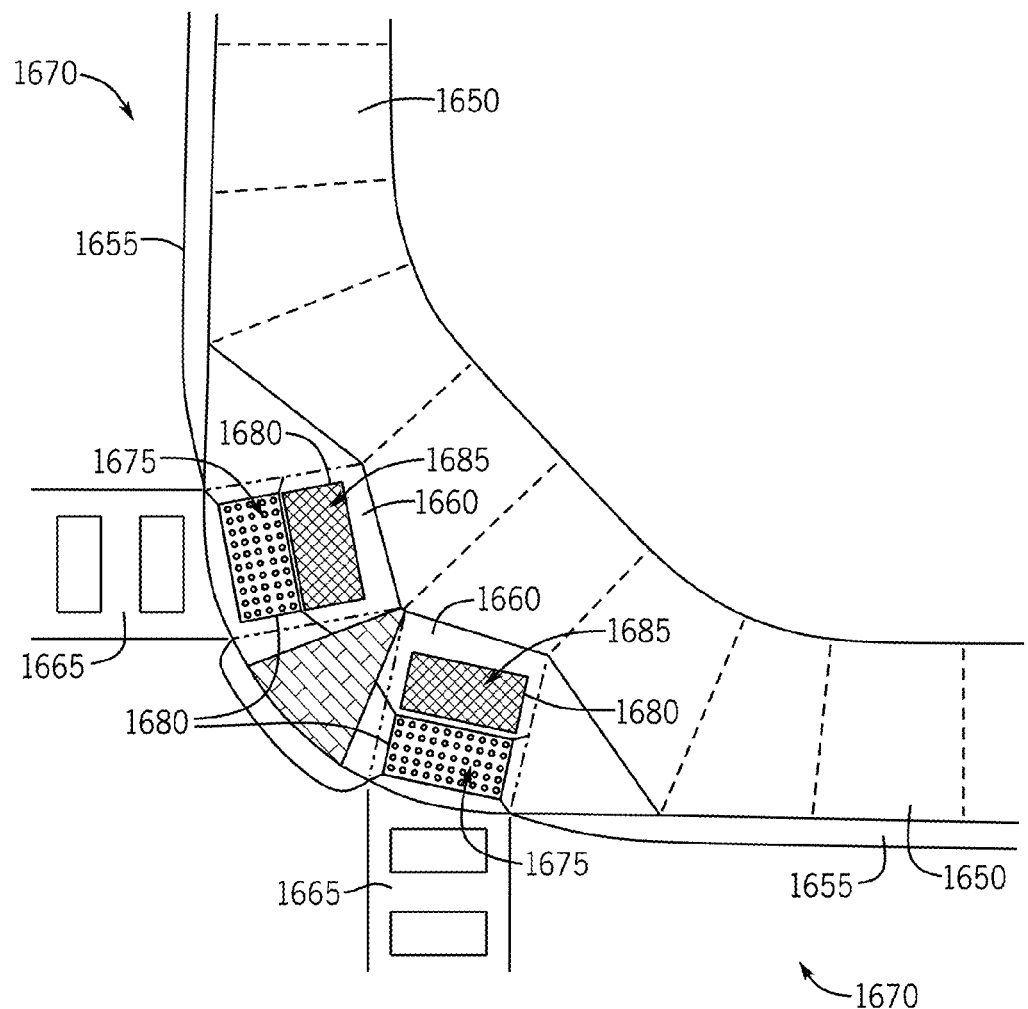
FIG. 20 is a plan view showing the lateral placement of multiple tactile warning panel apparatuses and systems in curb ramps at a street corner.

Another embodiment of the TWPA is shown in FIG. 20 illustrates a plan view of a typical city sidewalk 1650, curb & gutter 1655, handicap ramps 1660, crosswalks 1665 and street 1670. A typical city sidewalk 1650 is approximately 6' wide. A typical city ADA handicap ramp 1660 has a maximum slope from the sidewalk 1650 to the street 1670 of approximately 10 percent. Public right-of-way handicap ramps 1660 require the installation of an ADA compliant tactile warning panels 1675. With the present invention, a load bearing surface tactile panel 1675 is installed with the TWPA 1680. An alternate embodiment of the present invention is to place next to each other two TWPAs 1680 in a single handicap ramp 1660. This construction method will double the amount of TWPAs 1680 in any one handicap ramp 1660. This construction method will decrease the overall construction costs per TWPA 1680 since a great deal of the construction cost relates to the removal, excavation and replacement of the concrete sidewalk 1650, curb & gutter 1655, handicap ramp 1660 and street 1670 abutting the curb and gutter 1655. The load bearing surface tactile panel 1685 furthest setback from the street 1670 may or may not have a different type of tactile texture on its surface. In an alternate embodiment, the two separate TWPAs 1680 in a single handicap ramp 1660 are connected with conduit. Another embodiment includes all four separate TWPAs 1680 in two handicap ramps 1660 being connected together with subsurface conduit.

Figure 21:
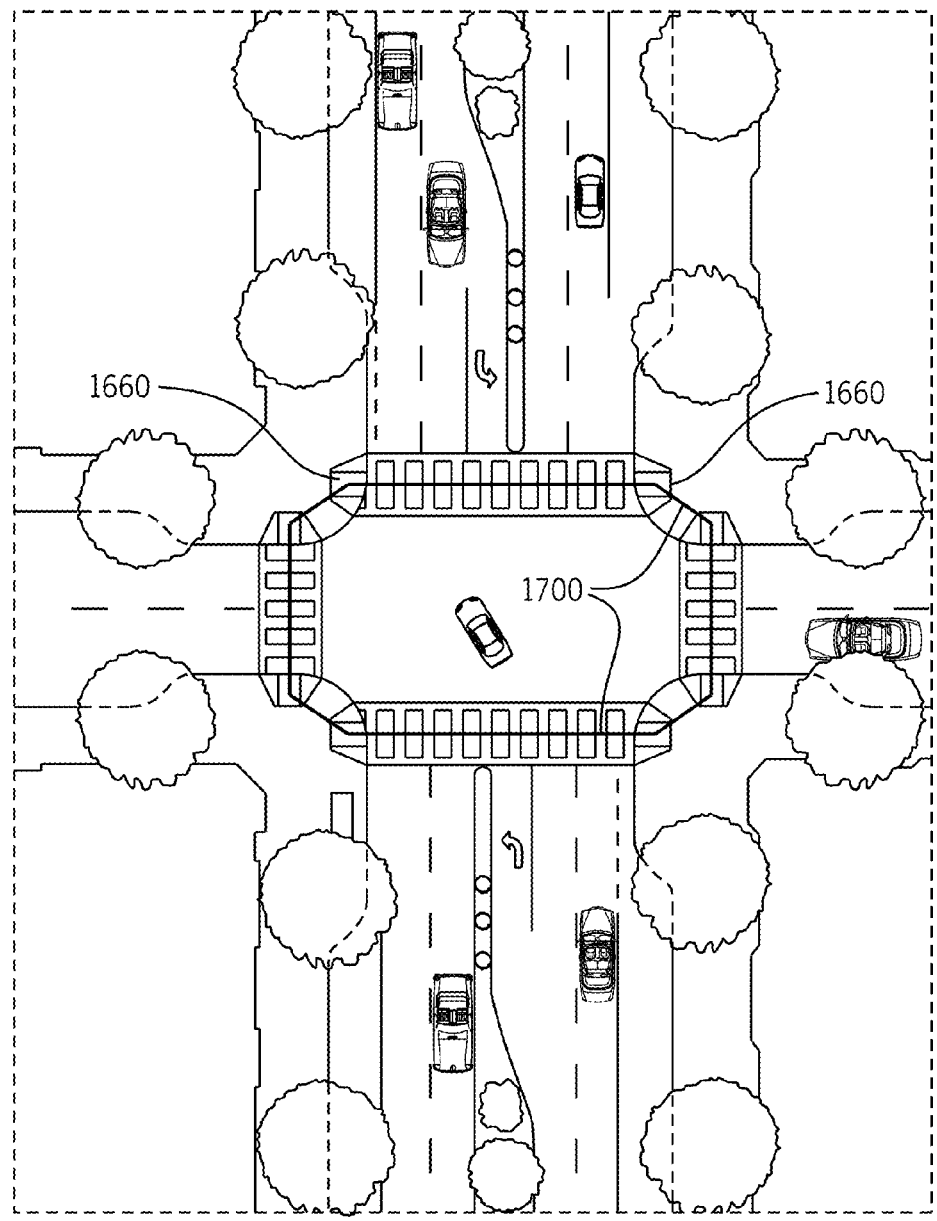
FIG. 21 shows multiple interconnected tactile warning panel apparatuses and systems in the curb ramps at a street intersection.

Another embodiment of the present invention is shown in FIG. 21. This drawing shows how all the TWPAs in the handicap ramps 1660 in a city intersection can be interconnected with subsurface conduit 1700.

Figure 22A:
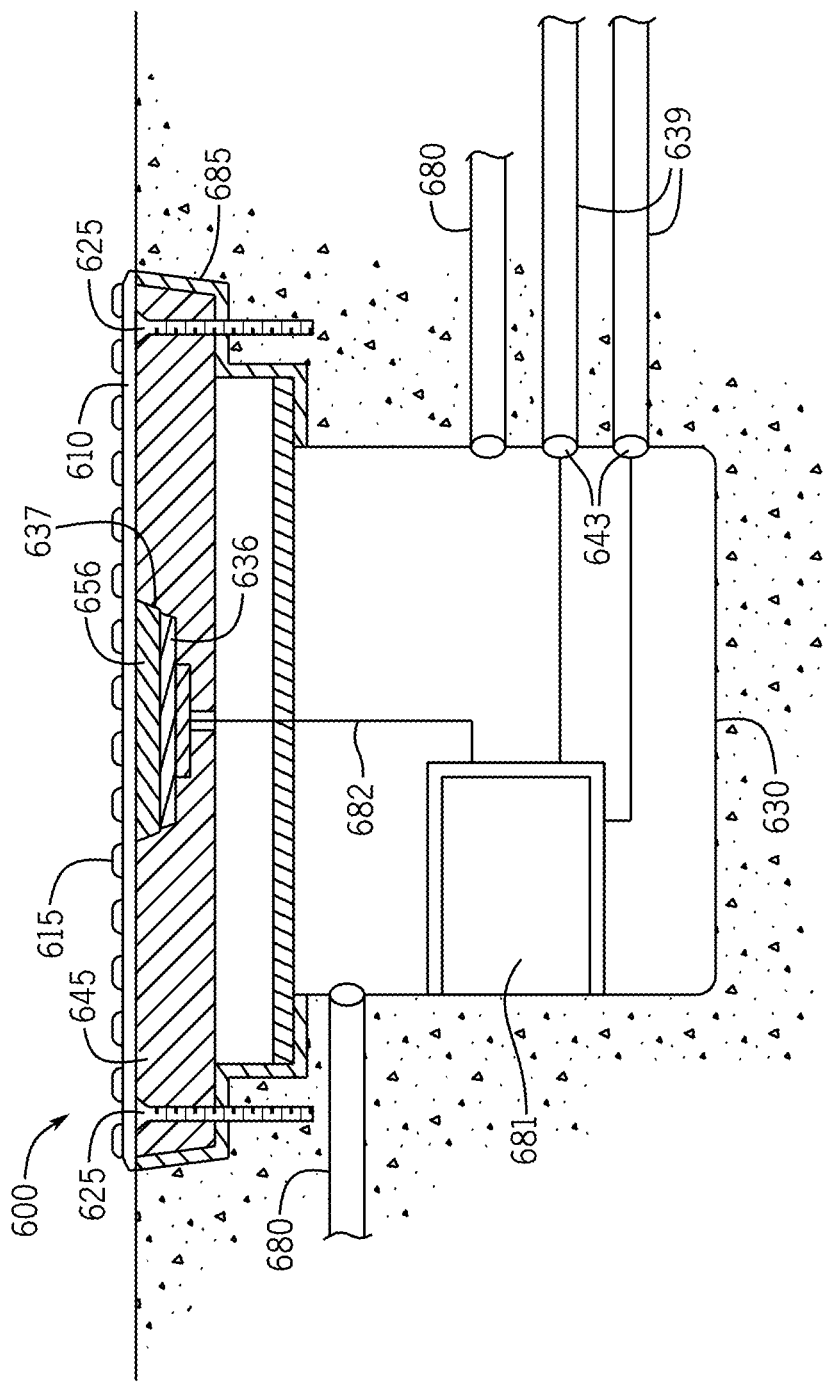
FIG. 22A shows a profile view of the present invention with an antenna integrated into the surface tactile panel.

In some embodiments, the TWPA 600 of the present invention, FIG. 22A illustrates a profile view of an embodiment of the present invention showing the incorporation of an antenna unit 636 into a housing nested under a non-load bearing surface tactile panel 610 with truncated domes on its upper surface 615 where the load bearing subsurface base panel 645 has molded into it, a housing 656 to allow for the insertion of an antenna unit 636 into the housing plate 656. Also illustrated is a frame 685 for the support of the combination of a non-load bearing surface tactile panel 610 attached to a load bearing subsurface base panel 645 which is attached by releasable fasteners 625 to the frame 685 which is formed in the surrounding substrate of concrete or other supporting material. The housing plate 656 installed in the load bearing subsurface base panel 645 is also load bearing and has truncated domes 615 matching and in alignment with the truncated domes 615 on the non-load bearing surface tactile panel 610. Small protrusions 637 on the edge of the housing plate 656 of the antenna unit 636 match and fit into the notches molded into the load bearing subsurface base panel. The radio 681 is connected by a wire 682 to an antenna unit 636 located above the subsurface enclosure 630 in the housing plate 656 for the antenna unit 636. Also, depicted in FIG. 22A is a conduit 680 for venting and separate conduits 639 for the provisioning of power, communication and other connections. Special watertight and/or waterproof fittings 643 attach the conduit 680 for venting and the separate conduits 639 to the subsurface enclosure 630.

Figure 22B:
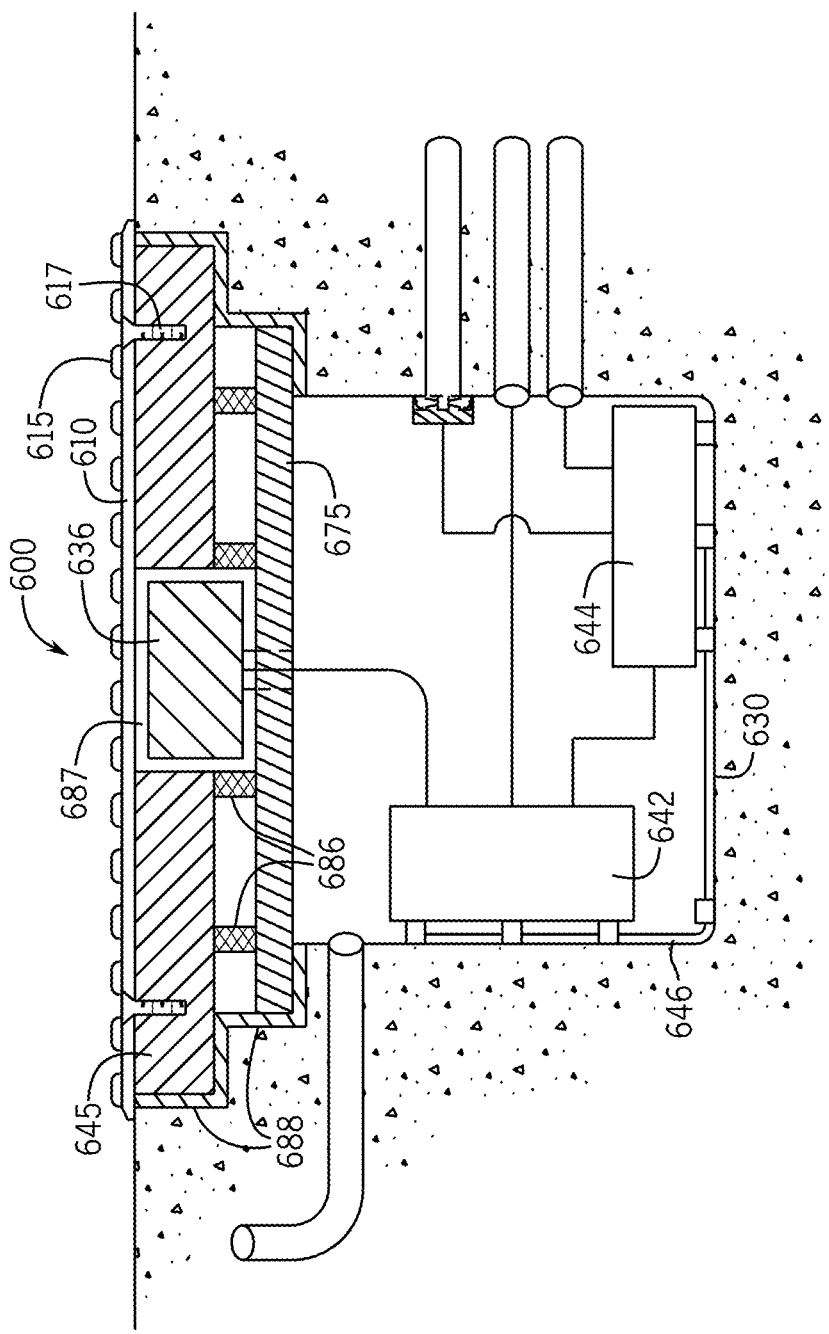
FIG. 22B shows a profile view of the present invention which illustrates the use of a releasable surface tactile panel and a Double L-Channel frame configuration to enable the insertion and support of an antenna under the surface tactile panel.

FIG. 22B illustrates the TWPA 600 and the incorporation of a double L-channel frame 688 in the surrounding concrete or other suitable substrate for the placement of the current TWPA 600 invention in the ground. The double L-channel frame 688 enables the placement of a non-load bearing surface tactile panel 610 connected to a load bearing subsurface base panel 645. In addition, the double L-channel frame 688 also supports a load bearing lower plate 675 which supports load bearing columns 686. The purpose of the columns 686 is to enable the load bearing lower plate 675 to support the housing cavity 687 while also accommodating an antenna unit 636 placed in the cavity 687. The top of the double L-channel frame 688 holds the non-load bearing surface tactile panel 610 which is releasably attached with fasteners 617 to a load bearing subsurface base panel 645. The lower portion of the double L-channel frame 688 supports the load bearing lower plate 675 that may also serve as the lid to the subsurface enclosure 630 or remain separate and above the subsurface enclosure 630 lid leaving a void space which acts as an air barrier.

FIG. 22B also depicts a profile view illustrating the double L-channel frame 688 which accommodates an antenna unit 636 placed in a housing cavity 687 nested that resides just beneath the surface of the non-load bearing surface tactile panel 610. A preferred embodiment of the invention includes a non-load bearing surface tactile panel 610 with truncated domes 615 that is attached to the top of the load bearing subsurface base panel 645 by releasable and tamperproof fasteners 617. The non-load bearing surface tactile panel is composed of various materials and can be decorated using Henshue U.S. Pat. Nos. 9,311,831 B2 and 9,361,816 B2 incorporated herein. FIG. 22B further depicts an embodiment of the current invention that accommodates batteries 644 as rechargeable power supplies for radios and electronic equipment 642 housed in the enclosure 630. Also depicted are equipment racks 646 that hold electronic equipment 642, rechargeable power supplies, etc. that are housed in the subsurface enclosure 630.

Figure 22C:
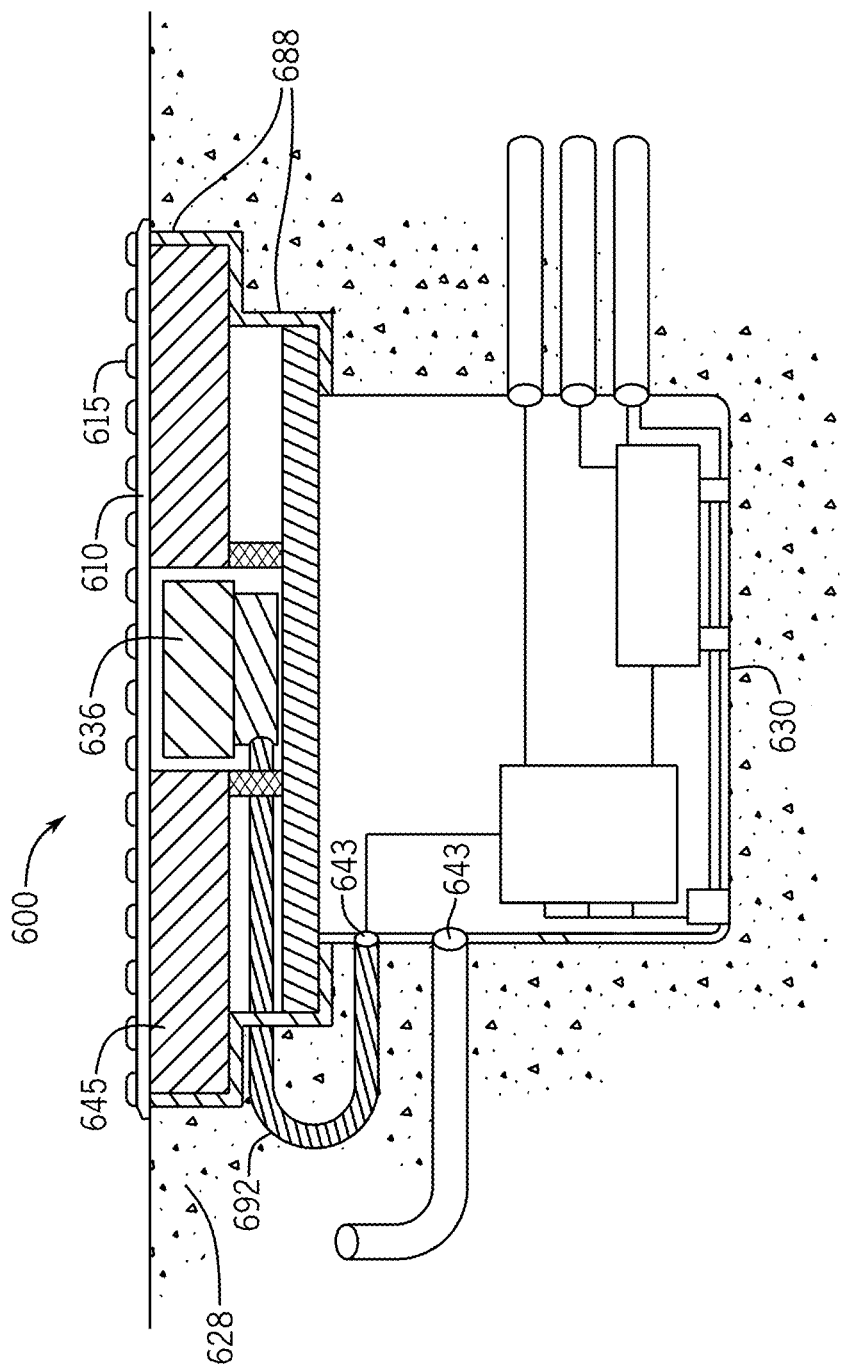
FIG. 22C shows a profile view of the present invention which illustrates the use of an external conduit and cable to connect the integrated antenna beneath the surface tactile panel.

FIG. 22C shows the TWPA 600 and depicts a profile view of an embodiment of the double L-channel frame 688 configuration where the non-load bearing surface tactile panel 610 has truncated domes 615 is attached to a load bearing subsurface base panel 645. The load bearing subsurface base panel 645 has a cavity for the insertion of an antenna unit 636 just beneath the upper surface of the non-load bearing surface tactile panel 610. An embodiment of the current invention TWPA 600 employs an external conduit connection 692 between the antenna unit 636 and the radio or electronic equipment housed in the subsurface enclosure 630. The connection is an external conduit connection 692 that connects to the base of the antenna unit 636 extending laterally into the ground substrate 628 and loops to connect to the subsurface enclosure 630 with waterproof fittings 643.

Figure 22D:
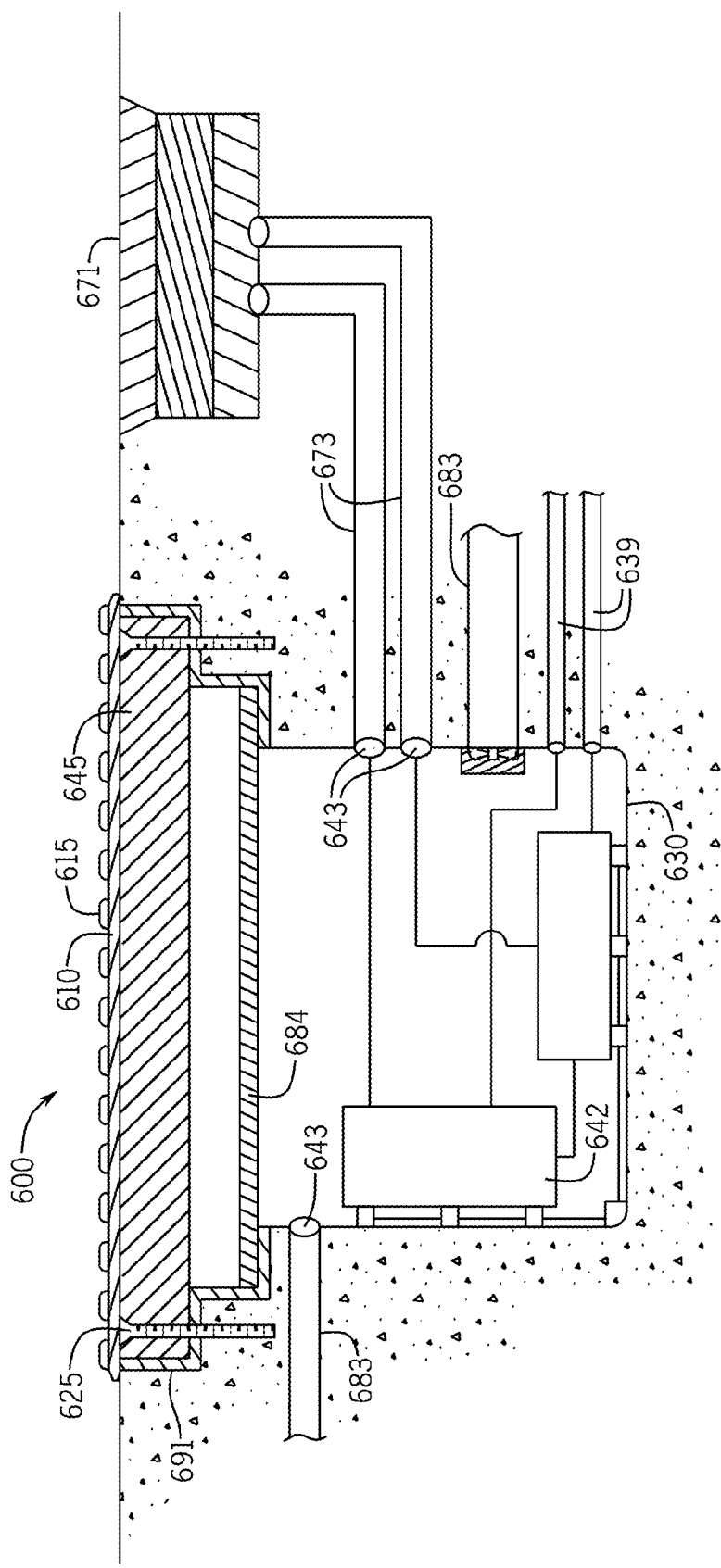
FIG. 22D shows a profile view of the present invention which illustrates the connection of ground level antenna apparatus that is external to the tactile warning panel apparatus and system.

FIG. 22D shows the TWPA 600 and depicts a profile view of the subsurface enclosure 630 that houses radios and electronic equipment 642 that are connected to an external ground surface level antenna 671. FIG. 22D further depicts an embodiment where a non-load bearing surface tactile panel 610 with truncated domes 615 in combination with a load bearing subsurface base panel 645 where in combination they are removable and anchored to a frame 691 formed in a substrate of concrete or other similar material. Below the combination of a non-load bearing surface tactile panel 610 and a load bearing subsurface base panel 645 is a subsurface enclosure 630 with a lid 684 that creates a waterproof seal for the subsurface enclosure 630. Multiple conduits are connected to the subsurface enclosure 683, 639, and 673 for the purpose of venting and connecting power, communication equipment and other technology housed in the subsurface enclosure 630 including external ground surface level antenna 671 and other equipment.

Figure 23:
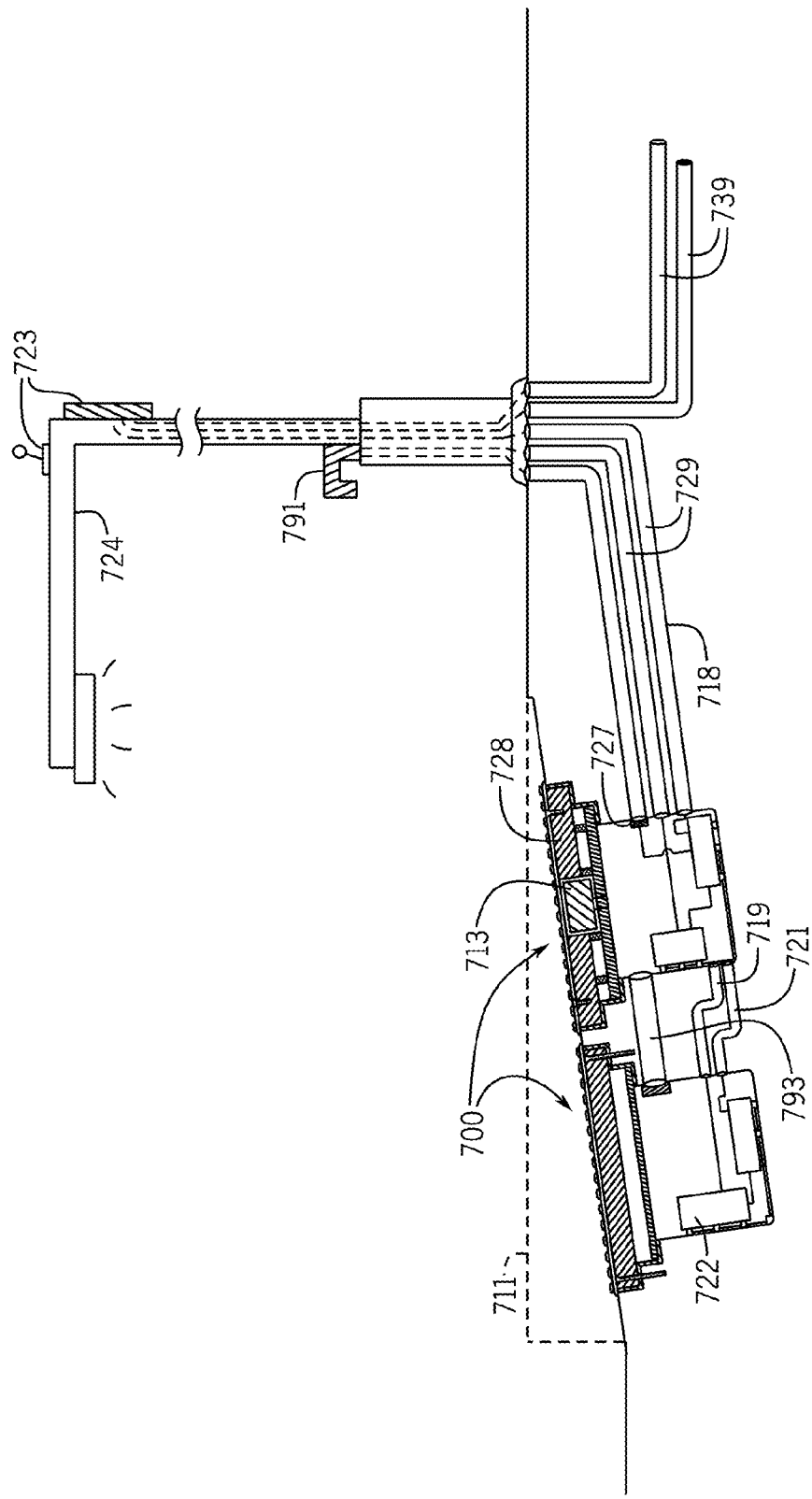
FIG. 23 shows a profile view of the present invention which illustrates a side by side configuration of two tactile warning panel apparatuses with a connection to an external antenna mounted on a light pole.

FIG. 23 depicts where two TWPA's 700 are connected by subsurface conduit 721 that houses connecting cables 719. An alternative embodiment comprises cables 718 in conduit 729 connecting to a pole serving as a light pole, traffic signal pole or other pole or structure 724 through conduits 729 where an antenna or additional equipment 723 may be attached. The TWPA's 700 reside within the sidewalk curb ramp 711 and are contiguous. An alternative embodiment includes a radio 722 and its antenna 713 in the other TWPA where the antenna 713 is integrated into the surface tactile panel 728 of the present invention. In an alternative embodiment, venting of the present inventions is achieved by circulating air by a fan 727 into and out of the surface tactile panel system 728 via an external vent conduit 791 and inter-vault venting via conduit 793. In an alternative embodiment, power and communication to the TWPA's 700 is provided by cables in conduits 739 that power the street light and continue through conduits 729 that connect the street light pole to the TWPA's 700.

All publications and patents mentioned in the above specification are herein incorporated by reference. Various modifications and variations of the described method and system of the invention will be apparent to those skilled in the art without departing from the scope and spirit of the invention. Although the invention has been described in connection with specific preferred embodiments, it should be understood that the invention as claimed should not be unduly limited to such specific embodiments. Indeed, various modifications of the described modes for carrying out the invention that are obvious to those skilled in the field of this invention are intended to be within the scope of the following claims.

What is claimed is:

1. A multipurpose tactile warning panel apparatus for placement into or on a pedestrian walkway comprising:
   a surface tactile panel system with a planar surface having thereon a plurality of distinct spatially raised, three dimensional features arranged in a pattern to be detected by tactile sensation; and
   one or more subsurface enclosures, wherein said subsurface enclosure or enclosures have a removable lid and both the enclosure and removable lid are watertight and/or waterproof; and
   one or more transmitters, sensors, receivers, electronic equipment, antenna or batteries associated therewith, whereby the transmitters or receivers are configured to communicated with mobile devices, mobile device applications, wearable devices, machines or other electronic devices.

2. The multipurpose tactile warning panel apparatus of claim 1, wherein said surface tactile panel system is selected from the group consisting of a surface tactile panel with a minimum load limit of five tons and a non-load bearing surface tactile panel attached to a subsurface base panel where the combination is load bearing with a minimum load limit of five tons.

3. The multipurpose tactile warning panel apparatus of claim 2, wherein said surface tactile panel system is formed from a material selected from a group consisting of metal, glass, ceramic material, thermoset plastic, thermoplastic, polymeric material, plastic composite, polyurethane with glass fiber, fiber reinforced plastic, concrete, polymer concrete, fiber reinforced foam, graphene, sheet molding compound, bulk molding compound and combinations thereof.

4. The multipurpose tactile warning panel apparatus of claim 2, wherein said surface tactile panel system is formed from a material that allows radio frequency propagation and transmission through the surface tactile panel system from an antenna positioned below the surface tactile panel system.

5. The multipurpose tactile warning panel apparatus of claim 1, wherein said distinct spatially raised, three dimensional features comprise a pattern selected from the group consisting of an attention pattern of a plurality of raised truncated domes or cones and a guiding pattern with a plurality of raised bars.

6. The multipurpose tactile warning panel apparatus of claim 1, wherein said pedestrian walkway has a ground surface substrate and said surface tactile panel system is seated in a frame which is molded, formed or installed in said ground surface substrate.

7. The multipurpose tactile warning panel apparatus of claim 6, wherein said frame which is molded, formed or installed in the surrounding ground surface substrate is load bearing with a minimum load limit of five tons.

8. The multipurpose tactile warning panel apparatus of claim 6, wherein said frame is formed from a material selected from a group consisting of metal, aluminum, ceramic material, thermoset plastic, thermoplastic, polymeric material, plastic composite, polyurethane with glass fiber, fiber reinforced plastic, concrete, polymer concrete, graphene, sheet molding compound, bulk molding compound or a combination thereof.

9. The multipurpose tactile warning panel apparatus of claim 6, further comprising a plurality of releasable fasteners, wherein said surface tactile panel system is releasably attachable to said frame with said releasable fasteners which are tamper-proof and/or lockable.

10. The multipurpose tactile warning panel apparatus of claim 1, wherein said subsurface enclosure or enclosures are immediately below and adjacent to said surface tactile panel system.

11. The multipurpose tactile warning panel apparatus of claim 1, wherein said sub-surface enclosure or enclosures are formed from concrete, polymer concrete, fiberglass reinforced concrete, fiberglass, fiber composite, fiber reinforced plastic, metal, plastic composites, polymeric materials, thermoset plastic, thermoplastic, composite materials, graphene, sheet molding compound, bulk molding compound and combinations thereof.

12. A system comprising a network of two or more multipurpose tactile warning panel apparatuses as defined in claim 1, wherein said plurality of multipurpose tactile warning panel apparatuses and systems is located in pedestrian walkways.

13. The multipurpose tactile warning panel apparatus of claim 1, wherein said subsurface enclosure or enclosures have waterproof penetrations therein to facilitate conduit and external connections entering or exiting said subsurface enclosure or enclosures.

14. The multipurpose tactile warning panel apparatus of claim 1, wherein said subsurface enclosure or enclosures houses transmitters, receivers, sensors, computers, small cell radios, Wi-Fi equipment, rechargeable power, batteries, fans, ventilation equipment, cooling equipment, wireless equipment or other electronic equipment.

15. The multipurpose tactile warning panel apparatus of claim 1, wherein said one or more antenna, transmitters, receivers, sensors or other electronic equipment are physically integrated, molded into or under said surface tactile panel system.

16. The multipurpose tactile warning panel apparatus of claim 1, wherein said surface tactile panel has thereon a high-resolution image of two or more colors having an image resolution of greater than 120×120 DPI.

17. The multipurpose tactile warning panel apparatus of claim 2, wherein said subsurface enclosure or enclosures are separate from and beneath said load bearing surface tactile panel.

18. The multipurpose tactile warning panel apparatus of claim 2, wherein said load bearing surface tactile panel is physically connected to the subsurface enclosure or enclosures.

19. A multipurpose tactile warning panel apparatus for placement into or on a pedestrian walkway comprising:
- a surface tactile panel with a planar surface having thereon a plurality of distinct spatially raised, three dimensional features arranged in a pattern to be detected by tactile sensation; and
- a lower surface securement plate system having one or more preformed void cavities therein configured to house electronic components selected from the group consisting of transmitters, receivers, rechargeable power supplies, beacons, computer processors, antennae or combinations thereof, whereby the transmitters or receivers are configured to communicated with mobile devices, mobile device applications, wearable devices, machines or other electronic devices.

* * * * *